(12) United States Patent
Coates et al.

(10) Patent No.: US 11,845,862 B2
(45) Date of Patent: Dec. 19, 2023

(54) STRAIN-HARDENED ISOTACTIC POLYMERS AND USES THEREOF

(71) Applicant: Cornell University, Ithaca, NY (US)

(72) Inventors: Geoffrey W. Coates, Lansing, NY (US); Bryce M. Lipinski, Ithaca, NY (US); Lilliana S. Morris, Wooster, OH (US)

(73) Assignee: Cornell University, Ithaca, NY (US)

( * ) Notice: Subject to any disclaimer, the term of this patent is extended or adjusted under 35 U.S.C. 154(b) by 169 days.

(21) Appl. No.: 17/182,152

(22) Filed: Feb. 22, 2021

(65) Prior Publication Data

US 2021/0269639 A1 Sep. 2, 2021

Related U.S. Application Data

(60) Provisional application No. 62/979,154, filed on Feb. 20, 2020.

(51) Int. Cl.
  *C08L 71/02* (2006.01)
  *C08G 81/00* (2006.01)
  *C08L 75/04* (2006.01)

(52) U.S. Cl.
  CPC .............. *C08L 71/02* (2013.01); *C08G 81/00* (2013.01); *C08L 75/04* (2013.01); *C08L 2207/10* (2013.01)

(58) Field of Classification Search
  CPC ...... C08L 71/02; C08L 75/04; C08L 2207/10; C08G 81/00
  USPC .......................................................... 528/425
  See application file for complete search history.

(56) References Cited

U.S. PATENT DOCUMENTS

2017/0335061 A1* 11/2017 Coates ............... C08G 65/2636

FOREIGN PATENT DOCUMENTS

WO   WO-2017205774 A1 * 11/2017 ............ C08F 210/02

\* cited by examiner

*Primary Examiner* — David T Karst
(74) *Attorney, Agent, or Firm* — Hodgson Russ LLP

(57) ABSTRACT

Provided are strain-hardened polymers. The polymers may include a plurality of polyether units (e.g., isotactic polypropylene oxide units) and one or more crystalline domains. The strain-hardened polymers may have a higher initial engineering yield stress and/or enthalpy of fusion than native polymer (e.g., polypropylene oxide that has not been strain-hardened). The strain-hardened polymers may be made by catalytic methods using bimetallic catalysts. Also provided are uses of the strain-hardened polymers.

17 Claims, 50 Drawing Sheets

STRAIN-HARDENED ISOTACTIC POLYMERS AND USES THEREOF

CROSS REFERENCE TO RELATED APPLICATIONS

This application claims priority to U.S. Provisional Application No. 62/979,154, filed on Feb. 20, 2020, the disclosure of which is hereby incorporated by reference.

STATEMENT REGARDING FEDERALLY SPONSORED RESEARCH

This invention was made with government support under contract no. 1901635 awarded by the National Science Foundation. The government has certain rights in the invention.

BACKGROUND OF THE DISCLOSURE

As a consequence of global plastic production surpassing 350 million metric tons annually, plastic accumulation has become a substantial environmental crisis. The Great Pacific Garbage Patch (GPGP), a 1.6 million square kilometer area between California and Hawaii, is estimated to contain over 79 thousand metric tons of plastic. This garbage patch is but one of five major oceanic plastic accumulation zones and accounts for a small fraction of the estimated 4 to 12 million metric tons of plastic lost annually to marine environments. It was determined in 2015 that 52% of the total GPGP mass was composed of plastic fishing nets, ropes, and lines. These discarded materials not only contribute to garbage patch accumulation, but are the main contributor to "ghost fishing," the unintended trapping and hindering of aquatic life. For products like synthetic fibers used in commercial fishing, efforts to reduce their eventual escape to the ocean are insufficient.

Isotactic polypropylene (iPP), high-density polyethylene (HDPE), and polyamides (PAs) are commercially used as synthetic fibers in marine applications. Although there have been significant efforts to develop degradation pathways for these materials, controlled degradation under ambient conditions has yet to be observed. The photodegradation of iPP and HDPE by ultraviolet (UV) light showed promise, but the low reactivity of the hydrocarbon backbone hinders the rate of degradation. While some commercial materials contain pro-oxidants to increase degradation susceptibility, their implementation has been discouraged due to facile initiation proceeding with negligible control and incomplete degradation. UV degradable ethylene-carbon monoxide copolymers has previously been established.

Although photodegradation provides a means of fragmenting polymer chains, it does not solve the polymer end of life problems. This fragmentation often leads to the formation of microplastics; persistent plastics on the micron scale. While the toxicological hazards of microplastics are not well understood, it is believed that iPPO is unlikely to persist as a microplastic due to additional degradation pathways. The amorphous analog of iPPO, atactic poly(propylene oxide) (aPPO), also referred to as poly(propylene glycol), is often employed in environmentally susceptible applications. Several reports on the biodegradation of low molecular weight aPPO have revealed its low environmental persistence.

Commercial production of aPPO uses double metal cyanide catalysts in conjunction with alcohol chain transfer agents (CTAs) to produce low molecular weight polymers with narrow dispersities (Đ). Maintaining this control while achieving high levels of tacticity remains a challenge for the practical synthesis of iPPO. Enantioselective catalysts have been extensively studied for generating isotactic polyethers from racemic epoxides. This class of catalyst selectively polymerizes a single enantiomer while simultaneously resolving the less reactive epoxide. These systems have historically suffered from low selectivity, low activity, or a combination of the two. While further development of these materials resulted in the commercialization and use in beverage can ring packaging, these materials lack the mechanical strength required for more arduous applications such as commercial fishing.

SUMMARY OF THE DISCLOSURE

The present disclosure provides strain-hardened polymers. The strain-hardened polymers may have one or more desirable features, such as, for example, high mechanical strength and the ability to degrade under certain environmental conditions (see FIG. 1). The strain-hardened polymers may be polyethers. Also provided are methods of making the strain-hardened polymers and articles made from the strain-hardened polymers.

In an aspect, the present disclosure provides strain-hardened polymers. The strain-hardened polymers may be polyethers.

The strain-hardened polymer may have one or more crystalline domains. In various examples, a strain-hardened polymer has more crystalline domains than native polypropylene oxide. Without intending to be bound by any particular theory, as the polymer is strain-hardened, crystallinity is increased and an increase in crystallinity may be associated with an increase in initial engineering yield stress and/or an increase in enthalpy of fusion.

In an aspect, the present disclosure provides methods of making a strain-hardened polymer. A method comprises using an enantiopure bimetallic catalyst or racemic bimetallic catalyst.

A method of making a strain-hardened polymer may comprise an epoxide, wherein the epoxide is enantiopure epoxide or racemic epoxide or mixture of enantiopure epoxides, in the presence of a racemic bimetallic (salalen) Cr(III) catalyst or enantiopure bimetallic (salalen)Cr(III) catalyst, an ionic co-catalyst, and optionally, a chain shuttling agent (CSA). Following polymerization and removal of unreacted epoxide and catalyst, the resulting polymer may be strain-hardened, such as, for example, by elongation.

In an aspect, the present disclosure provides uses and articles of manufacture of the strain-hardened polymers of the present disclosure.

Various articles of manufacture can be made from strain-hardened polymers of the present disclosure. Examples of articles include, but are not limited to, fibers, plastic filaments, plastic lines, plastic ropes, biaxially oriented films, and the like. The articles may be articles for use in commercial fishing.

BRIEF DESCRIPTION OF THE FIGURES

For a fuller understanding of the nature and objects of the disclosure, reference should be made to the following detailed description taken in conjunction with the accompanying figures.

FIG. 11 shows control experiment to determine which enantiomer of PO (S)-1 is selective for.

DETAILED DESCRIPTION OF THE DISCLOSURE

Although claimed subject matter will be described in terms of certain examples/embodiments, other examples/embodiments, including examples/embodiments that do not provide all of the benefits and features set forth herein, are also within the scope of this disclosure. Various structural, logical, and process step may be made without departing from the scope of the disclosure.

Ranges of values are disclosed herein. The ranges set out a lower limit value and an upper limit value. Unless otherwise stated, the ranges include all values to the magnitude of the smallest value (either lower limit value or upper limit value) and ranges between the values of the stated range.

As used herein, unless otherwise stated, the term "group" refers to a chemical entity that is monovalent (i.e., has one terminus that can be covalently bonded to other chemical species), divalent, or polyvalent (i.e., has two or more termini that can be covalently bonded to other chemical species). The term "group" also includes radicals (e.g., monovalent and multivalent, such as, for example, divalent, trivalent, and the like, radicals). Illustrative examples of groups include:

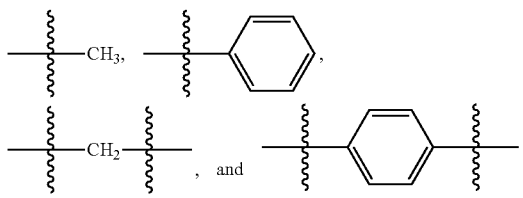

Figure 1:
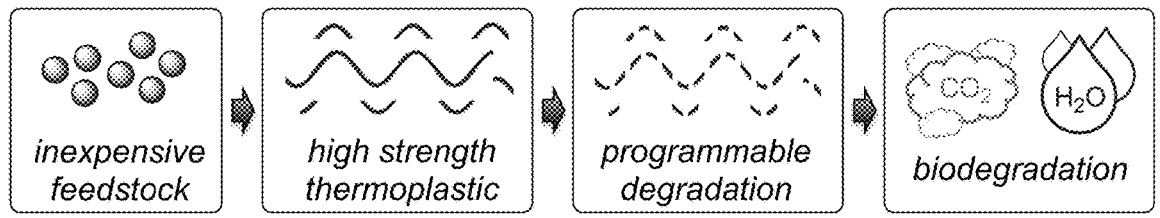
FIG. 1 shows a pathway of degradable polymers for marine environment applications.

The present disclosure provides strain-hardened polymers. The strain-hardened polymers may have one or more desirable features, such as, for example, high mechanical strength and the ability to degrade under certain environmental conditions (see FIG. 1). The strain-hardened polymers may be polyethers. Also provided are methods of making the strain-hardened polymers and articles made from the strain-hardened polymers.

In an aspect, the present disclosure provides strain-hardened polymers. The strain-hardened polymers may be polyethers. The polymers may be copolymers or homopolymers.

Strain-hardened polymers may be various polyethers. The polyethers may be substituted or unsubstituted. Non-limiting examples of polyethers include polypropylene oxides, polypropylene oxide copolymers, polyepichlorohydrin, polygylcidyl ethers, polyalkylene oxides, and the like, and combinations thereof.

In various examples, the polyether is polypropylene oxide. The polypropylene oxide may be isotactic. For example, the [mm] of strain-hardened polymer is 75% or greater, 80% or greater, 85% or greater, 90% or greater, 91% or greater, 92% or greater, 93% or greater, 94% or greater, or 95% or greater. The polyether groups of a polymer may be isotactic.

The strain-hardened polymer may have one or more crystalline domains. In various examples, a strain-hardened polymer has more crystalline domains than native polypropylene oxide. Without intending to be bound by any particular theory, as the polymer is strain-hardened, crystallinity is increased and an increase in crystallinity may be associated with an increase in initial engineering yield stress and/or an increase in enthalpy of fusion.

The strain-hardened polymer may have a desirable engineering yield stress. For example, the strain-hardened polymer has an increased initial engineering yield stress relative to native polymers (e.g., polypropylene oxide that has not been strain-hardened). The initial engineering yield stress may be 15-90 MPa, including every 0.1 Pa value and range therebetween. For example, the initial engineering yield stress is 15 MPa or greater, 20 MPa or greater, 25 MPa or greater, 30 MPa or greater, 35 MPa or greater, 40 MPa or greater, 45 MPa or greater, 50 MPa or greater, 55 MPa or greater, 60 MPa or greater, 65 MPa or greater, 70 MPa or greater, 75 MPa or greater, 80 MPa or greater, or 85 MPa or greater. The initial engineering yield stress may be determined by methods known in the art. For example, the stress, which may be the initial engineering yield stress, is determined by ASTM D1708, where the thickness of the sample is 0.5 mm. The stress may be calculated by equations 8 and/or 9, which are provided in the Example. The stress may be the first non-reversible plastic deformation.

The strain-hardened polymer may have a desirable elastic modulus. For example, the elastic modulus is at least 15 MPa and less than 350 MPa. In various examples, the elastic modulus is 15-350 MPa, including every 0.1 Pa value and range therebetween. In various examples, the elastic modulus is 20 MPa or greater, 40 MPa or greater, 60 MPa or greater, 80 MPa or greater, 100 MPa or greater, 150 MPa or greater, 200 MPa or greater, 250 MPa or greater, or 300 MPa or greater.

The strain-hardened polymer may have a desirable ultimate tensile strength. In various examples, the ultimate tensile strength is 30-75 MPa, including every 0.1 Pa value and range therebetween.

The strain-hardened polymer may have a desirable dispersity (Đ). The dispersity may be monomodal or multimodal (e.g., bimodal or the like). For example, the dispersity may be 15 or less, 10 or less, 5 or less, 4 or less, 3 or less, or 2 or less. In various examples, the dispersity is in the range of 2-3.

The strain-hardened polymer may have a desirable enthalpy of fusion. For example, the strain-hardened polymer has an increased enthalpy of fusion relative to native polymers (e.g., polypropylene oxide that has not been strain-hardened). For example, polypropylene oxide that has not been strain-hardened has an enthalpy of fusion of 38 J/g. A strain-hardened polymer of the present disclosure may have a 10% or more, a 20% or more, 30% or more, 40% or more, 50% or more, 60% or more, 70% or more, 80% or more, 90% or more, or 100% or more increase in enthalpy of fusion relative to native polymers (e.g., polypropylene oxide that has not been strain-hardened). In various examples, the enthalpy of fusion is 40-80 J/g, including every 0.1 J/g value and range therebetween (e.g., 45-80 J/g). In various examples, the enthalpy of fusion is 40 J/g or greater, 45 J/g or greater, 50 J/g or greater, 55 J/g or greater, 60 J/g or greater, 65 J/g or greater, 70 J/g or greater, or 75 J/g or greater.

The strain-hardened polymer can have a variety of molecular weights (e.g., $M_n$) values. For example, the strain-hardened polymer has an $M_n$ of 500 to 500,000 g/mol, including all values to the 1 g/mol and ranges therebetween. In various examples, the $M_n$ of the strain-hardened polymer is in the range of 500 to 400,000, 500 to 250,000, 500 to 100,000, 500 to 40,000, 500 to 30,000, 750 to 15,000, 1,000 to 5,000, 5,000 to 500,000, 50,000 to 500,000, 50,000 to 250,000, or 50,000 to 100,000 g/mol. In various examples, the $M_n$ of the strain-hardened polymer is greater than 50,000 g/mol. In various other examples, the $M_n$ is greater than 100,000 g/mol. The $M_n$ of the strain-hardened polymer can determined by methods known in the art (e.g., by NMR spectroscopy or GPC calibrated with polystyrene standards).

The strain-hardened polymer may be a copolymer. For example, the strain-hardened polymer comprises at least two stereoblocks. The stereoblocks may comprise a plurality of isotactic polypropylene oxide units. In various examples, the copolymer comprises one or more polyurethane segments and one or more stereoblocks.

A strained-hardened polymer may have the following structure:

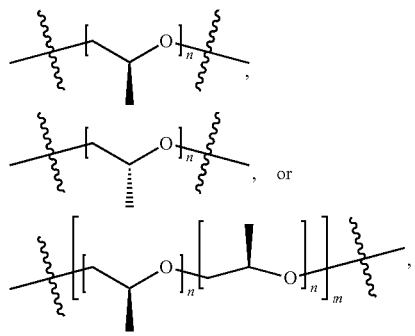

where each n is independently 10 to 10,000 and m is 1 to 1000. The strain-hardened polymer may comprise a chain shuttling group (CSG). For example, a strain-hardened polymer comprising a CSG has the following structure:

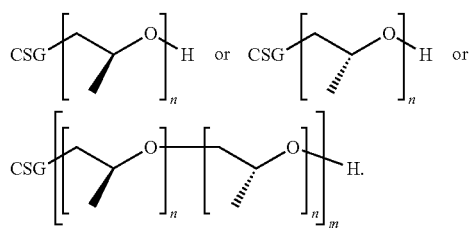

CSGs can be internal or terminal groups of the isotactic polyether groups. For example, the CSG is an internal group of the polyether. Examples of CSG groups include:

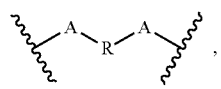

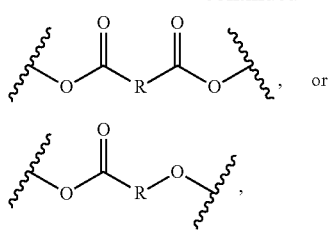

where A is O or S, R is a $C_1$ to $C_{20}$ carbon-containing group such as, for example, a $C_1$ to $C_{20}$ aliphatic group, $C_1$ to $C_{20}$ heteroaliphatic group, $C_3$ to $C_{12}$ carbocyclic group, a $C_5$ to $C_{20}$ aliphatic carbocyclic group, $C_3$ to $C_{12}$ heterocyclic group, or a $C_5$ to $C_{20}$ aliphatic heterocyclic group. The terminal group of a CSG that is not covalently bound to an isotactic polyether group can be —H. The resulting terminal —OH group can be derivatized or used in a polymerization reaction.

CSGs can be derived from chain shuttling agents (CSAs). For example, a diol CSA gives a diol CSG:

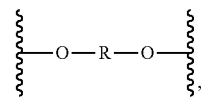

a monoalcohol CSA gives a monoalcohol CSG:

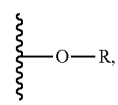

a diacid CSA gives a diacid CSG:

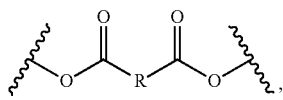

and a hydroxyacid CSA gives a hydroxyacid CSG:

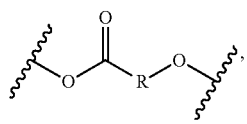

where R is a $C_1$ to $C_{20}$ carbon-containing group such as, for example, a $C_1$ to $C_{20}$ aliphatic group, $C_1$ to $C_{20}$ heteroaliphatic group, $C_3$ to $C_{12}$ carbocyclic group, a $C_5$ to $C_{20}$ aliphatic carbocyclic group, $C_3$ to $C_{12}$ heterocyclic group, or a $C_5$ to $C_{20}$ aliphatic heterocyclic group.

In various examples, a strain-hardened polymer has the following structure:

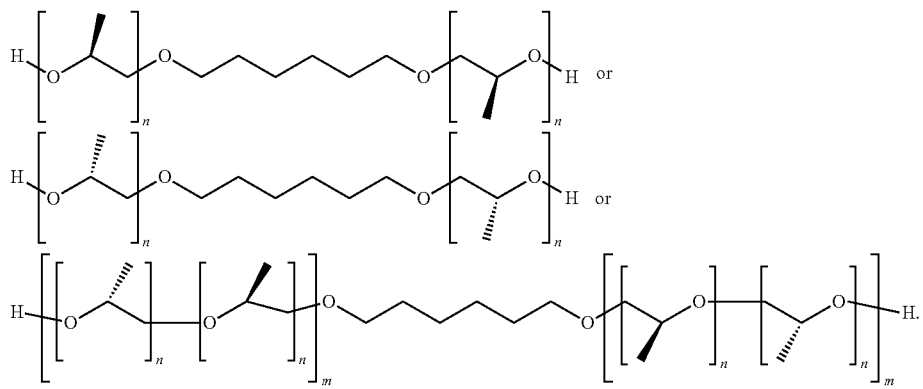

In an aspect, the present disclosure provides methods of making a strain-hardened polymer. A method comprises using an enantiopure bimetallic catalyst or racemic bimetallic catalyst.

A method of making a strain-hardened polymer may comprise an epoxide, wherein the epoxide is enantiopure epoxide or racemic epoxide or mixture of enantiopure epoxides, in the presence of a racemic bimetallic (salalen) Cr(III) catalyst or enantiopure bimetallic (salalen)Cr(III) catalyst, an ionic co-catalyst, and optionally, a chain shuttling agent (CSA). Following polymerization and removal of unreacted epoxide and catalyst, the resulting polymer may be strain-hardened, such as, for example, by elongation.

An epoxide can be present as mixtures of stereoisomers, where the mixture is, enriched in one stereoisomer relative the complementary stereoisomer (also referred to as an optically enriched form of the epoxide) or racemic mixtures of epoxide. In various examples, the epoxide can be present as a mixture of stereoisomers having greater than 90, 95, 99, 99.5, or 99.9% purity of one stereoisomer. In another example, optically pure (no detectable complementary stereoisomer present) epoxide is used. Optical purity can be determined by methods known in the art, for example, HPLC, GC, or nuclear magnetic resonance spectroscopy. Use of optically pure epoxide or optically enriched epoxide present as a mixture of epoxides, e.g., greater than 90% enrichment, in a stereoisomer in the methods described herein can result in formation of polymers having desirable properties. For example, the epoxide has the following structure:

or a combination (e.g., a racemic mixture) thereof.

In an example, an epoxide is present in large excess of all of the other components in the reaction mixture. For example, any of the above methods comprise a ratio of 100:1 to 500,000:1 of epoxide to catalyst and all ratios therebetween. For example, any of the above methods comprise a ratio of 200:1 to 100,000:1 of epoxide to catalyst. In various examples, any of the above methods comprise a ratio of 500:1 to 50,000:1 of epoxide to catalyst. In various examples, any of the above methods comprise a ratio of 500:1 to 5,000:1 of epoxide to catalyst. In various examples, any of the above methods comprise a ratio of 500:1 to 1,000:1 of epoxide to catalyst.

Various ionic co-catalysts may be used in a method of making a strain-hardened polymer. Non-limiting examples of ionic co-catalysts include $[R_4N]^+[X]^-$ and $[Ph_3P-N-PPh_3]^+[X]^-$, where R is a $C_1$-$C_{20}$ alkyl group, and $X^-$ is an anion capable of initiation, including, but not limited to, halide, alkoxide, $C_1$-$C_{20}$ carboxylate, and azide.

A catalyst for polymerization is a racemic bimetallic (salalen)Cr(III) catalyst or enantiopure bimetallic (salalen) Cr(III) catalyst. For example, the catalyst has the following structure:

(S)-1

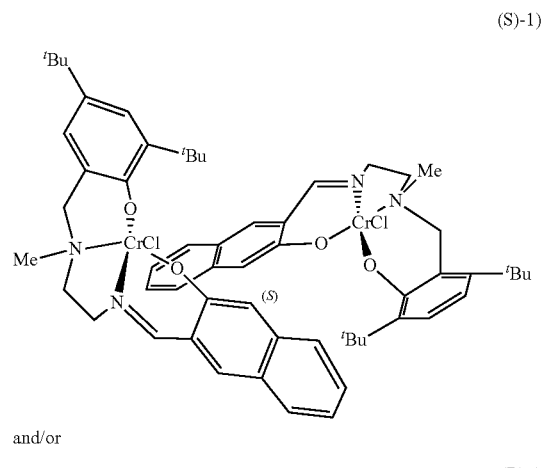

and/or (R)-1

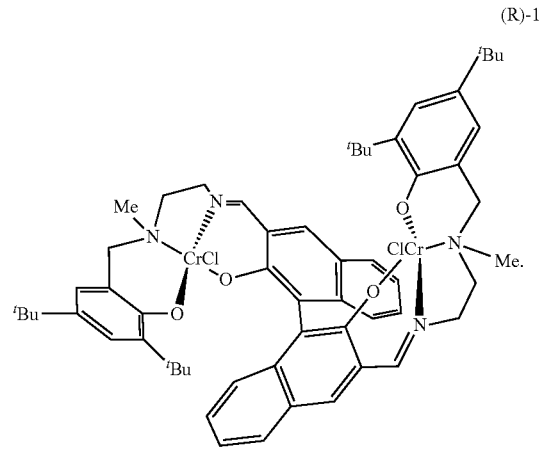

A catalyst can be present in a range of concentrations. For example, the methods comprise a catalyst present in an amount from 0.0002 mole % to 1.0 mole % and all values to the 0.0002 mole % and ranges therebetween. In various examples, the catalyst is present in an amount from 0.005 mole % to 0.5 mole %, or 0.01 mole % to 0.1 mole %. For example, the ratio of catalyst to ionic co-catalyst is 1:0.1, 1:1, 1:5, 1:10, or 1:25 including all ratios therebetween.

Various ratios of the components may be used. For example, the ratio of epoxide to CSA is 400:0 to 400:10, including every 0.1 ratio value and range therebetween. For example, the ratio of CSA to catalyst is 0:1 to 100:1.

The CSA forms a CSG in the polymer. A CSA has one or more functional groups (e.g., hydroxy or thiol group(s) and/or carboxylic acid/carboxylate group(s)) that can facilitate formation of a polyether chain. The CSA can be a monoalcohol CSA or multifunctional CSA. A monoalcohol CSA forms a monoalcohol CSG in the polymer. A multifunctional CSA forms a multifunctional CSG in the polymer.

A monoalcohol CSA contains a single hydroxy group. In various examples, the monoalcohol CSA is methanol, ethanol, i-propanol, benzyl alcohol, p-methoxybenzyl alcohol, or a combination thereof.

The CSA can have a chiral center. For example, a monoalcohol CSA has the following structure:

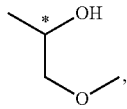

where * denotes a chiral carbon center.

A multifunctional CSA can contain a plurality of carboxylic acid/carboxylate groups, a plurality of hydroxy groups, or a combination of one or more carboxylic acid/carboxylate groups and one or more hydroxy groups. For example, the CSA is a multifunctional CSA and is $R^2$—(COOH/OH)$_z$, where $R^2$ is $C_1$ to $C_{20}$ aliphatic group, or $C_1$ to $C_{20}$ carbocyclic group, and z is from 1 to 10.

The CSA can be a bifunctional CSA. For example, the CSA is a diol, a dithiol, a diacid, or a hydroxy acid. For example, the CSA is a diol with $C_1$ to $C_{20}$ optionally substituted branched or linear aliphatic group, or a $C_3$ to $C_{20}$ optionally substituted carbocyclic group. In an example, the diol has the following structure:

In an example, the hydroxyacid has the following structure:

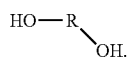

In another example, the diacid has the following structure:

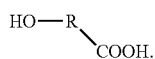

In yet another example, the diol has the following structure:

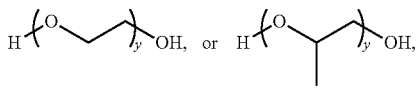

where R is a $C_1$ to $C_{20}$ carbon-containing group such as, for example, a $C_1$ to $C_{20}$ aliphatic group, $C_1$ to $C_{20}$ heteroaliphatic group, $C_3$ to $C_{12}$ carbocyclic group, a $C_5$ to $C_{20}$ aliphatic carbocyclic group, $C_3$ to $C_{12}$ heterocyclic group, or a $C_5$ to $C_{20}$ aliphatic heterocyclic group and y can be from 1 to 100. In various examples, the diol has one the following structures:

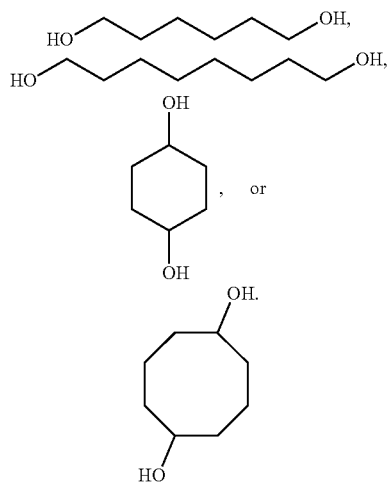

In various examples, multifunctional CSAs include sugars, polysaccharides, glycerols, and hydroxyl or carboxyl functional polymers (polyacrylates or polyvinylalcohols).

The epoxide, catalyst, ionic co-catalyst, and CSA can be contacted in a solvent. For example, the reaction step of the methods further comprises one or more solvents. The solvent can be an organic solvent. For example, the solvent is a hydrocarbon solvent such as an aromatic hydrocarbon solvent (e.g., toluene) or an aliphatic hydrocarbon. In another example, the solvent is a halogenated hydrocarbon. In another example, the solvent is an ether, such as tetrahydrofuran or dimethoxyethane. The reaction can be run neat (i.e., without addition of a solvent). For example, the reaction step of any of the methods does not comprise a solvent.

A polymerization can be quenched at any point (e.g., at a desired conversion). Various quenching agents can be used. For example, quenching agents that are a source of protons are used. In another example, quenching agents (alkyl/silyl halides) can also be used to further functionalize the polymers.

Reaction times and conditions (e.g., reaction temperature) for a method (e.g., a polymerization reaction) can be varied to achieve the desired result. Selection of certain reaction times and conditions is within the purview of one having skill in the art. Generally, reaction times under 24 hours are used. For example, a polymerization reaction is conducted at a temperature of from −78° C. to 150° C. In various examples, a polymerization reaction is conducted at a temperature of from −10° C. to 30° C., 20° C. to 150° C., 20° C. to 120° C., 20° C. to 100° C., 30° C. to 150° C., 35° C.

to 150° C., 50° C. to 150° C., 50° C. to 100° C., 20° C. to 80° C., or 20° C. to 50° C. A reaction can be conducted in a static atmosphere (e.g., a sealed reaction vessel) or as a stream (e.g., a flow-type reactor) under inert atmosphere. A reaction can be carried out at ambient conditions (e.g., 20° C.).

For example, a method uses 1,6-hexanediol as a chain shuttling agent to polymerize propylene oxide to give desired isotactic telechelic diols. These methods provide a route to isotactic telechelic diol with both diols being secondary, which allows for easier polyurethane formation.

In an aspect, the present disclosure provides uses and articles of manufacture of the strain-hardened polymers of the present disclosure. An article of manufacture comprises one or more strain-hardened polymers of the present disclosure.

Various articles of manufacture can be made from strain-hardened polymers of the present disclosure. Examples of articles include, but are not limited to, fibers, plastic filaments, plastic lines, plastic ropes, biaxially oriented films, and the like. The articles may be articles for use in commercial fishing.

The steps of a method described in the various embodiments and examples disclosed herein are sufficient to carry out the methods of the present disclosure. Thus, in an embodiment, a method consists essentially of a combination of the steps of the methods disclosed herein. In another embodiment, the method consists of such steps.

The following Statements provide various embodiments of the present disclosure.

Statement 1. A strain-hardened polymer (e.g., as disclosed herein, such as, for example, in the Example). In various examples, the polymer is a polyether or comprises one or more polyether.

Statement 2. A strain-hardened polymer according to Statement 1, where the strain hardened polymer is or comprises one or more isotactic polypropylene oxide(s) (e.g., isotactic polypropylene oxide(s)).

Statement 3. A strain-hardened polymer according to Statement 1 or Statement 2, where the polymer is a copolymer (such as, for example, a block copolymer, a graft copolymer, or the like). An isotactic polyether group may comprise one or 2 or more stereoregular blocks. A graft copolymer may be elastomeric (e.g., further comprising one or more elastomer(s)).

Statement 4. A strain-hardened polymer according to any one of the preceding Statements, where the polymer is a copolymer (such as, for example, a block copolymer, a graft copolymer, or the like) further comprising one or more polymer(s) (e.g., polymer group(s)) that is not an isotactic polypropylene oxide or polyethylene oxide.

Statement 5. A strain-hardened polymer according to any one of the preceding Statements, where one or more or all of the one or more isotactic polypropylene oxide(s) is/are optically pure (all R or all S), a stereoblock (all R or all S), comprises both R and S stereocenters, or a combination thereof.

Statement 6. A strain-hardened polymer according to any one of the preceding Statements, where the one or more isotactic polypropylene oxide(s) have, independently or collectively, a molecular weight ($M_w$ and/or $M_n$) of at least 15,000 g/mol (e.g., 15,000 to 500,000 g/mol, including all integer g/mol values and ranges therebetween, such as, for example, 15,000 to 250,000 g/mol). The Mn of a polymer may be determined by methods known in the art (e.g., by NMR spectroscopy or GPC calibrated with polystyrene standards). Molecular weight may be determined as described herein.

Statement 7. A strain-hardened polymer according to any one of the preceding Statements, where the one or more isotactic polypropylene oxide(s) have, independently or collectively, [mm] of at least 95, at least 96, at least 97, at least 98, or greater than 99. For example, the isotacticity of a polymer (e.g., isotactic polypropylene oxide polyether, isotactic polypropylene oxide polyether, or the like is determined by NMR spectroscopy (e.g., $^{13}C$ NMR spectroscopy)).

Statement 8. A strain hardened polymer according to any one of the preceding Statements, where the polymer is a polyurethane comprising one or more isotactic polypropylene oxide(s) (e.g., formed by polymerization of one or more hydroxy terminated isotactic polypropylene oxide(s) and one or more isocyanates).

Statement 9. A strain-hardened polymer according to any one of the preceding Statements, where the strain hardened polymer is strain hardened by a method described herein (e.g., a method described herein).

Statement 10. A strain-hardened polymer according to any one of the preceding Statements, where the strain hardened polymer is at least partially (or completely) formed using enantiopure propylene oxide (R or S) or a mixture of R- and S-propylene oxide (e.g., a racemic mixture) and/or with a enantiopure or mixture of stereoisomers (a racemic mixture) of one or more catalyst (e.g., one or more catalyst described herein and in the Example). The catalyst may be a bi-metallic (salalen)Cr(III) catalyst (e.g., one or more bi-metallic (salalen)Cr(III) described herein).

Statement 11. A strain-hardened polymer according to any one of the preceding Statements, where the strain-hardened polymer is at least partially (or completely) formed using a chain transfer agent. Suitable CTA's are known in the art. For example, the CTA is an alkyl diol (such as, for example, 1,6-hexanediol) and the like) and the like.

Statement 12. A strain-hardened polymer according to any one of the preceding Statements, where the strain hardened polymer is photodegradable and has one or more desirable mechanical properties (e.g., one or more desirable mechanical properties described herein).

Statement 13. A strain-hardened polymer comprising a plurality of isotactic polypropylene oxide units and one or more crystalline domains, where the $M_n$ of the strained-hardened polymer is 500 to 500,000 g/mol, including everyone g/mol value and range therebetween (e.g., 5,000 to 500,000 g/mol) and the polymer exhibits an initial engineering yield stress of 15 MPa or greater, 20 MPa or greater, 25 MPa or greater, 30 MPa or greater, 35 MPa or greater, 40 MPa or greater, 45 MPa or greater, 50 MPa or greater, 55 MPa or greater, 60 MPa or greater, 65 MPa or greater, 70 MPa or greater, 75 MPa or greater, 80 MPa or greater, 85 MPa or greater, or 90 MPa or greater. In various examples, the $M_n$ is 15 to 90 MPa, including every 0.1 MPa value and range therebetween.

Statement 14. A strain-hardened polymer according to Statement 13, where the strained-hardened polymer has an [mm] of 75% or greater, 80% or greater, 85% or greater, 90% or greater, 91% or greater, 92% or greater, 93% or greater, 94% or greater, or 95% or greater. In various examples, the [mm] is at least 95%.

Statement 15. A strain-hardened polymer according to Statements 13 or 14, where the strain-hardened polymer has an enthalpy of fusion of 40 to 80 J/g, including every 0.1 J/g value and range therebetween. In various examples, the enthalpy of fusion of a strain-hardened polymer is at least 10% higher than native polypropylene oxide, at least 15% higher than native polypropylene oxide, at least 20% higher than native polypropylene oxide, at least 25% higher than native polypropylene oxide, at least 30% higher than native polypropylene oxide, at least 35% higher than native polypropylene oxide, at least 40% higher than native polypropylene oxide, at least 45% higher than native polypropylene oxide, at least 50% higher than native polypropylene oxide, at least 55% higher than native polypropylene oxide, at least 60% higher than native polypropylene oxide, at least 65% higher than native polypropylene oxide, at least 70% higher than native polypropylene oxide, at least 75% higher than native polypropylene oxide, at least 80% higher than native polypropylene oxide, at least 85% higher than native polypropylene oxide, at least 90% higher than native polypropylene oxide, at least 95% higher than native polypropylene oxide, or at least 100% higher than native polypropylene oxide.

Statement 16. A strain-hardened polymer according to any one of Statements 13-15, where the strain-hardened polymer is a copolymer.

Statement 17. A strain-hardened polymer according to Statement 16, where the copolymer comprises at least two stereoblocks.

Statement 18. A strain-hardened polymer according to Statement 16, wherein the copolymer comprises one or more polyurethane segments and one or more stereoblocks, where each stereoblock comprises a plurality of isotactic polypropylene oxide units.

Statement 19. A strain-hardened polymer according to any one of Statements 13-18, where the strained-hardened polymer has a molecular weight ($M_n$) of at least 50,000 g/mol, at least 60,000 g/mol, at least 70,000 g/mol, at least 80,000 g/mol, at least 90,000 g/mol, at least 100,000 g/mol, at least 110,000 g/mol, at least 120,000 g/mol, at least 130,000 g/mol, at least 140,000 g/mol, at least 150,000 g/mol, at least 200,000 g/mol, at least 250,000 g/mol, at least 300,000 g/mol, at least 350,000 g/mol, at least 400,000 g/mol, at least 450,000 g/mol, or 500,000 g/mol Statement 20. A strain-hardened polymer according to any one of Statements 13-19, where the strain-hardened polymer comprises:

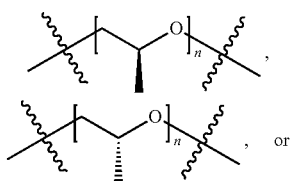, or

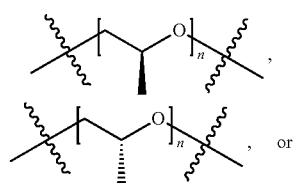, where each n is independently 10 to 10,000 and m is 1 to 1000.

Statement 21. A strain-hardened polymer according to Statement 20, where the strain-hardened polymer has the following structure:

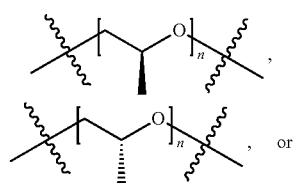

where CSG is a chain shuttling group.

Statement 22. A strain-hardened polymer according to Statement 21, where the chain shuttling group has the following structure:

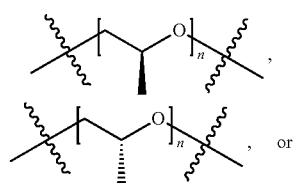

where A is O or S, R is a $C_1$ to $C_{20}$ carbon-containing group chosen from a $C_1$ to $C_{20}$ aliphatic group, $C_1$ to $C_{20}$ heteroaliphatic group, $C_3$ to $C_{12}$ carbocyclic group, a $C_5$ to $C_{20}$ aliphatic carbocyclic group, $C_3$ to $C_{12}$ heterocyclic group, and a $C_5$ to $C_{20}$ aliphatic heterocyclic group.

Statement 23. A strain-hardened polymer according Statement 21 or Statement 22, where the strain-hardened polymer has the following structure:

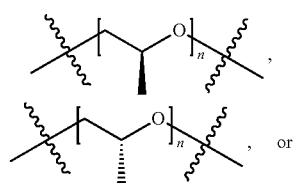

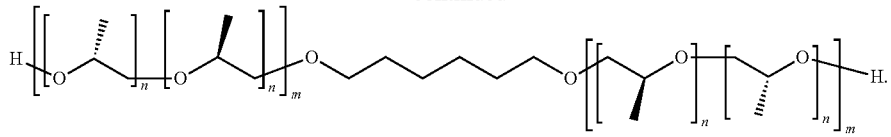

Statement 24. A strain-hardened polymer according to any one of Statements 13-23, where the strain-hardened polymer has an elastic modulus of 15 MPa or greater. In various examples, the elastic modulus is less than or equal to 350 MPa (e.g., 15-350 MPa, including every 0.1 Pa value and range therebetween). In various examples, the elastic modulus is 20 MPa or greater, 40 MPa or greater, 60 MPa or greater, 80 MPa or greater, 100 MPa or greater, 150 MPa or greater, 200 MPa or greater, 250 MPa or greater, 300 MPa or greater, or 350 MPa.

Statement 25. A strain-hardened polymer according to any one of Statements 13-24, where the strain-hardened polymer has a yield engineering stress of 15 to 90 MPa, including every 0.1 Pa value and range therebetween.

Statement 26. A strain-hardened polymer according to any one of Statements 13-25, where the strain-hardened polymer has an ultimate tensile strength of 30 to 75 MPa, including every 0.1 Pa value and range therebetween.

The following example is presented to illustrate the present disclosure. It is not intended to be limiting in any matter.

Example

This example provides a description of polymers of the present disclosure (e.g., strain-hardened polymers) and methods of making same.

It was rationalized that isotactic poly(propylene oxide) (iPPO) could be a suitable choice based on its structural similarity to iPP to prepare high strength polymers. Higher levels of tacticity in iPP increase its crystallinity, leading to enhanced mechanical strength, crucial for numerous applications. Achieving high tacticity in PPO could allow for similar mechanical properties to iPP while possessing ether linkages that are susceptible to photochemical degradation.

Highly isotactic PPO can be synthesized from enantiopure PO by a chain transfer polymerization (FIG. 2A). This synthesis requires a highly regioregular catalyst to ensure head-to-tail enchainment as well as enantiopure monomer, making it impracticable for large-scale production. Enantioselective chain transfer polymerization can also achieve highly isotactic polymer, where tacticity is dictated solely by the catalyst selectivity (FIG. 2B). Isoselective chain shuttling polymerization affords a unique polymer architecture in which both monomers are incorporated in a stereoblock (SB) configuration (FIG. 2C). Combining the bimetallic (salalen)Cr(III) catalyst (rac)-1 with bis(triphenylphosphine)iminium chloride ([PPN]Cl) remains the only system reported to synthesize (SB)-iPPO. The moderate chain shuttling rate afforded by (rac)-1 and protic CSAs allows for the incorporation of large runs of a single enantiomer, preserving the high polymer isotacticity. Despite several methods of iPPO synthesis, little is known about the mechanical properties of this material. Described herein is the synthesis of various stereoregular forms of highly isotactic iPPO and their mechanical strength and photodegradation.

In its enantiopure and racemic forms, complex 1 was used to polymerize enantiopure and racemic PO to generate each stereoregular configuration of iPPO (Table 1). Enantioenriched (S)-iPPO was afforded from (S)-1 and (rac)-PO in the presence of 1,6-hexanediol (1,6-HD) as a CTA (Table 1, Entry 1). Its enantiopure form was synthesized from (S)—PO by (rac)-1 under similar reaction conditions (Table 1, Entry 2). Enantiopure (R)-iPPO was generated in the same manner by using (R)—PO (Table 1, Entry 3). (SB)-iPPO was synthesized from (rac)-PO using (rac)-1 in the presence of 1,6-HD as a CSA (Table 1, Entry 4). Lastly, blending equal quantities of enantiopure (S)- and (R)-iPPO in solution afforded highly isotactic (rac)-iPPO (Table 1, Entry 5). Monomer and 1,6-HD loadings were modified to account for the number of initiating species to target a desired number average molecular weight ($M_n$). As intended, all synthesized forms of iPPO exhibit similar values of $M_n$ and Đ (Table 1).

Figure 3:
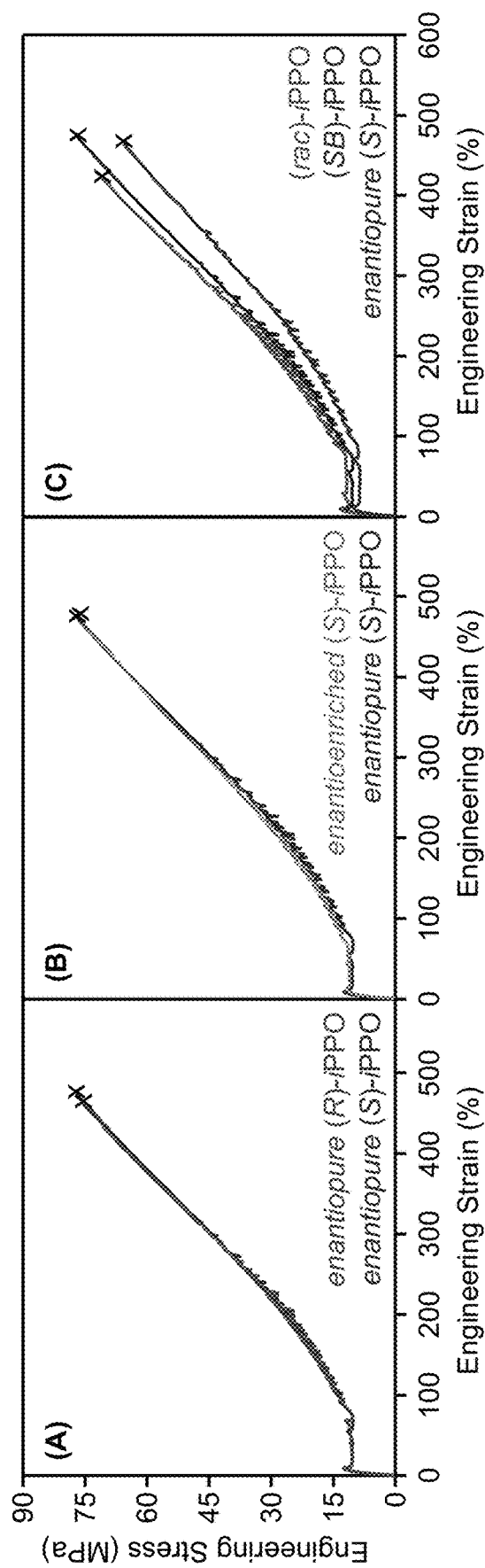
FIG. 3 shows representative stress-strain curves of various forms of iPPO strained at a rate of 100% strain min'. Traces separated for clarity: (A) enantiopure (R)- and (S)-iPPO (Table 1, Entries 2 and 3), (B) enantioenriched and enantiopure (S)-iPPO (Table 1, Entries 1 and 2), (C) (rac)-iPPO, (SB)-iPPO, and enantiopure (S)-iPPO (Table 1, Entries 2, 4 and 5). X=sample fracture.
Figure 4:
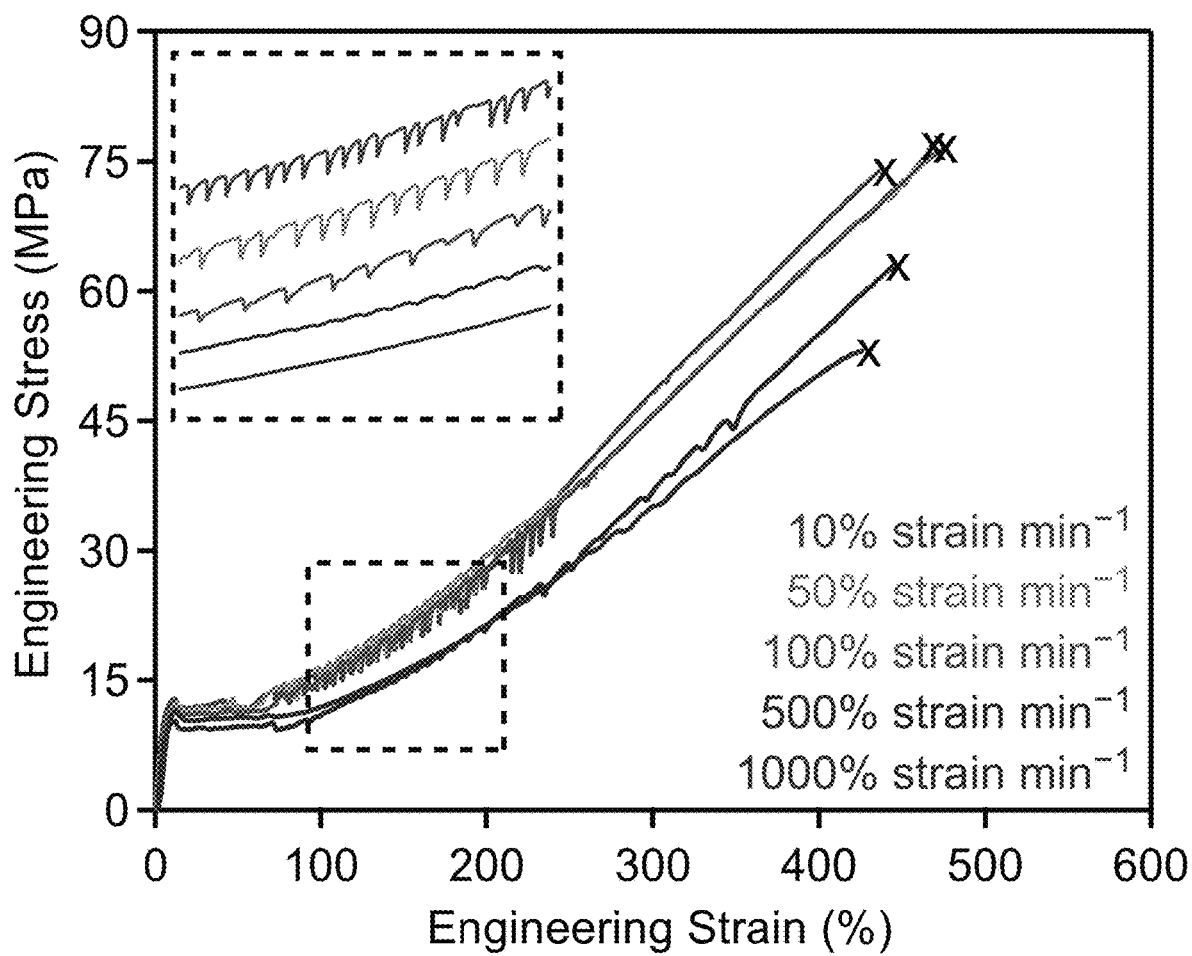
FIG. 4 shows representative stress-strain curves of enantioenriched (S)-iPPO (Table 1, Entry 1) tested at various strain rates. Data in window is offset vertically for clarity. X=sample fracture.

Each stereoregular form of iPPO was subjected to uniaxial tensile elongation following the removal of unreacted PO, 1, and dimethoxyethane (DME) (FIG. 3). Each material exhibited an elastic response until a sharp yield peak that was followed by a flat region and then an increase in stress until failure. As anticipated, enantiopure (S)- and (R)-iPPO exhibit the same tensile profile with an elastic modulus of ~290 MPa, yield stress of ~12 MPa, and ultimate tensile strength (UTS) of 75 MPa (FIG. 3A). Although enantioenriched (S)-iPPO has minor errors due to some incorporation of (R)—PO ([mm]=96.9%), its tensile response is indistinguishable from that of enantiopure (S)-iPPO ([mm] >99.0%) at large strain (FIG. 3B). It does present a somewhat reduced elastic modulus and yield stress of 248 MPa and 11 MPa respectively. (rac)-iPPO and (SB)-iPPO exhibited small losses (4 and 10 MPa respectively) in UTS (FIG. 1C). Interestingly, (rac)-iPPO had the largest elastic modulus (306 MPa) and yield stress (13 MPa) of these materials in conjunction with its lowest strain to failure.

Upon first impression, it might be interpreted that the lower strength observed in (SB)-iPPO is the result of its lower isotacticity. However, its mm-triad content is similar to that of the enantioenriched (S)-iPPO (Table 1, Entries 1 and 4), which exhibits the same tensile strength as enantiopure iPPO. The lower mm-triad content observed in (SB)-iPPO is intrinsic of its block microstructure. In contrast, the lower content for enantioenriched (S)-iPPO is due to random incorporation of the less preferred enantiomer. As observed, a low percentage of random insertion errors have a negligible effect on the stress at break (FIG. 3B), but the block microstructure does (FIG. 3C). (SB)-iPPO maintains the approximate yield strength as all other forms of iPPO, but its tensile behavior diverges during strain hardening. Under continuous uniaxial elongation, semicrystalline polymer chains often realign after irreversible deformation enabling crystallization, otherwise termed as mechanical strain hardening. The lower UTS of (SB)-iPPO is attributed to inefficient chain alignment of the block architecture as it undergoes strain hardening.

Figure 61:
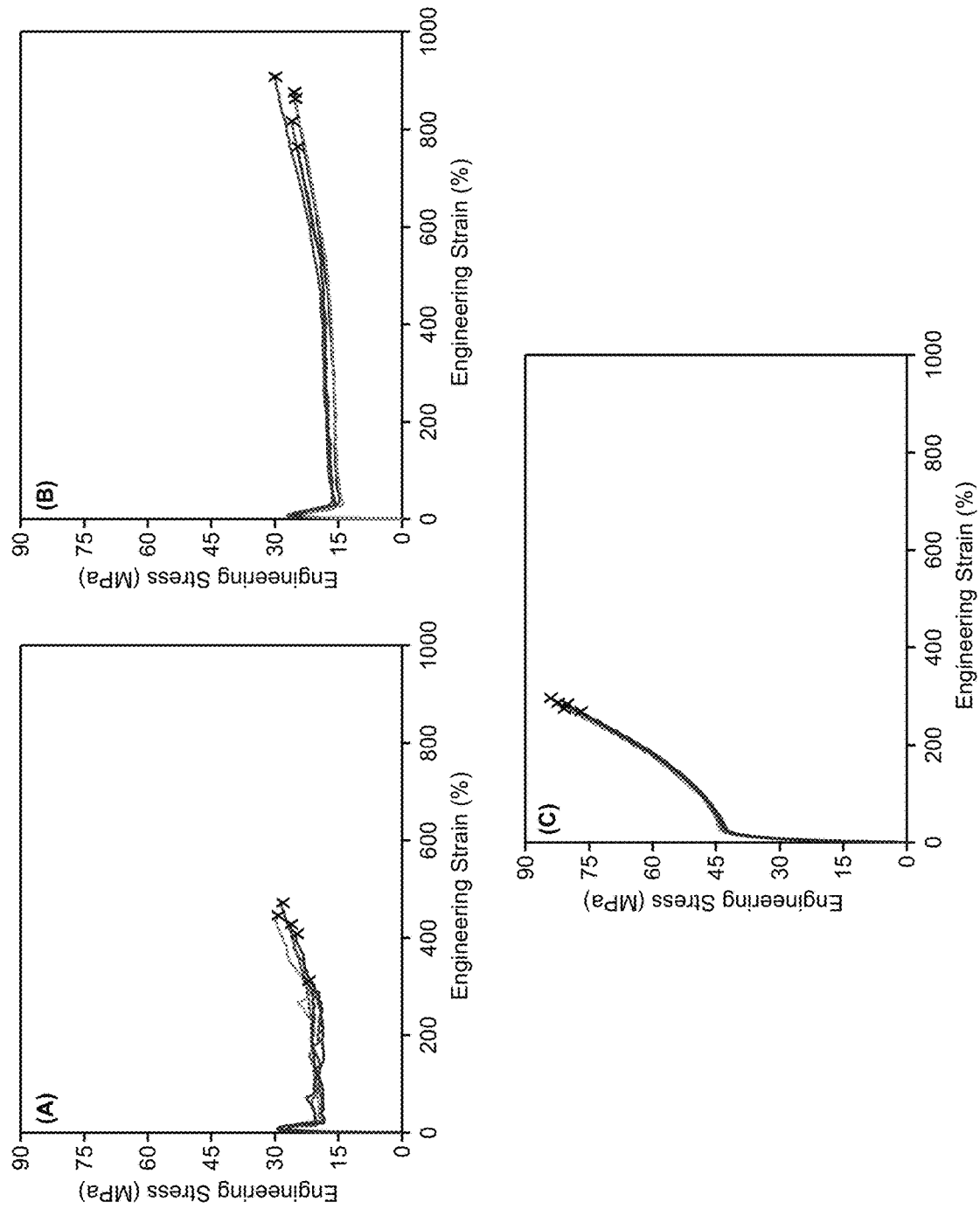
FIG. 61 shows compiled uniaxial tensile elongation of (A) iPP, (B) HDPE, and (C) nylon 6,6. Nylon 6,6 was strained at 23% strain min$^{-1}$ (5 mm min$^{-1}$) as higher strain rates did not match accepted values. (x=sample fracture).

An unexpected serrated response was observed during strain hardening (past ~100% strain) for all forms of iPPO (FIG. 3). Control experiments with commercial iPP, HDPE, and nylon 6,6 resins confirmed this effect was a consequence of the intensive properties of iPPO and not the experimental set up (FIG. 61). Although this behavior is more commonly observed in metals, stress oscillations (SOs) have been observed in a variety of common polymers such as HDPE, iPP, syndiotactic PP, polyethylene terephthalate, PAs, polyvinyl chloride, and bisphenol A polycarbonate. Without intending to be bound by any particular theory, it is considered that the response is the result of crazing and formation of microcavities within their poly(butylene succinate) specimens.

Figure 2:
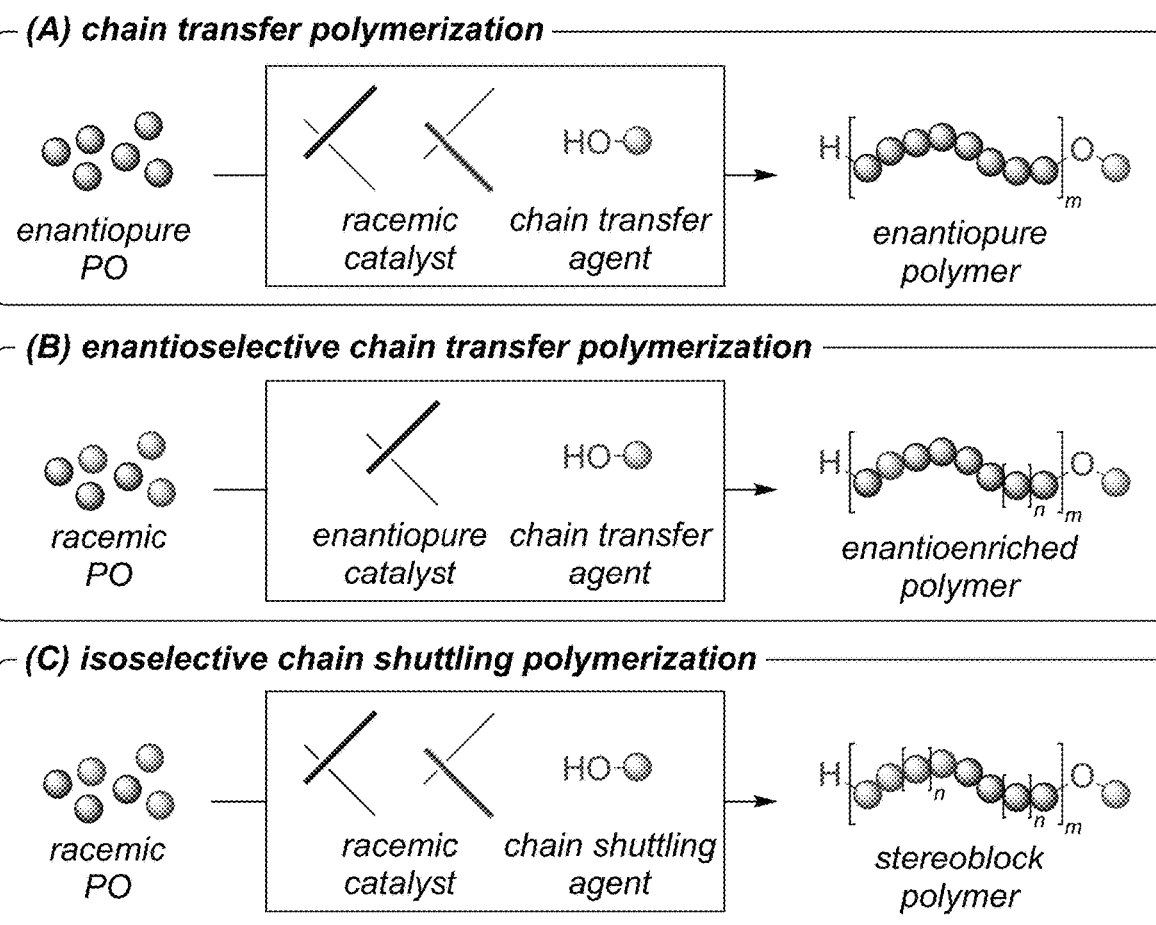
FIG. 2 shows general methods for iPPO synthesis in the presence of CTAs or CSAs.

Decades of investigation have shown SO dependence on temperature, strain rate, and the nature of the material. Due to the relatively low melting point of iPPO (68° C.), the SO temperature dependence was not investigated. Instead, the SO strain rate dependence was monitored between 0.10-1000% strain min$^{-1}$ (FIG. 2). When the strain rate was increased, there was a decrease in SO frequency. Increasing the strain rate above 100% strain min$^{-1}$ resulted in the decay and eventual disappearance of the serrated response, but caused a lower UTS. Tensile specimen shape was also found

TABLE 1

Synthesis of Various Stereoregular Configurations of Highly Isotactic iPPO by 1 and 1,6-Hexanediol[a]

| | Polymer | Method | | | Conv. | $M_n^{theo}$ | $M_n$GPC | | [mm] | |
|---|---|---|---|---|---|---|---|---|---|---|
| Entry | Stereochemistry | PO | 1 | PO:1,6-HD:1 | (%)[b] | (kDa)[c] | (kDa)[d] | Đ[d] | (%)[e] | $T_m^f$ |
| 1 | enantioenriched (S) | (rac) | (S) | 32000:15:1 | 61.5 | 71.8 | 104 | 2.68 | 96.9 | 66.1 |
| 2 | enantiopure (S) | (S) | (rac) | 8000:5:1 | 98.7 | 83.9 | 97.2 | 2.23 | >99.0 | 68.4 |
| 3 | enantiopure (R) | (R) | (rac) | 8000:5:1 | 98.4 | 83.5 | 99.4 | 2.37 | >99.0 | 68.6 |
| 4 | stereoblock (SB) | (rac) | (rac) | 16000:10:1 | 99.2 | 83.7 | 107 | 2.19 | 95.5 | 66.8 |
| 5 | racemic (rac)[g] | n.a. | n.a. | n.a. | n.a. | n.a. | 98.0 | 2.32 | >99.0 | 68.1 |

Figure 56:
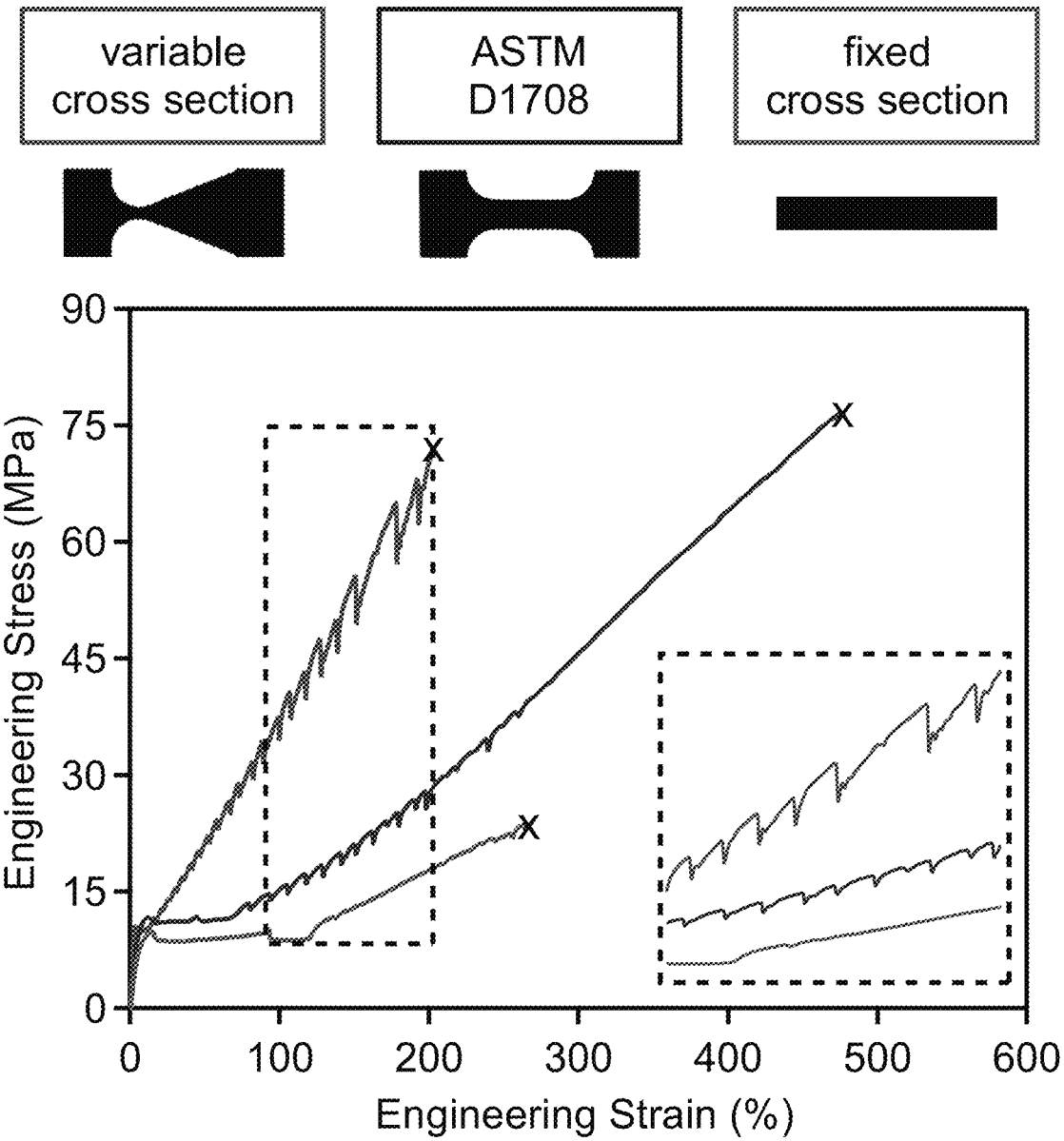
FIG. 56 shows representative stress-strain curves of enantioenriched (S)-iPPO (Table 1, Entry 1) of various tensile specimen shapes. Data in window is offset vertically for clarity. (x=sample fracture).
Figure 57:
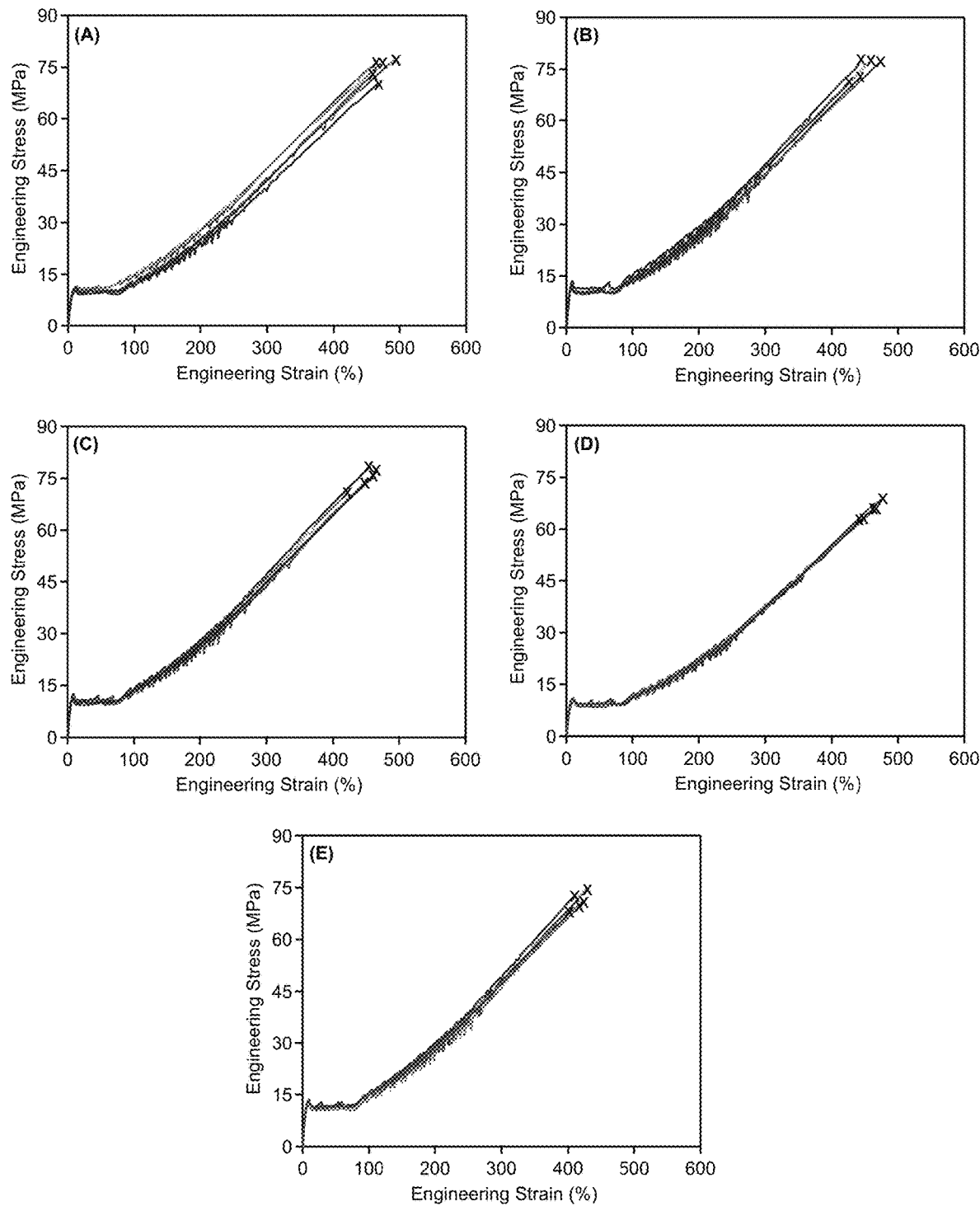
FIG. 57 shows compiled uniaxial tensile elongation of ~100 kDa (A) enantioenriched (S)-iPPO, (B) enantiopure (S)-iPPO, (C) enantiopure (R)-iPPO, (D) (SB)-iPPO, and (E) (rac)-iPPO (x=sample fracture).
Figure 58:
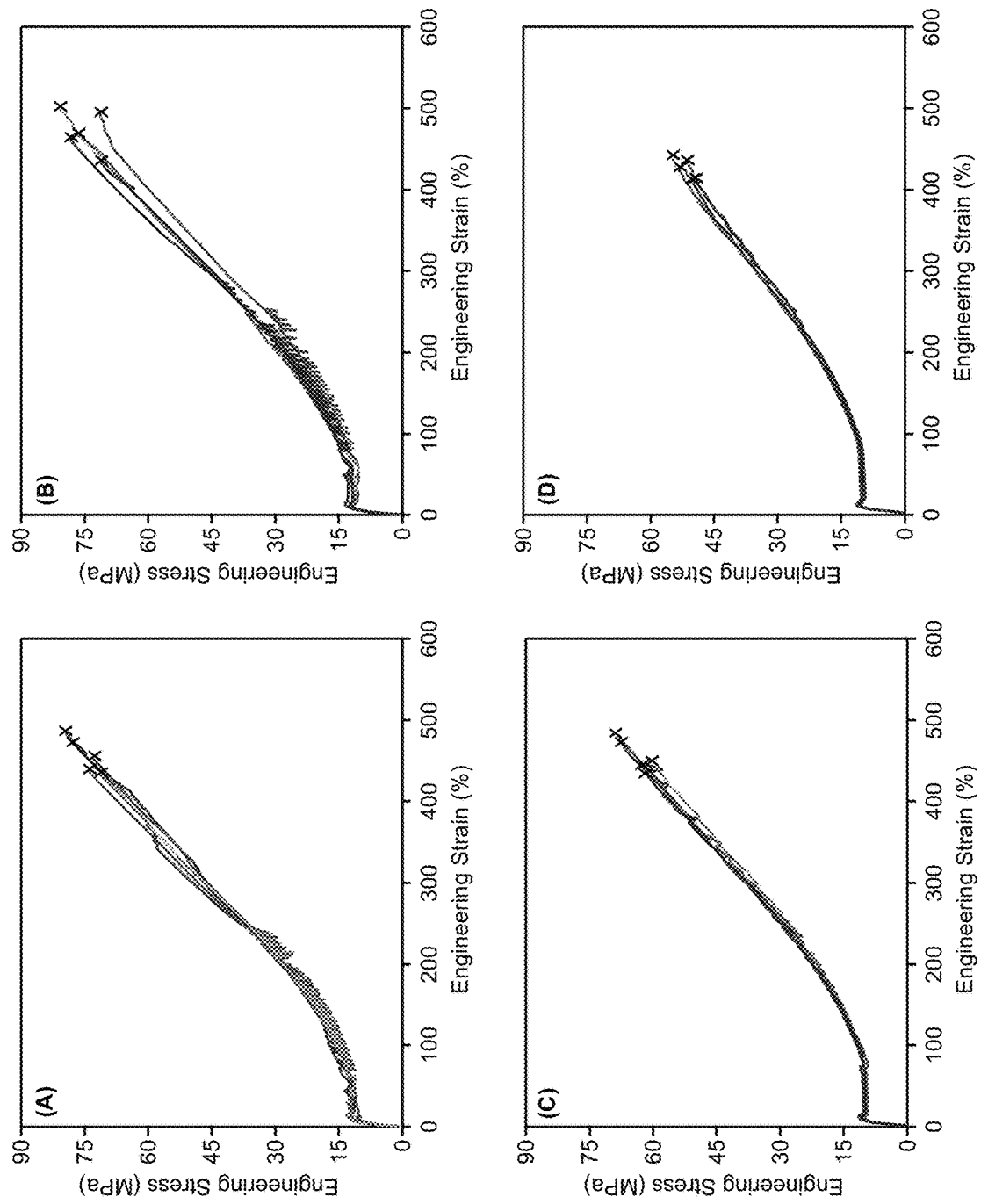
FIG. 58 shows compiled uniaxial tensile elongation of ~100 kDa enantioenriched (S)-iPPO at (A) 10%, (B) 50% (C) 500%, and (D) 1000% strain $min^{-1}$. (x=sample fracture).
Figure 59:
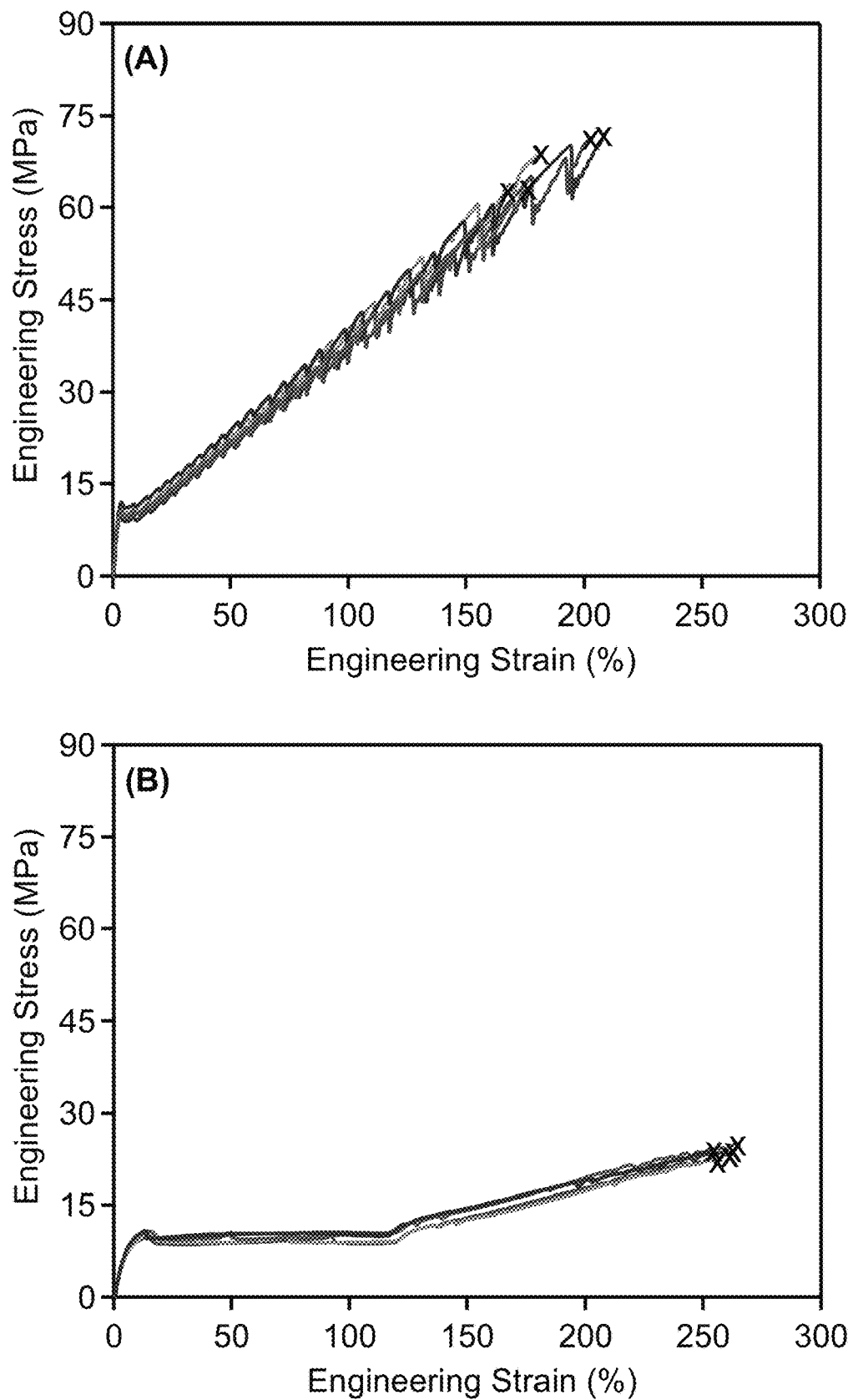
FIG. 59 shows compiled uniaxial tensile elongation of ~100 kDa enantioenriched (S)-iPPO as the (A) variable cross section shape and at the (B) fixed cross section shape. (x=sample fracture).
Figure 60:
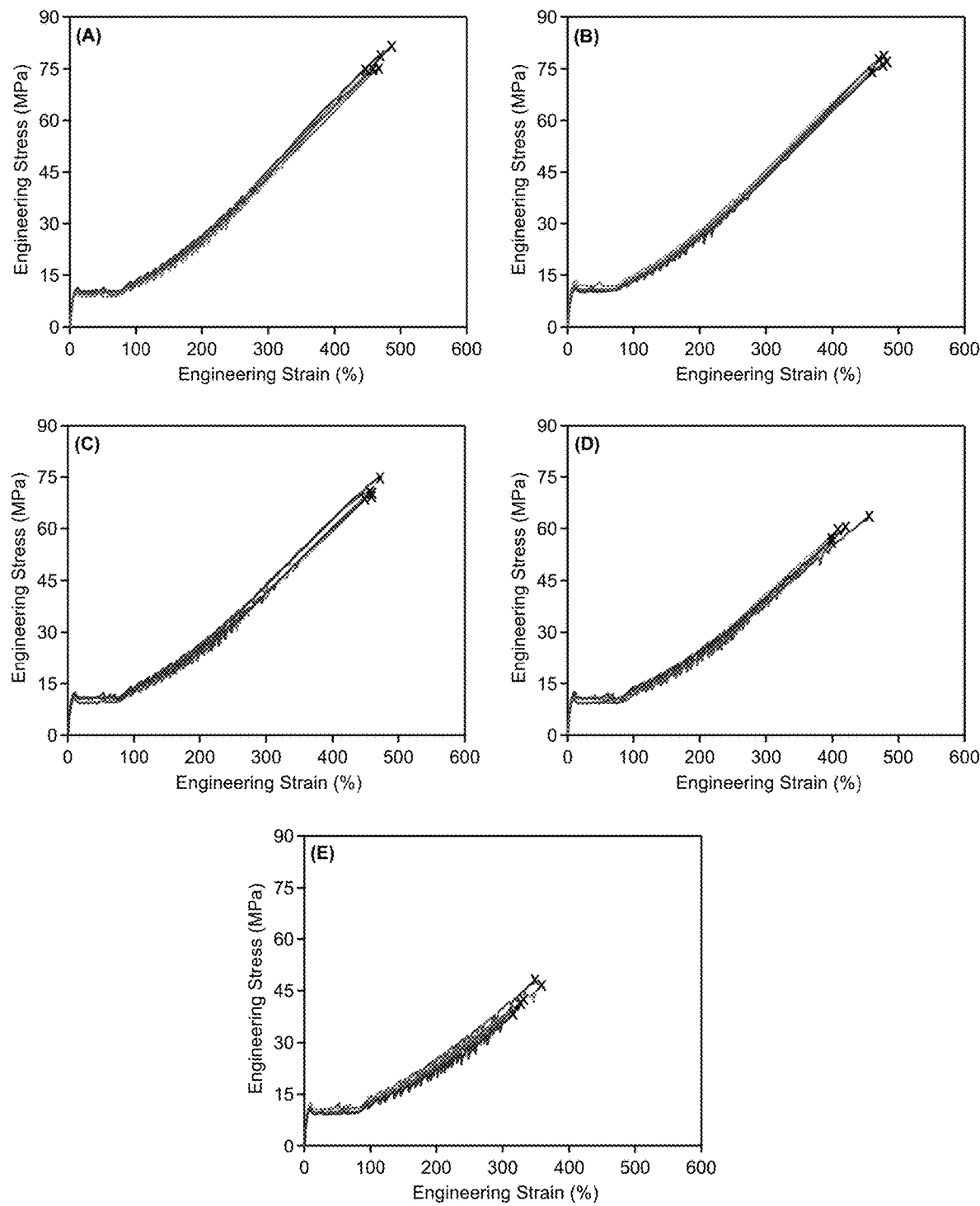
FIG. 60 shows compiled uniaxial tensile elongation of (A) 206 kDa, (B) 130 kDa, (C) 86 kDa, (D) 61 kDa, and (E) 49 kDa enantioenriched (S)-iPPO. (x=sample fracture).

[a]Polymerization conditions: As specified above, [1] = 0.86 mM in DME, 1:[PPN]Cl = 1:2, T$_{rxn}$ = 23° C., t$_{rxn}$ = 24 h.
[b]Determined gravimetrically.
[c]Calculated using one polymer chain per compatible 1 and 1,6-HD (see Eq. 1).
[d]Determined by GPC in THF, calibrated with polystyrene standards.
[e]Determined by $^{13}$C NMR spectroscopic analysis.
[f]Determined by differential scanning calorimetry (DSC). Reported values are from the second heat.
[g]1:1 solution blend by mass of entries 2 and 3. (n.a. = not applicable)

to affect the SO response (FIG. 56). In an effort to report the most consistent UTS values, a strain rate of 100% strain min$^{-1}$ was used for all other mechanical testing experiments.

Figure 5:
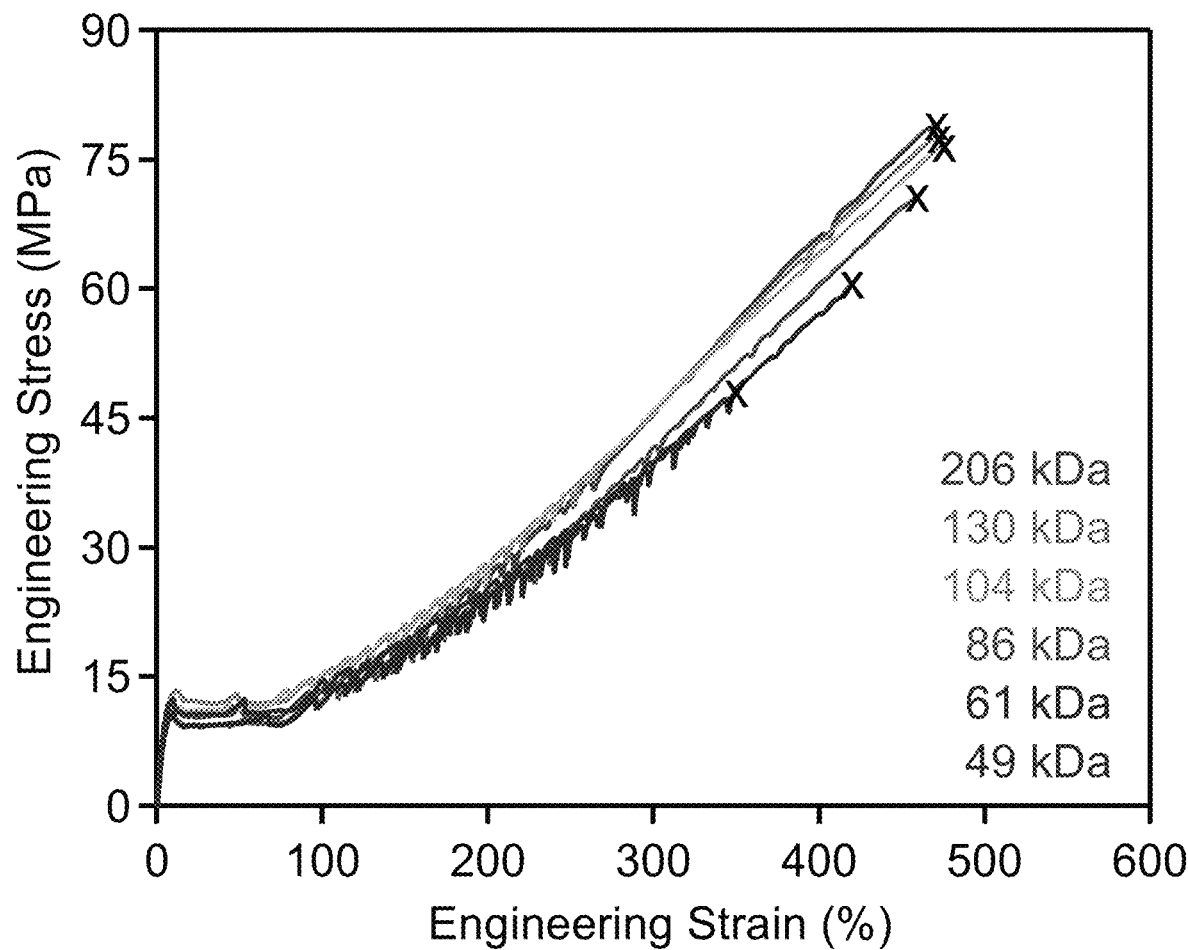
FIG. 5 shows representative stress-strain curves of various molecular weight enantioenriched (S)-iPPO (Table 2, Entries 1-6) strained at a rate of 100% strain $min^{-1}$. x=sample fracture.

To determine the upper UTS limit of iPPO, various molecular weights of enantioenriched (S)-iPPO were synthesized (Table 2). The $M_n$ of iPPO can be controlled by adjusting the catalyst to monomer ratio, but changing the CTA loading provides the same effect without the need for higher catalyst loadings. Polymers were synthesized with $M_n$ values ranging from 49 to 206 kDa. Each sample exhibited the same approximate tacticity, Đ, and yield strength (~12 MPa). $M_n$ values above 100 kDa resulted in negligible tensile improvement as the 206, 130, and 104 kDa samples (Table 2, Entry 1-3) exhibited similar UTSs (FIG. 5). A small loss in tensile strength was observed when the $M_n$ decreased below 104 kDa. Remarkably, the 49 kDa polymer (Table 2, Entry 6) still produced an ultimate stress of 48 MPa.

Figure 6:
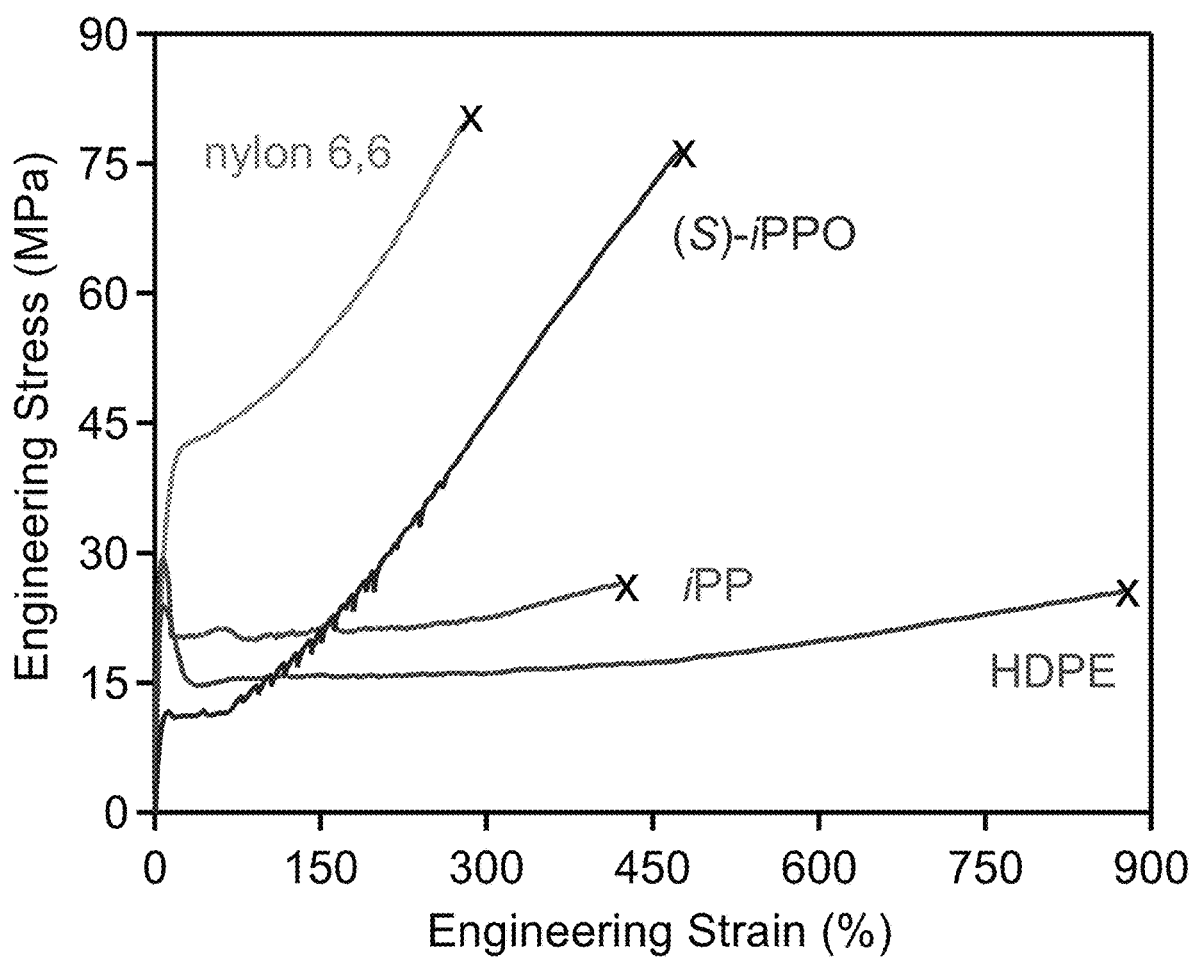
FIG. 6 shows representative stress-strain curves of enantioenriched (S)-iPPO (Table 1, Entry 1) and commercial iPP, HDPE, and nylon 6,6 resins. x=sample fracture.

With the upper UTS limit of iPPO was identified, a direct comparison to a few commercial plastics commonly used as high strength synthetic fibers (iPP, HDPE, and nylon 6,6) was performed. Although iPPO exhibited a relatively low yield stress, its strain hardening resulted in an UTS that surpassed commercial polyolefins (FIG. 6). Nylon 6,6 provided a much closer comparison, where the stress at break only differed by a few MPa. Notably, the elastic modulus of iPPO (~275 MPa) is lower than both commercial polyolefins (iPP: 1200 MPa, HDPE: 1250 MPa) and nylon 6,6 (725 MPa). The immense strength resulting from the strain hardening of iPPO provides a material that rivals the strength of nylon 6,6.

TABLE 2

Synthesis of Enantioenriched (S)-iPPO with Varied Molecular Weight at Low Catalyst Loading$^a$.

| Entry | 1,6-HD/(S)-1 | $M_n^{theo.}$ (kDa)$^b$ | $M_n^{GPC}$ (kDa)$^c$ | Đ$^c$ | [mm] (%)$^d$ |
|---|---|---|---|---|---|
| 1 | 5 | 182 | 206 | 2.24 | 96.4 |
| 2 | 10 | 109 | 130 | 2.90 | 97.9 |
| 3 | 15 | 76.0 | 104 | 2.68 | 96.9 |
| 4 | 20 | 52.6 | 86.4 | 2.36 | 95.6 |
| 5 | 30 | 36.3 | 60.5 | 2.32 | 96.0 |
| 6 | 41 | 27.2 | 48.9 | 2.31 | 96.2 |

$^a$Polymerization conditions: (rac)-PO:(S)-1:[PPN]Cl = 32000:1:2,[(S)-1] = 0.86 mM in DME, $T_{rxn}$ = 23° C., $t_{rxn}$ = 24 h.
$^b$Calculated using one polymer chain per (S)-1 and 1,6-HD (see Eq. 1).
$^c$Determined by GPC in THF, calibrated with polystyrene standards.
$^d$Determined by $^{13}$C NMR spectroscopic analysis.

Figure 7:
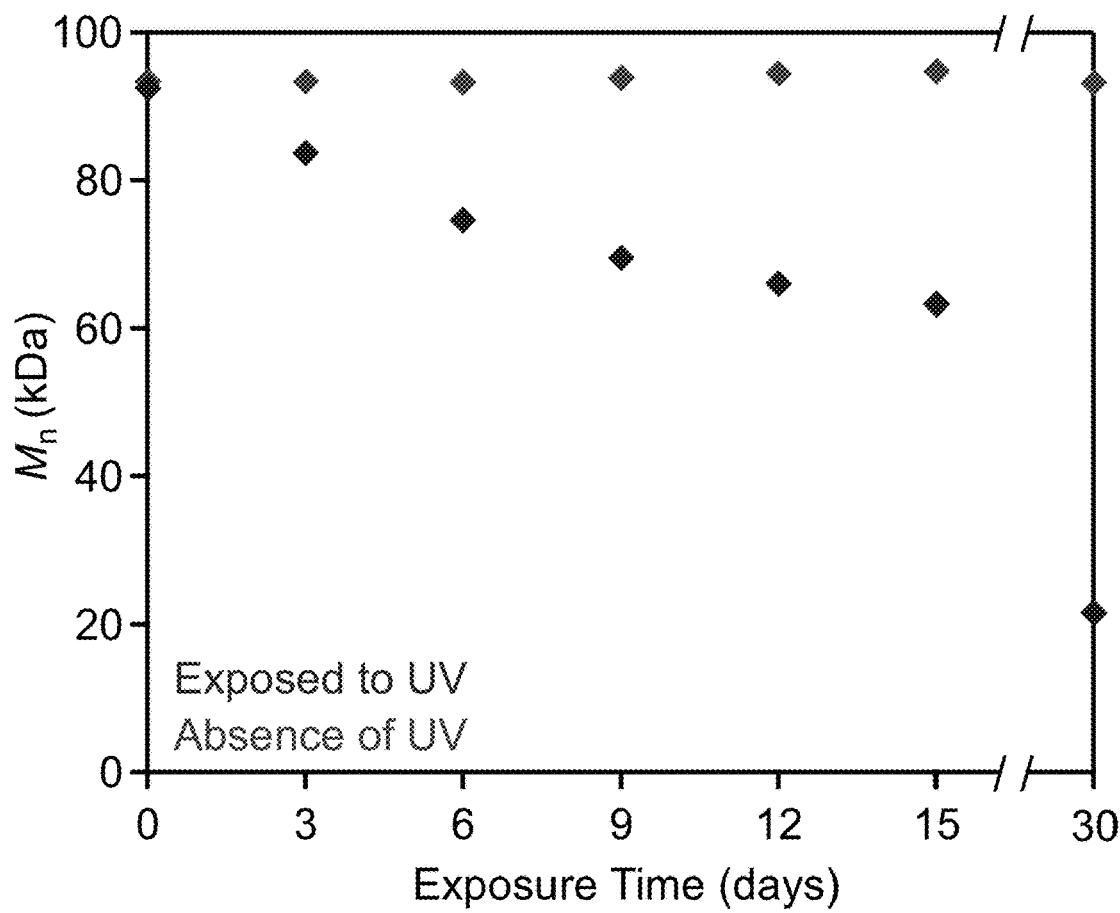
FIG. 7 shows UVA degradation of enantioenriched (S)-iPPO monitored by change in $M_n$.
Figure 8:
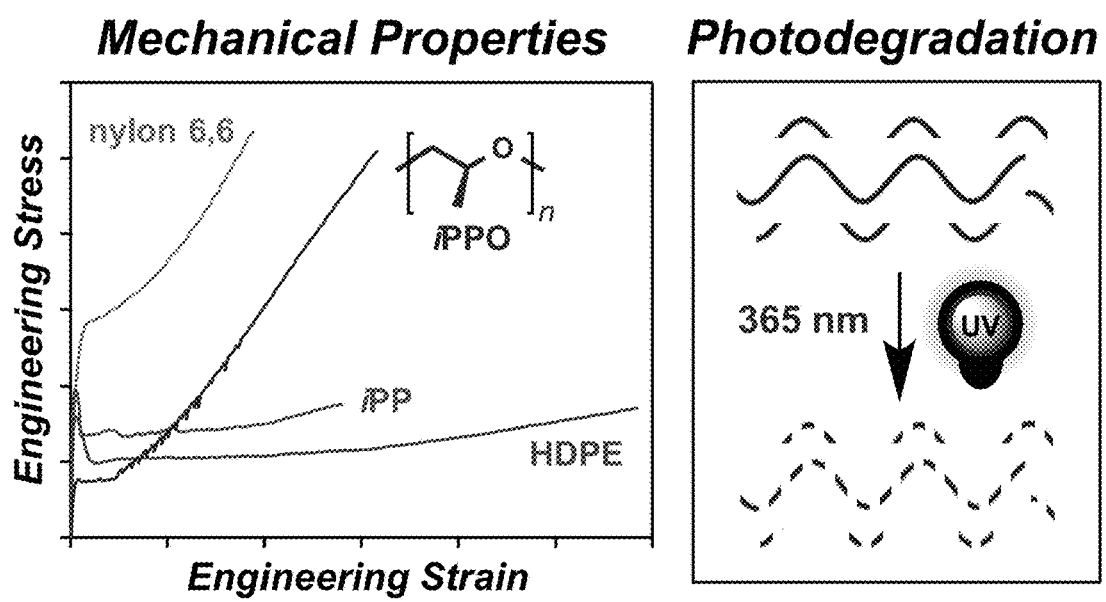
FIG. 8 shows data and a cartoon illustrating the mechanical properties and photodegradation of a polymer of the present disclosure.
Figure 9:
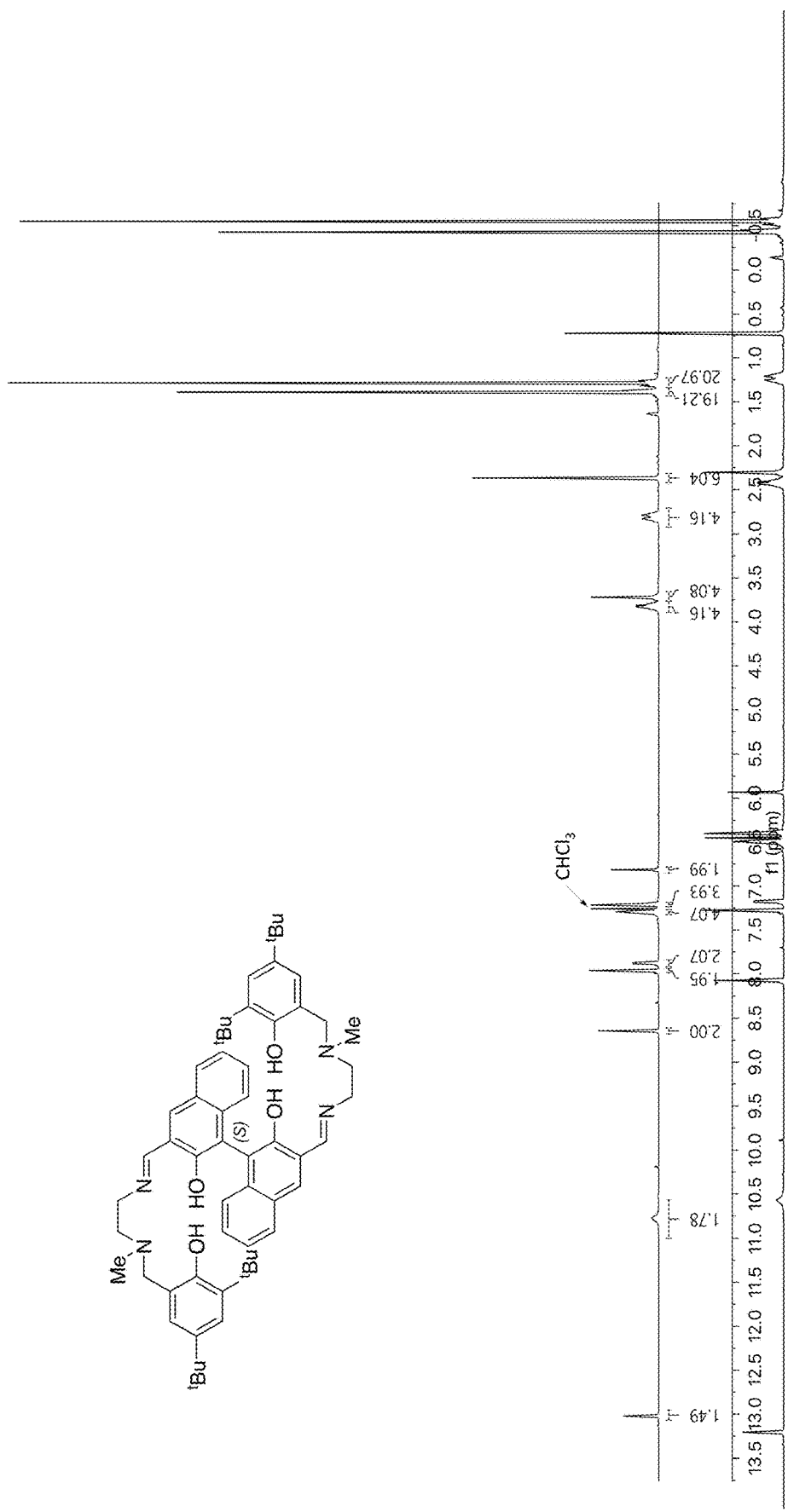
FIG. 9 shows $^1$H NMR spectrum of (S)-Ligand.
Figure 10:
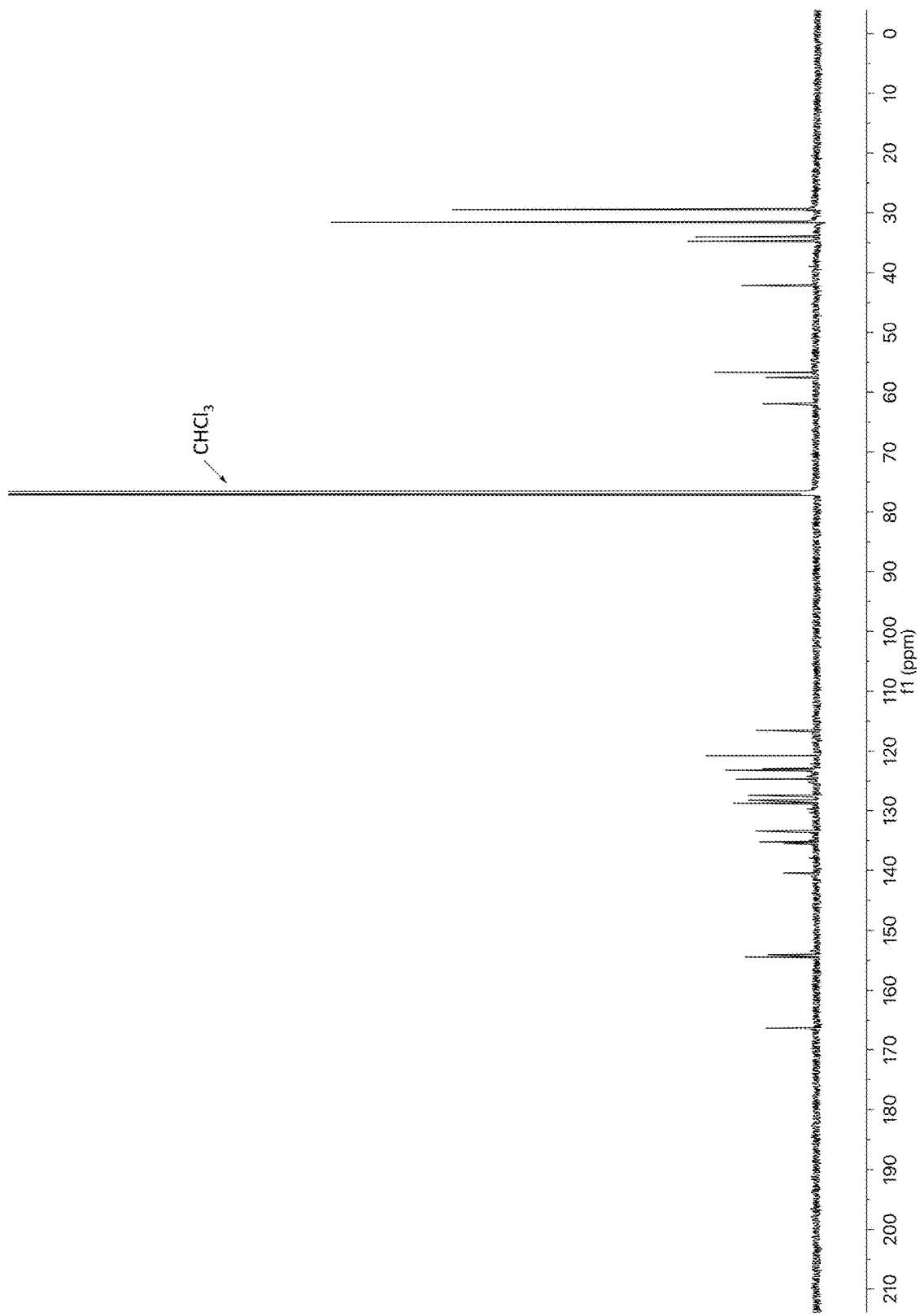
FIG. 10 shows $^{13}$C NMR spectrum of (S)-Ligand.

With iPPO showing competency as a high strength polymer, its degradation under ambient conditions in the presence of UVA light was monitored. Solar UVA intensity varies dramatically based on location, season, and time of day. Typical mean daytime intensities for the United States range 1050-2490 μW cm$^{-2}$. Herein, a less intense, but continuous and consistent exposure was implemented. A sample of enantioenriched (S)-iPPO was exposed to UVA light (365 nm) for 30 days at an intensity of 250 μW cm$^{-2}$. Degradation was monitored by gel permeation chromatography (GPC) to quantify the change in polymer $M_n$. Broadening of the dispersity was anticipated by random chain scission, but the high initial Đ value (>2.0) masked this effect. The exposed sample started to degrade in as little as 3 days, evident by a 9 kDa drop in $M_n$ (FIG. 7, blue). The $M_n$ continued to decrease resulting in a loss of 29 kDa over the first 15 days. A final measurement was collected after 30 days of continuous exposure, indicating the polymer $M_n$ had decreased from 93 to 21 kDa. Degradation of the same material in the absence of UVA light was also monitored (FIG. 7, red). After the full 30 days, the $M_n$ remained unchanged, consistent with no degradation.

Figure 62:
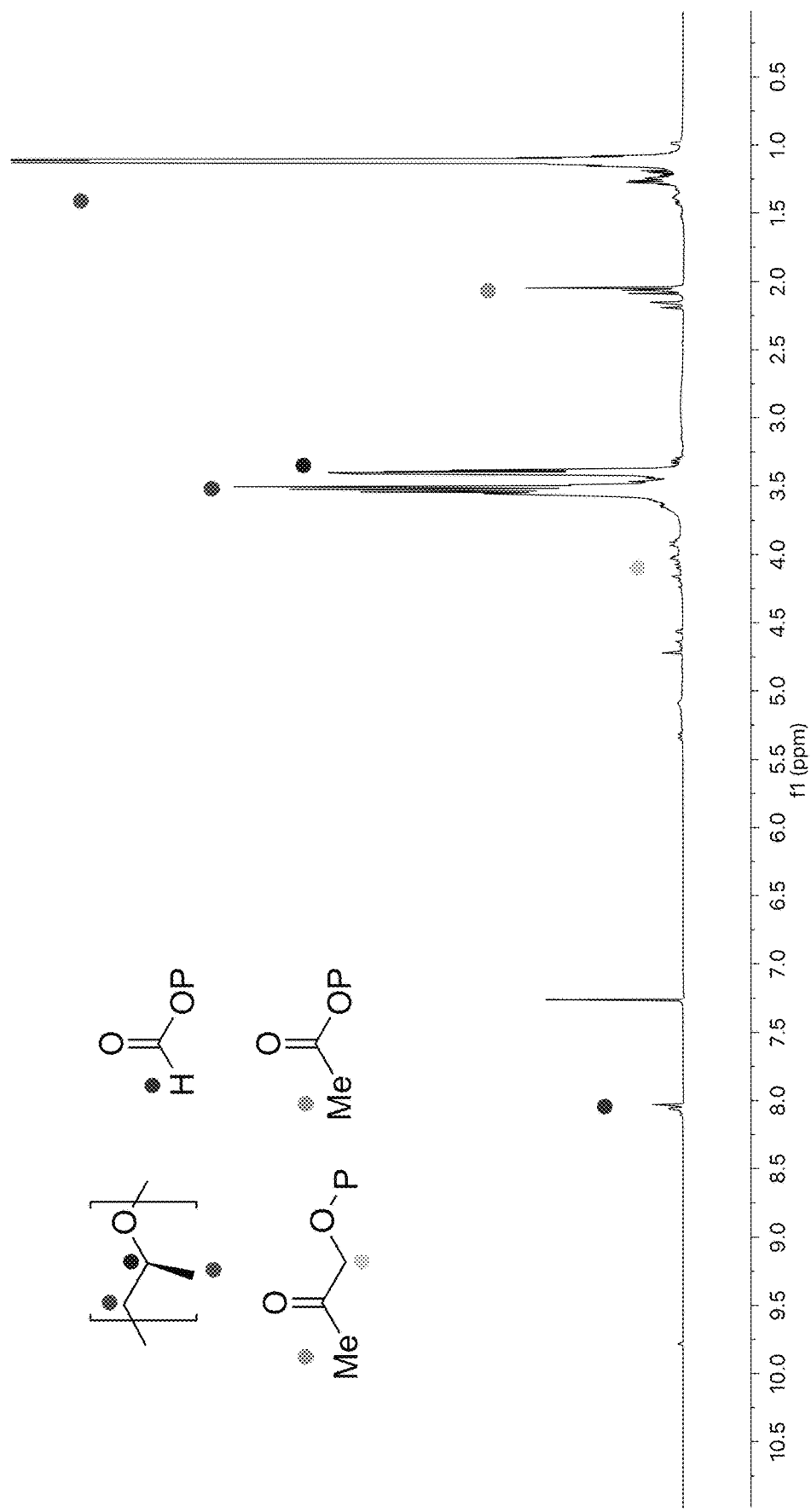
FIG. 62 shows $^1$H NMR of iPPO after UVA exposure. Degradation signals assigned based on known values.
Figure 63:
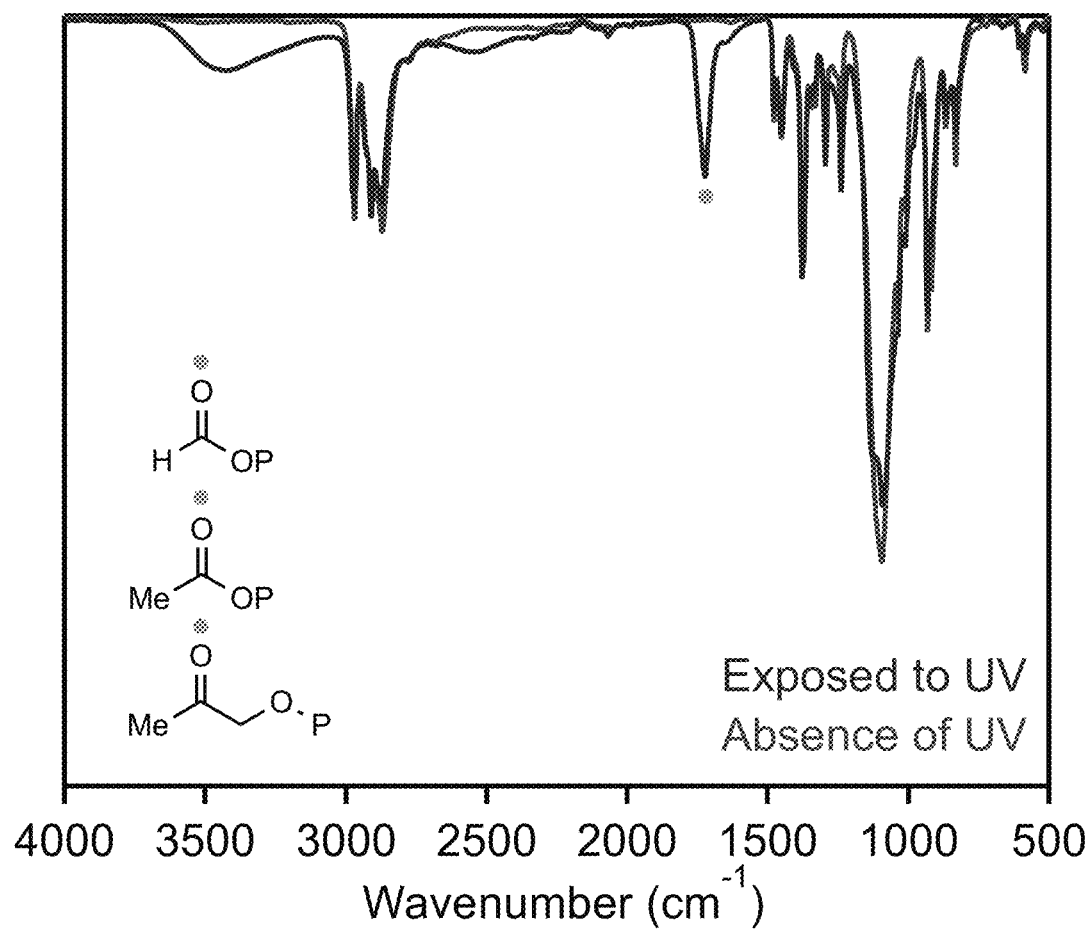
FIG. 63 shows IR spectrum of (S)-iPPO exposed (blue) and not exposed to (red) UVA light.
Figure 64:
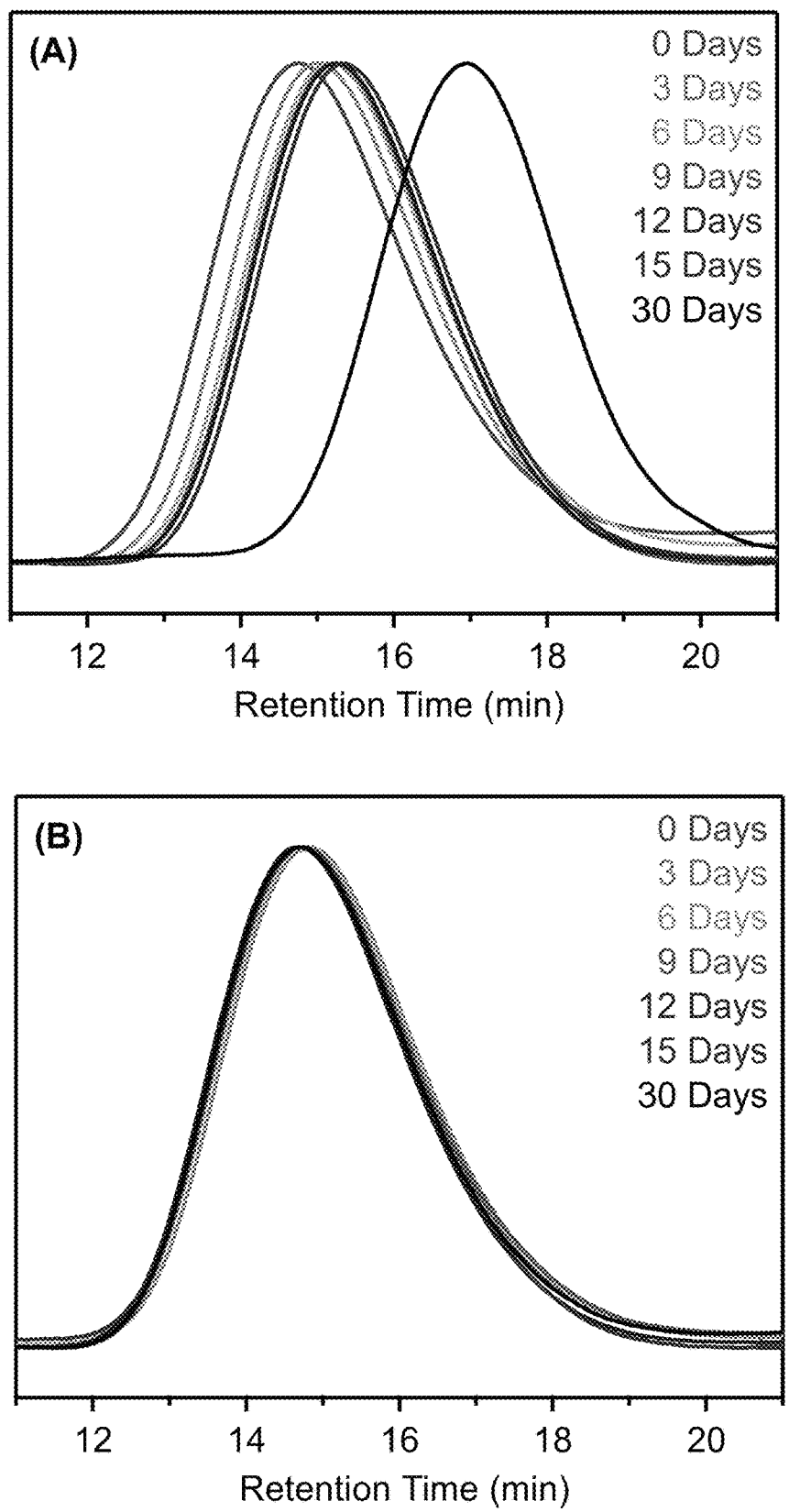
FIG. 64 shows GPC chromatograms of (S)-iPPO exposed (A) and not exposed to (B) UVA light.

In the interest of further understanding the degradation mechanism, enantioenriched (S)-iPPO was analyzed by NMR and infrared (IR) spectroscopy after UVA exposure. $^1$H NMR spectroscopic comparison with the products of thermally degraded aPPO suggests that iPPO degrades via an autoxidation mechanism (FIG. 62). Signals corresponding to the formation of formyl and acetyl end groups were observed in both degraded materials. IR spectroscopy supports these assignments with the notable appearance of a C=O absorbance at ~1730 cm$^{-1}$ (FIG. 63).

Small molecule anti-oxidants are often employed as radical stabilizers in commercial polyethers and polyurethanes. Since radical sequestration is limited by stabilizer loading, polymer lifetime can be programmed to its application. Ongoing investigations aim to determine if the iPPO can be selectively stabilized by using commercial polymer additives.

Conclusion

In summary, iPPO has shown promise as a high strength photodegradable polymer for applications at ambient conditions. While iPPO was synthesized in a variety of stereoregular forms, no substantial differences were observed in their tensile properties. Investigating the strength dependence on $M_n$ revealed the upper UTS limit to be 75 MPa. The serrated response observed during strain hardening was a result of strain rate and intensive material properties. The robust strain hardening of this material generates an ultimate strength comparable to that of nylon 6,6. iPPO also showed photodegradation under continuous UVA exposure, reducing the $M_n$ by 75% within 30 days.

General Considerations.

All manipulations of air- and/or water-sensitive compounds were carried out under dry nitrogen using an MBraun Labmaster glovebox or standard Schlenk line techniques. NMR spectra were recorded on a 500 MHz Bruker AV III HD spectrometer with broadband Prodigy Cryoprobe ($^1$H, 500 MHz). $^1$H NMR spectra were referenced with residual solvent shifts (CHCl$_3$=7.26 ppm). $^{13}$C NMR spectra were referenced by solvent shifts (CHCl$_3$=77.16 ppm). High-resolution mass spectrometry (HRMS) analyses were performed on a Thermo Scientific Exactive Orbitrap MS system equipped with an Ion Sense DART ion source. Infrared spectroscopy was performed using a Bruker Tensor II FT-ATR Spectrometer.

Materials.

HPLC grade methylene chloride, methanol (MeOH), tetrahydrofuran (THF), and hexane were purchased from Fisher Scientific, purified over solvent columns, and degassed by three freeze-pump-thaw cycles. Dimethoxyethane (DME) was purchased from Sigma-Aldrich and dried over Na/benzophenone, then vacuum transferred and degassed by three freeze-pump-thaw cycles. Propylene oxide (PO) was purchased from Sigma-Aldrich and dried over calcium hydride for three days before vacuum transferred to a Straus storage flask. PO was degassed by three freeze-pump-thaw cycles. Bis(triphenylphosphine)iminium chloride ([PPN]Cl) was purchased from Sigma-Aldrich, recrystallized at room temperature over 5 days from anhydrous methylene chloride/hexane and dried at 80° C. under vacuum overnight. 3 Å molecular sieves were purchased from Strem and activated by heating at 200° C. under vacuum for 18 hours. Triethylamine was purchased from Sigma-Aldrich and degassed before use. N-Methylethylenediamine was purchased from Acros Organics and used as received. Chromium(II) chloride was purchased from Strem Chemicals and stored under a nitrogen atmosphere. 1,6-Hexanediol (1,6-HD) was purchased from Sigma-Aldrich and was sublimed before use. 3,5-Di-tert-butyl-2-hydroxybenzyl bromide, (S)-3,3'-diformyl-2,2'-dihydroxy-1,1'-bi-2-naphthol and (rac)-1 were synthesized as previously described. (R)- and (S)—PO were resolved as described in the literature. Isotactic poly(propylene) (iPP) (H314-02Z) and high-density poly(ethylene) (HDPE) (DMDA8904) were obtained from the Dow Chemical Company. Nylon 6,6 (TECAMID 66 natural) was obtained from Ensinger. All other reagents were purchased from commercial sources and used as received.

Synthetic Procedures.
Synthesis of (S)-Ligand.

The ligand and chromium complex were synthesized in a similar manner to the racemic versions. In a Schlenk tube, (S)-3,3'-diformyl-2,2'-dihydroxy-1,1'-bi-2-naphthol (650 mg, 1.9 mmol) and MeOH (25 mL) were combined under nitrogen to form a yellow slurry. N-Methylethylenediamine (0.66 mL, 7.6 mmol) was added by syringe, forming a homogeneous red solution over the course of 1 hour, then volatiles were removed under vacuum at 40° C. to yield a yellow foam. This solid was dissolved in THF (12 mL) and triethylamine (0.60 ml, 4.2 mmol) under nitrogen. In a separate Schlenk tube, 3,5-di-tert-butyl-2-hydroxybenzyl bromide (1.13 g, 3.8 mmol) and THF (12 mL), were combined then transferred by cannula to the crude product of (S)-3,3'-diformyl-2,2'-dihydroxy-1,1'-bi-2-naphthol and N-methylethylenediamine forming a fine precipitate. After stirring overnight, the reaction mixture was filtered through a pad of Celite and the solvent was removed via rotary evaporation. The resulting solid was dissolved in methylene chloride and added drop wise to cold MeOH (100 mL) to yield 380 mg of a yellow powder (22% yield). $^1$H NMR (CDCl$_3$, 500 MHz) δ (ppm) 13.02 (b, 1H), 10.78 (b, 1H), 8.66 (s, 1H), 7.96 (s, 1H), 7.88 (m, 1H), 7.30 (m, 2H), 7.22 (d, J=1.7 Hz, 1H), 7.18 (m, 1H), 6.82 (d, J=1.7 Hz, 1H), 3.81 (m, 2H), 3.74 (s, 2H), 2.80 (m, 2H), 2.38 (s, 3H), 1.39 (s, 9H), 1.28 (s, 9H). $^{13}$C NMR (CDCl$_3$, 125 MHz) δ (ppm) 166.59, 154.70, 154.33, 140.69, 135.74, 135.49, 133.66, 129.01, 128.52, 127.71, 124.94, 123.46, 123.41, 123.16, 120.99, 120.97, 116.78, 62.22, 57.82, 56.93, 42.37, 34.97, 34.26, 31.82, 29.71. HRMS-ESI (m/z): calculated for C$_{58}$H$_{75}$N$_4$O$_4$ 891.5781; found, 891.5812.

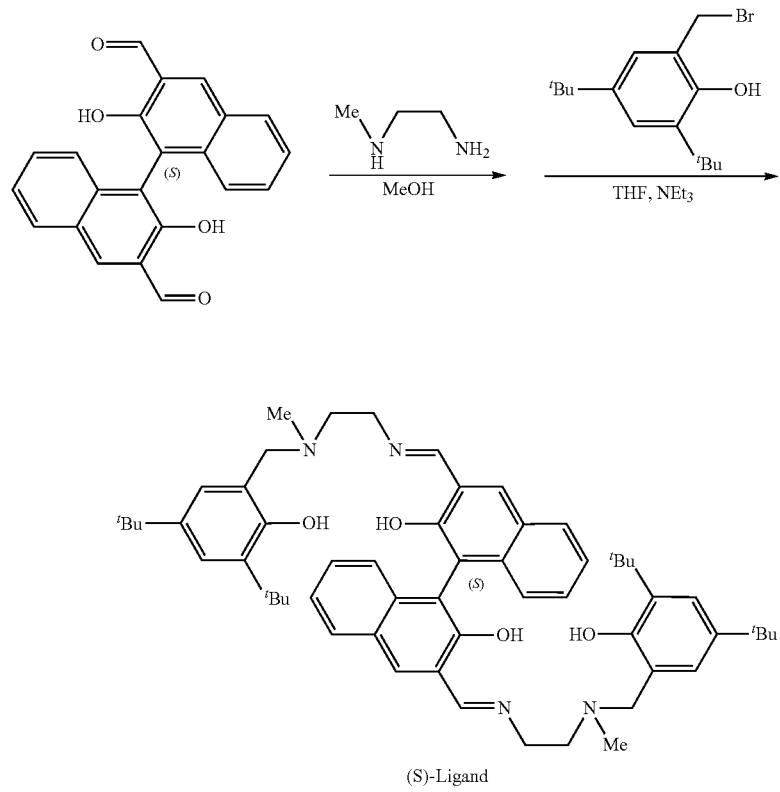

(S)-Ligand

Synthesis of (S)-1.

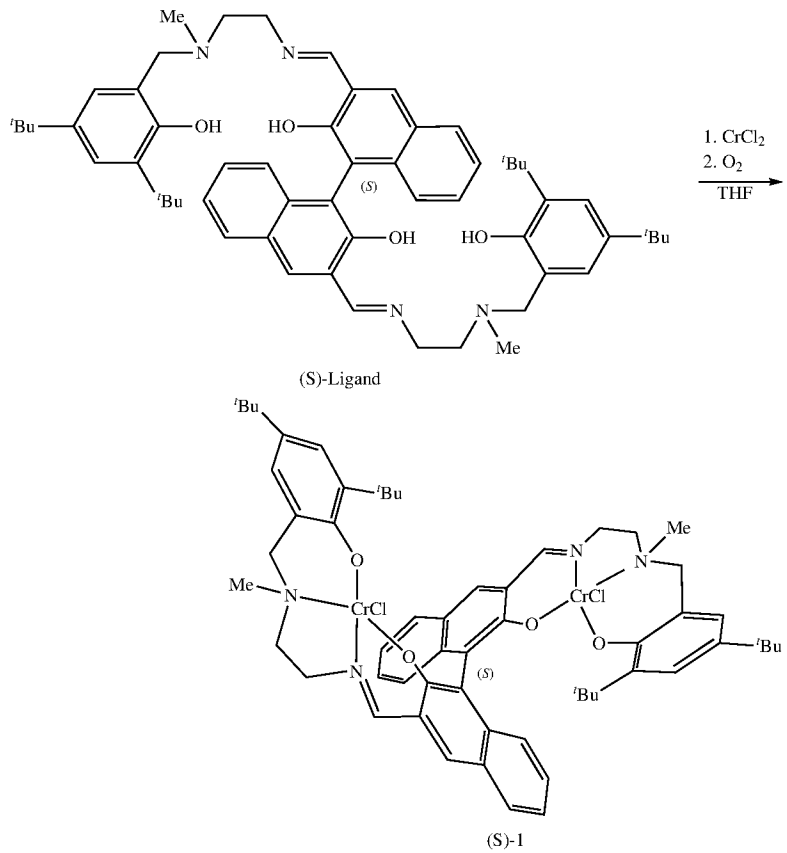

(S)-Ligand (S)-1

In a Schlenk tube, (S)-Ligand (330 mg, 0.37 mmol) and THF (15 mL) were combined under a nitrogen atmosphere. Chromium(II) chloride (98 mg, 0.80 mmol) was added to a separate Schlenk tube and sealed before being removed from a nitrogen filled glovebox. THF (15 mL) was added to the Chromium(II) chloride via cannula to yield a heterogeneous gray mixture. The solution of (S)-Ligand in THF was then added to the suspension of chromium(II) chloride. The reaction was stirred at 40° C. for three hours during which the solution became homogeneous and dark brown in appearance. After cooling to room temperature, the flask was opened to dry air and stirred overnight. The reaction mixture was diluted with diethyl ether (20 mL), washed with saturated aqueous ammonium chloride (3×), and saturated aqueous sodium chloride (3×). The organic layer was then dried over $Na_2SO_4$, filtered, and dried under vacuum. The resulting solid was sonicated in pentanes and filtered over a fine glass frit to yield 340 mg of (S)-1 as a red-black solid, 87% yield. $^1$H NMR of (S)-1 confirmed that the species was paramagnetic. HRMS-ESI using MeOH as a solvent (m/z): calculated for $C_{58}H_{70}Cr_2N_4O_4^{2+}$ (2-2Cl$^-$), 495.2104; found, 495.2118.

Polymer Characterization Methods.

Gel permeation chromatography (GPC) was performed using an Agilent 1260 Infinity system, equipped with UV and refractive index detectors, and two Agilent PolyPore columns (5 micron, 4.6 mm ID). The GPC columns were eluted with THF at 30° C. at 0.3 mL/min and were calibrated with monodisperse polystyrene standards.

Polymer melting points ($T_m$) were measured using a TA Instruments Q1000 Modulated Differential Scanning calorimeter. Polymer samples were heated under nitrogen from 20° C. to 130° C. at a rate of 10° C. per minute and then cooled to −80° C. at a rate of 10° C. per minute, followed heating to 150° C. at a rate of 10° C. per minute. The $T_m$ was recorded from the second heating run. Glass transition temperatures were not observed for iPPO.

$M_n$ theoretical was calculated according to Eq. 1. Compatible catalyst is defined as an initiating species. Note that (R)-1 is not an initiating species in Table 1, Entry 2 and (S)-1 is not an initiating species in Table 1, Entry 3.

$$M_n \text{theoretical} = \frac{\text{mg crude} - \text{mg cat} - \text{mg cocat}}{\text{mmol compatible cat} + \text{mmol } CTA/CSA} \quad (1)$$

NMR Quantification of Polymer Tacticity.

Although there is some overlap of the mr and rm peaks, the polyethers synthesized in this paper exhibit triad resolution of the methine carbon. Due to this overlap, [mr] and [rm] were determined from [rr]. The mm (δ=75.62 ppm), clearly visible $^{13}$C satellite upfield of mm, mr+rm (δ=75.46, 75.42 ppm), and rr (δ=75.22 ppm) peaks were integrated separately.

$$\text{mm}_{total} = \int \text{mm} + 2 \times \int \text{mm}_{satellite} \quad (2)$$

$$(mr + rm)_{total} = \int mr + \int rm - \int \text{mm}_{satellite} \quad (3)$$

$$rr_{total} = \int rr \quad (4)$$

$$[mm] = \frac{mm_{total}}{mm_{total} + (mr + rm)_{total} + rr_{total}} \quad (5)$$

$$([mr] + [rm]) = \frac{(mr + rm)_{total}}{mm_{total} + (mr + rm)_{total} + rr_{total}} \quad (6)$$

$$[rr] = \frac{rr_{total}}{mm_{total} + (mr + rm)_{total} + rr_{total}} \quad (7)$$

Polymerization Procedures and Polymer Characterization Data.

General procedure: In a nitrogen filled glovebox, 1 (1 equiv.), [PPN]Cl (2 equiv.), the appropriate amounts of 1,6-HD, DME, and (x)-PO were added to a Schlenk tube. Each reaction was removed from the glovebox and stirred in a room temperature water bath for 24 h. Conversion was determined by the isolated crude polymer while accounting for residual 1 and [PPN]Cl. Each polymer was purified by stirring in methylene chloride overnight in the presence of activated carbon followed by filtering through Celite and removal of volatiles under vacuum.

Figure 11:
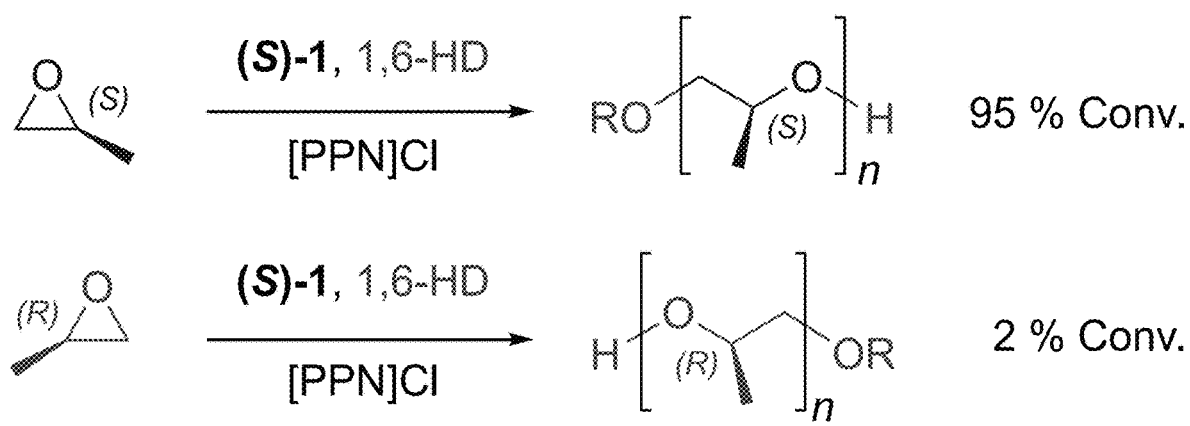
Figure 12:
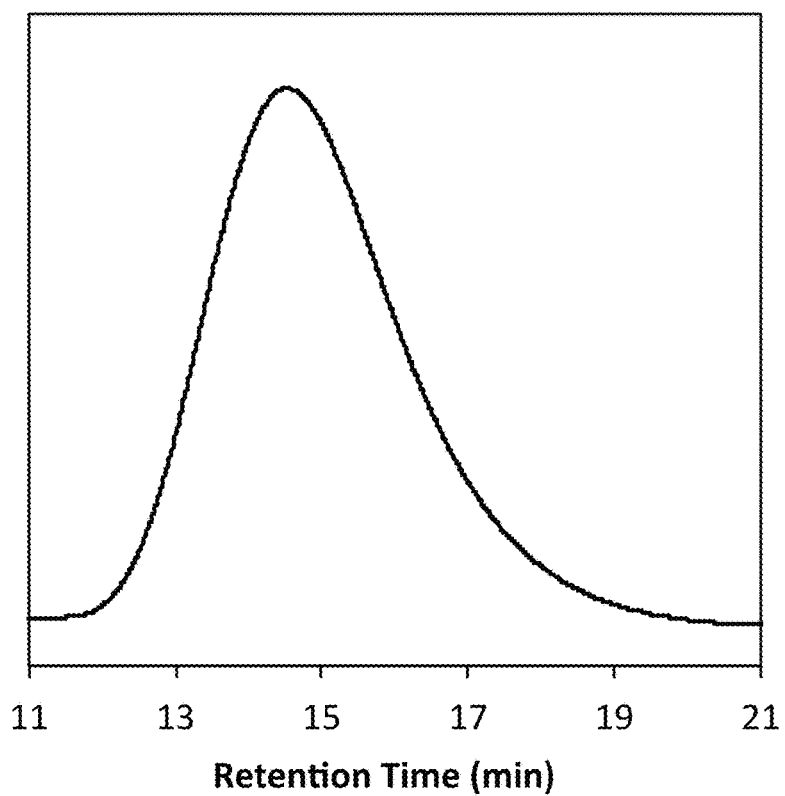
FIG. 12 shows GPC chromatogram of the polymer of Table 1, Entry 1.
Figure 13:
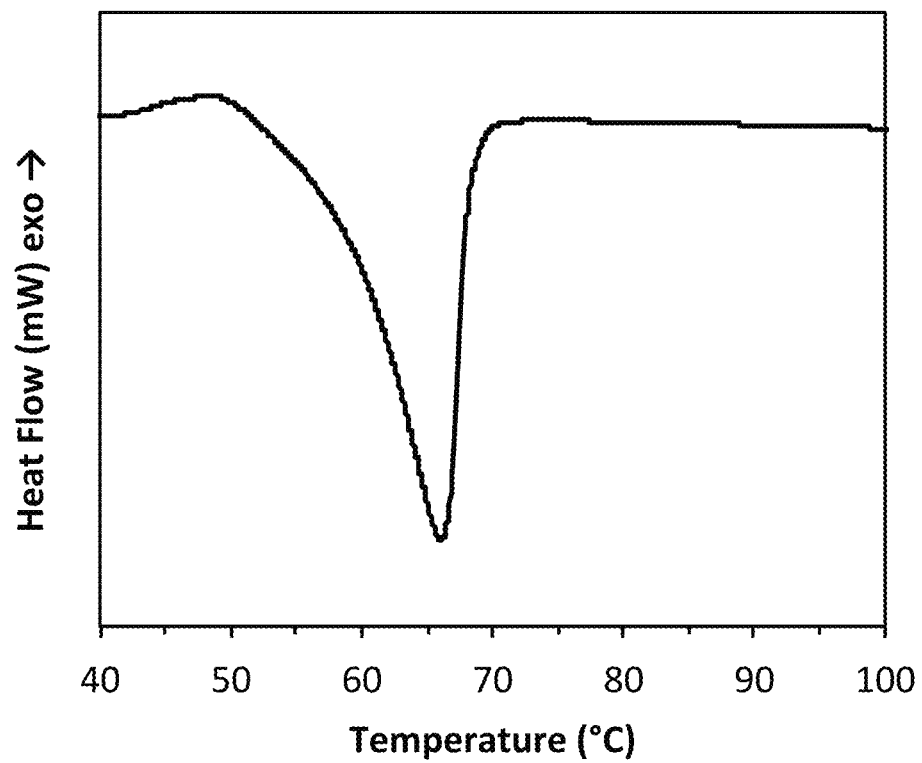
FIG. 13 shows DSC thermogram of the polymer of Table 1, Entry 1.
Figure 14:
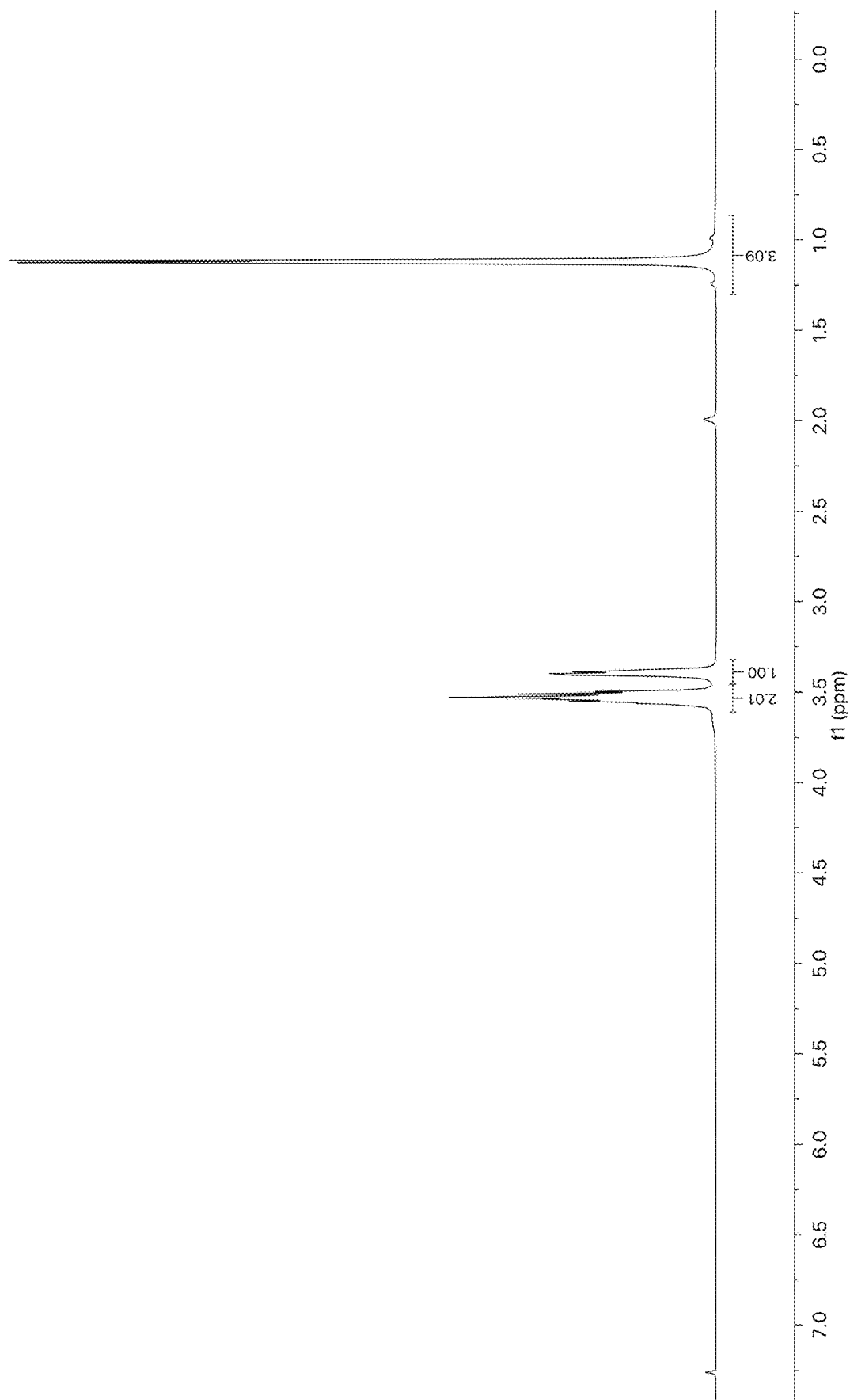
FIG. 14 shows $^1$H NMR spectrum of the polymer of Table 1, Entry 1.
Figure 15:
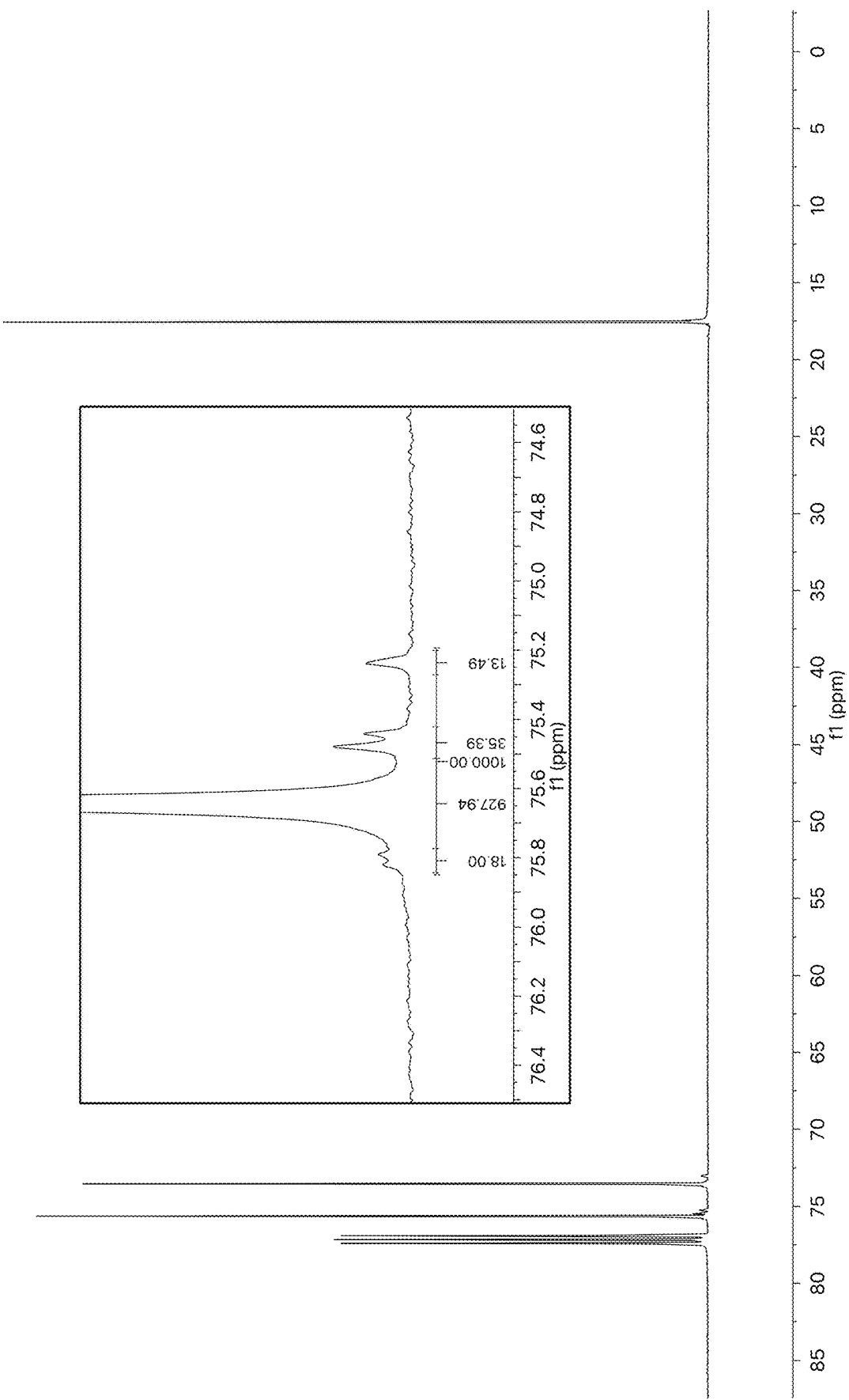
FIG. 15 shows $^{13}$C NMR spectrum of the polymer of Table 1, Entry 1.
Figure 16:
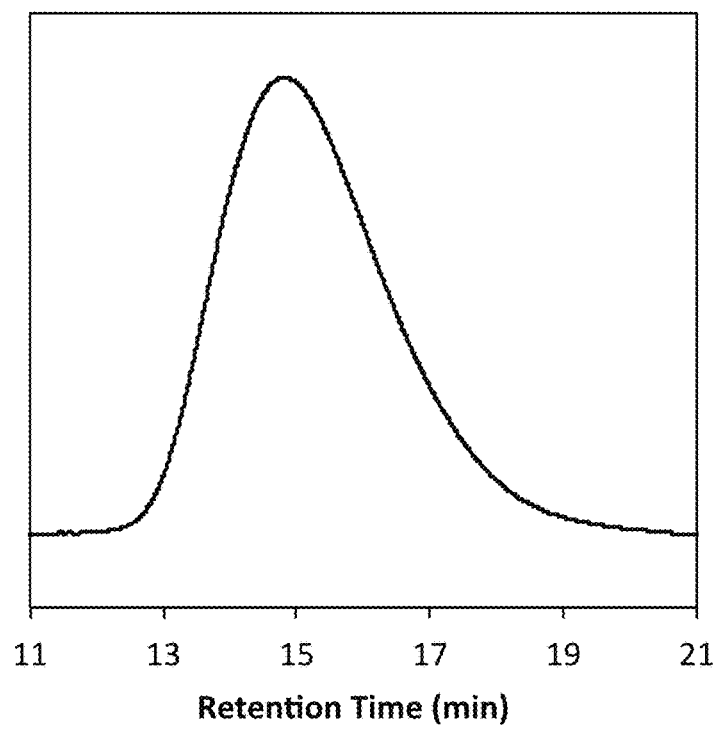
FIG. 16 shows GPC chromatogram of the polymer of Table 1, Entry 2.
Figure 17:
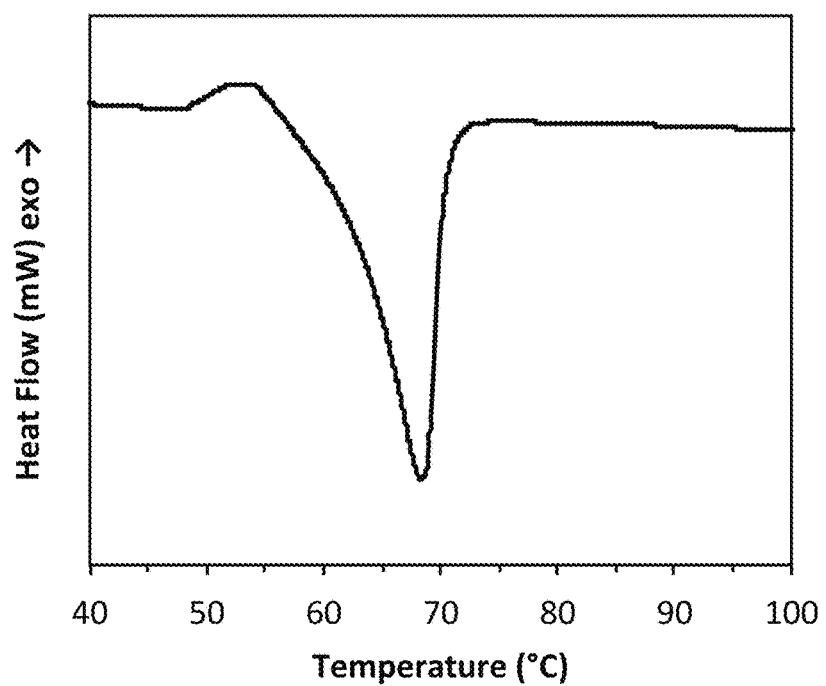
FIG. 17 shows DSC thermogram of the polymer of Table 1, Entry 2.
Figure 18:
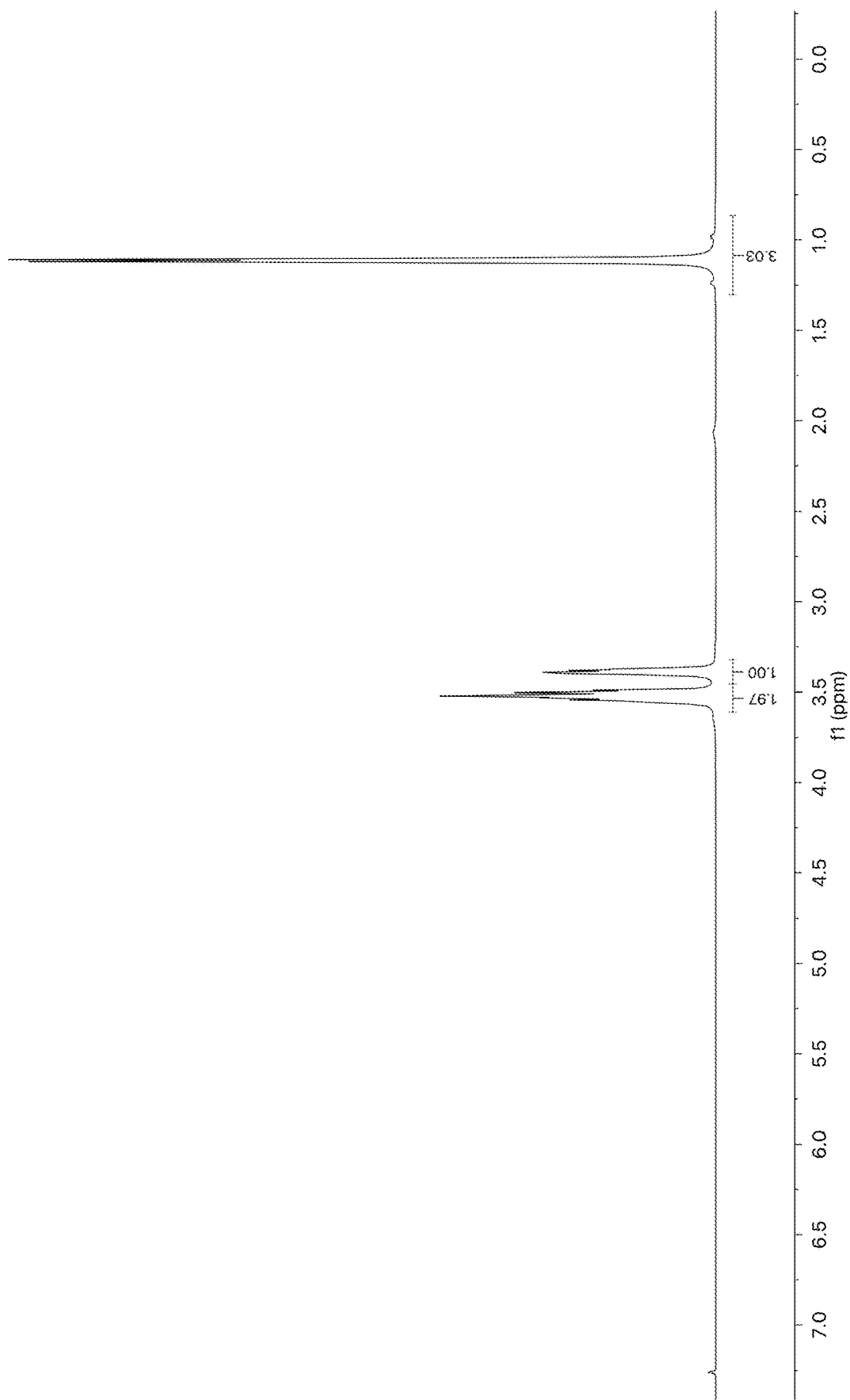
FIG. 18 shows $^1$H NMR spectrum of the polymer of Table 1, Entry 2.
Figure 19:
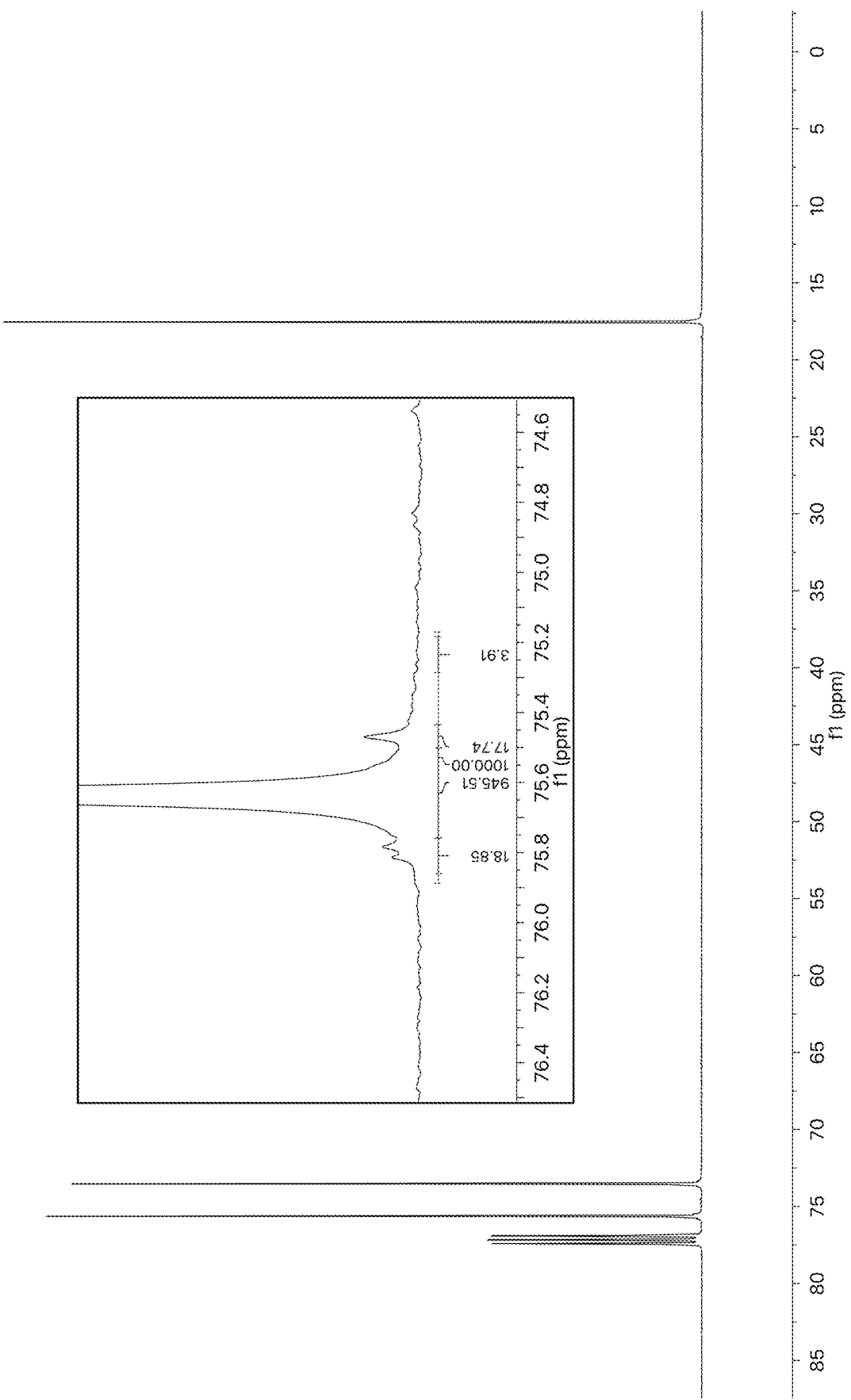
FIG. 19 shows $^{13}$C NMR spectrum of the polymer of Table 1, Entry 2.
Figure 20:
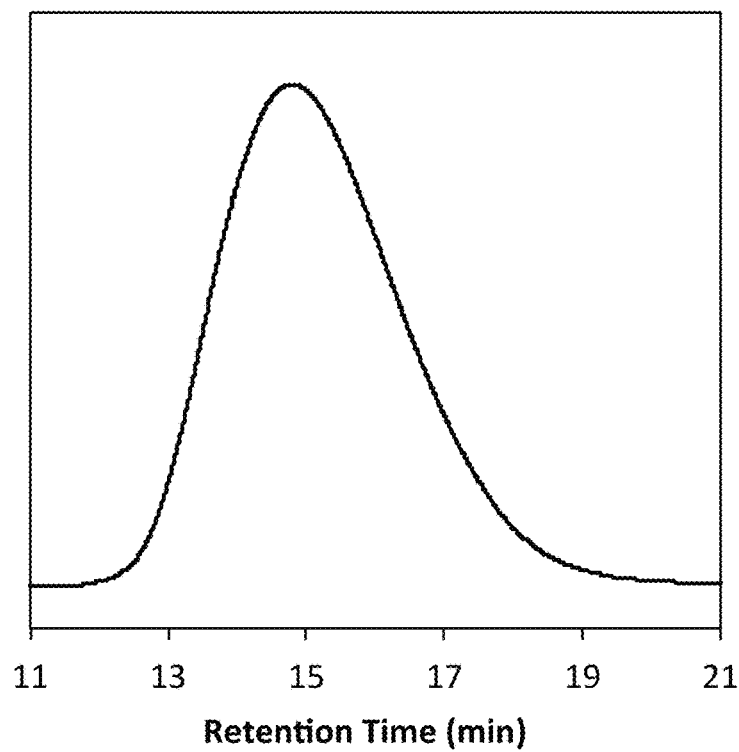
FIG. 20 shows GPC chromatogram of the polymer of Table 1, Entry 3.
Figure 21:
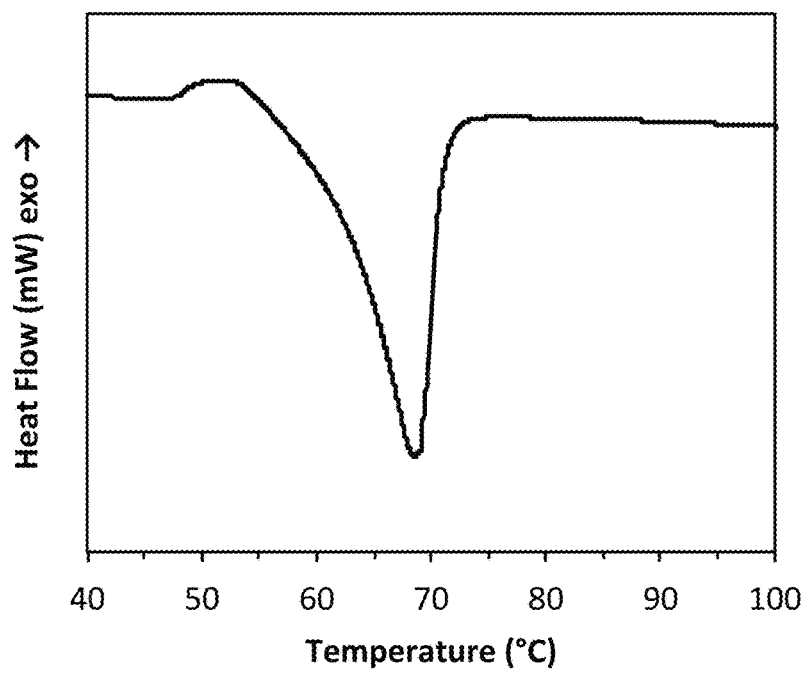
FIG. 21 shows DSC thermogram of the polymer of Table 1, Entry 3.
Figure 22:
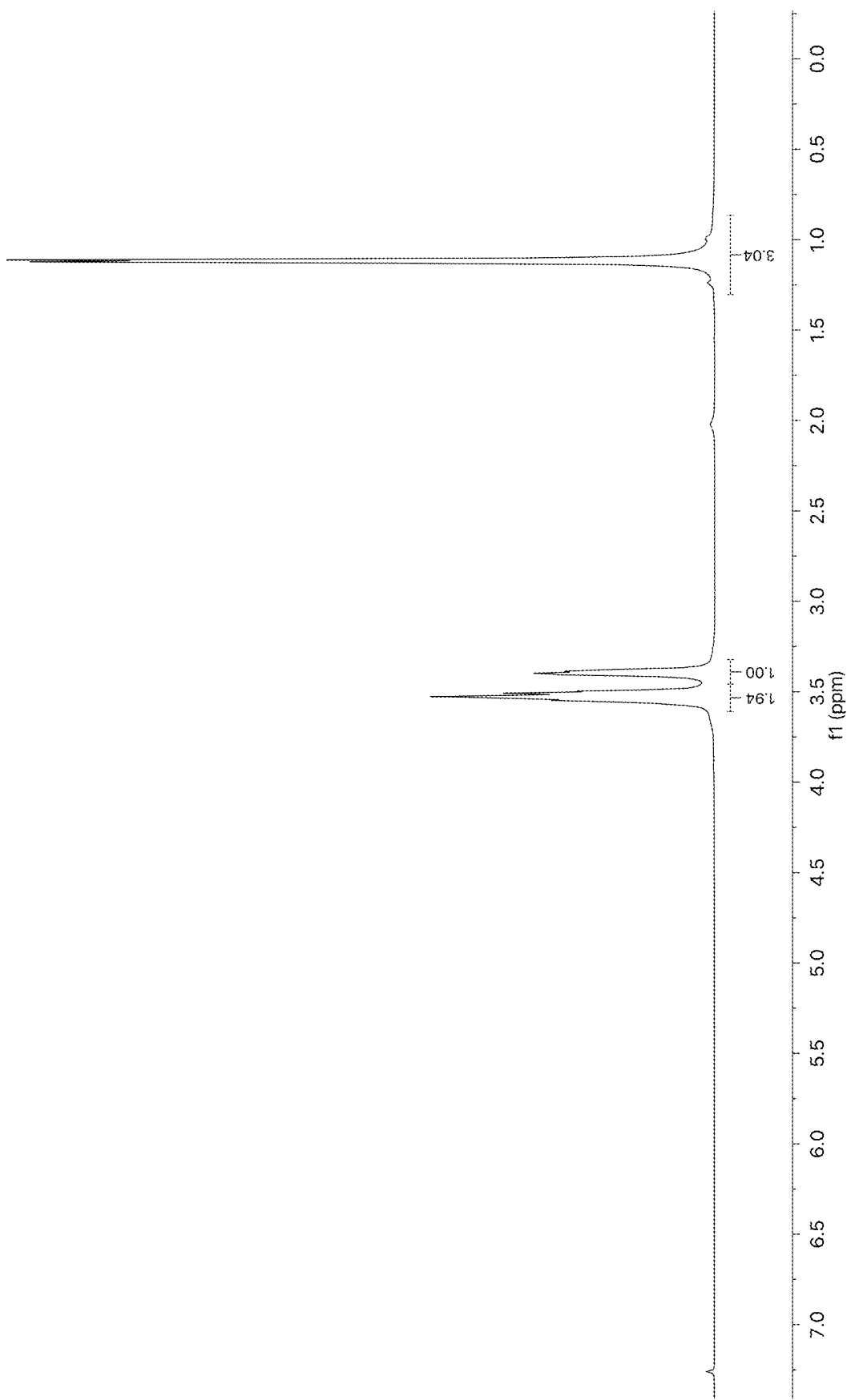
FIG. 22 shows $^1$H NMR spectrum of the polymer of Table 1, Entry 3.
Figure 23:
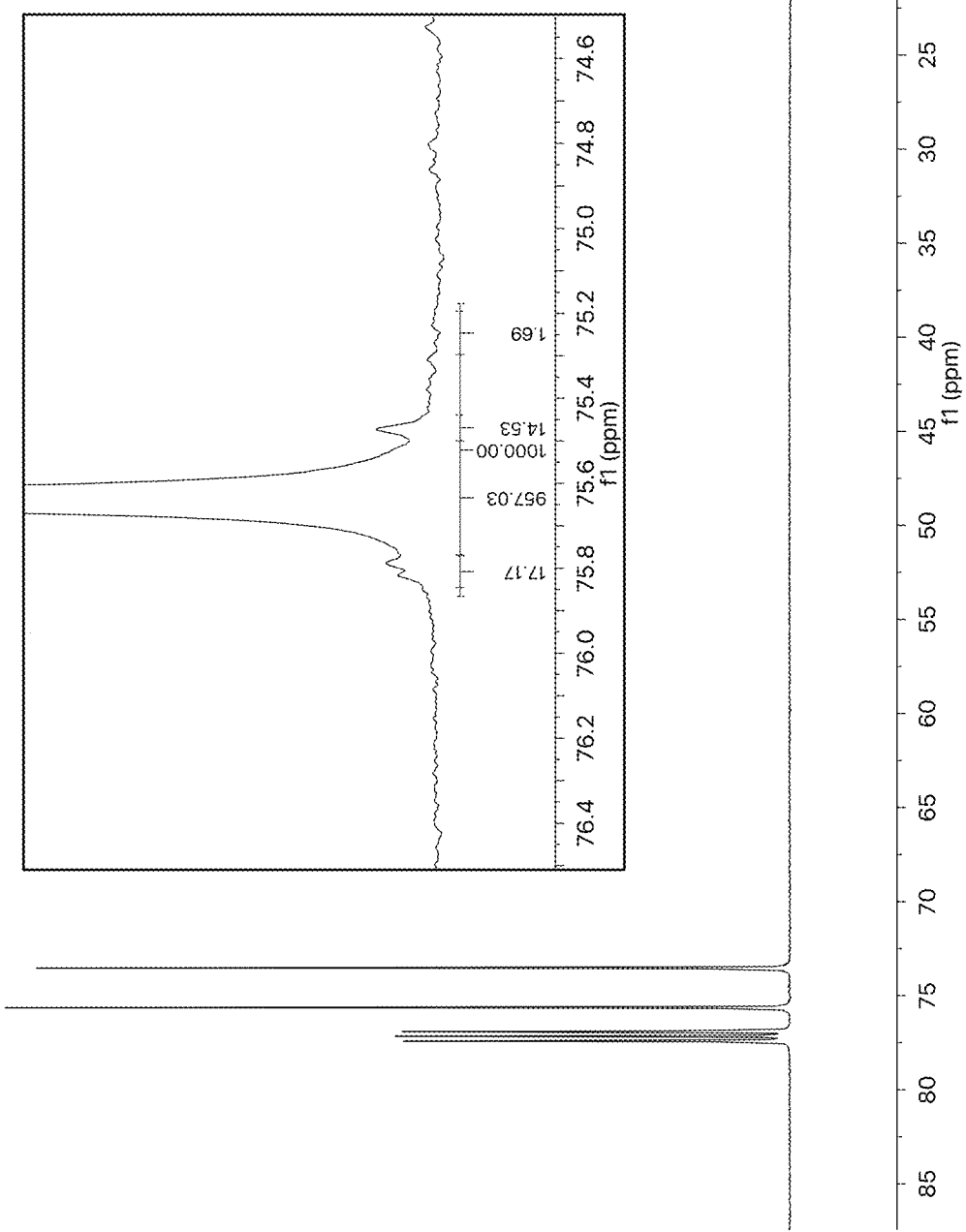
FIG. 23 shows $^{13}$C NMR spectrum of the polymer of Table 1, Entry 3.
Figure 24:
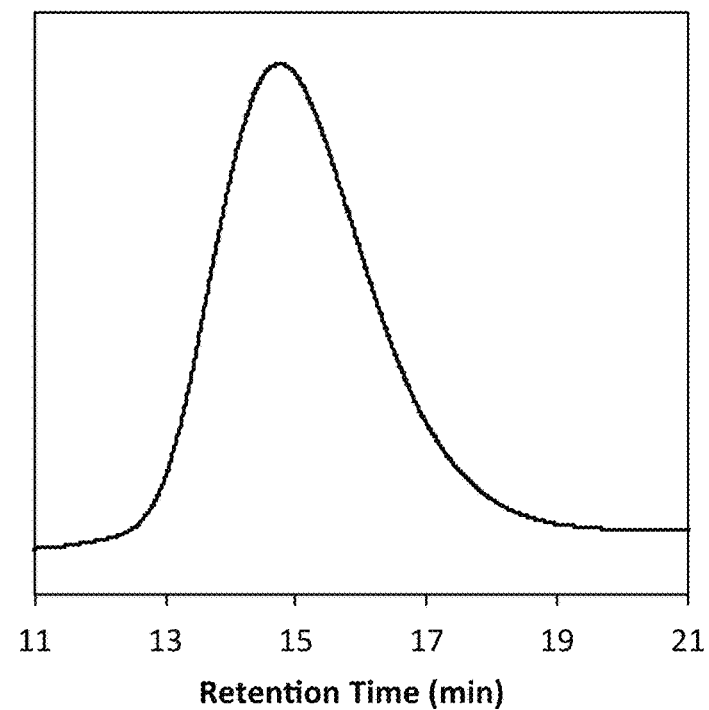
FIG. 24 shows GPC chromatogram of the polymer of Table 1, Entry 4.
Figure 25:
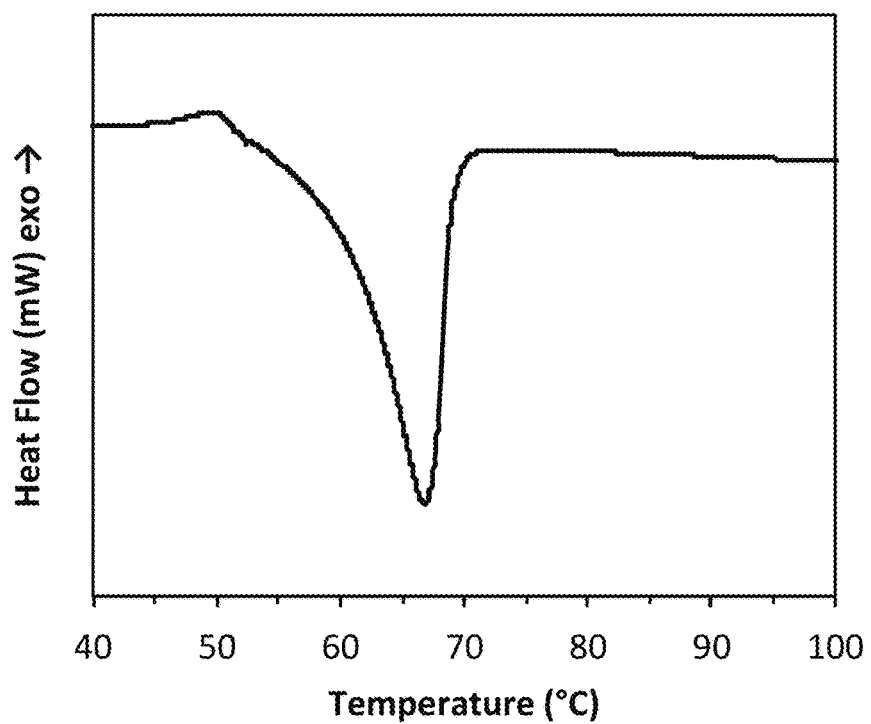
FIG. 25 shows DSC thermogram of the polymer of Table 1, Entry 4.
Figure 26:
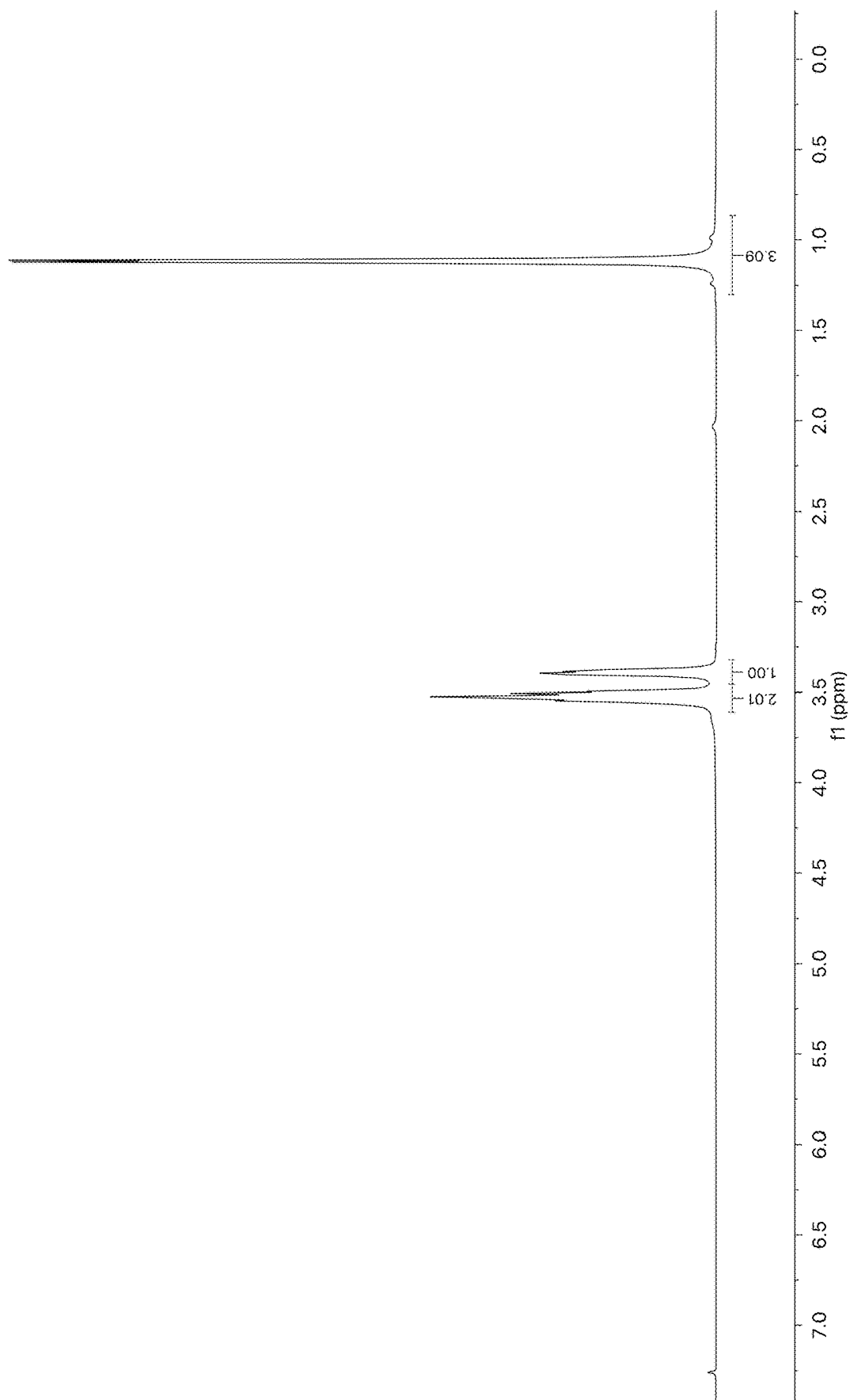
FIG. 26 shows $^1$H NMR spectrum of the polymer of Table 1, Entry 4.
Figure 27:
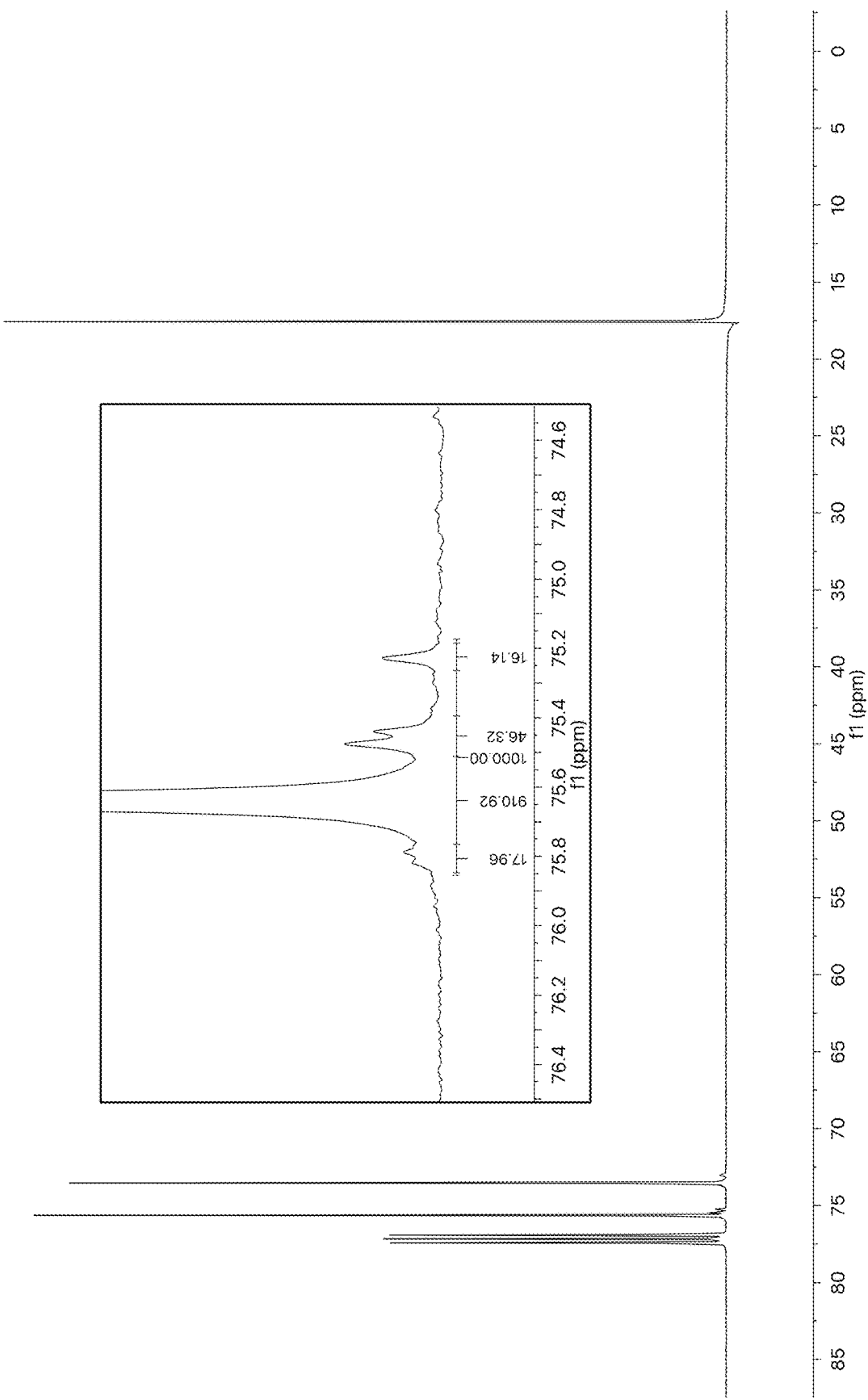
FIG. 27 shows $^{13}$C NMR spectrum of the polymer of Table 1, Entry 4.
Figure 28:
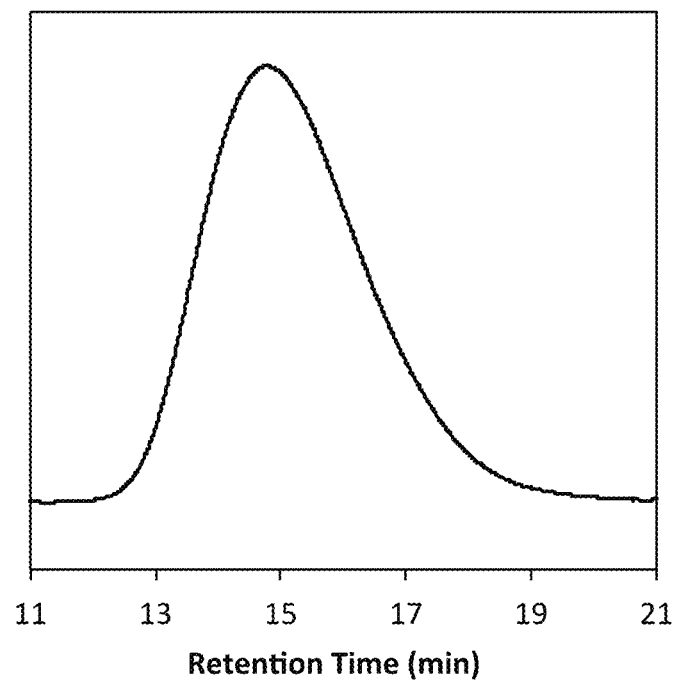
FIG. 28 shows GPC chromatogram of the polymer of Table 1, Entry 5.
Figure 29:
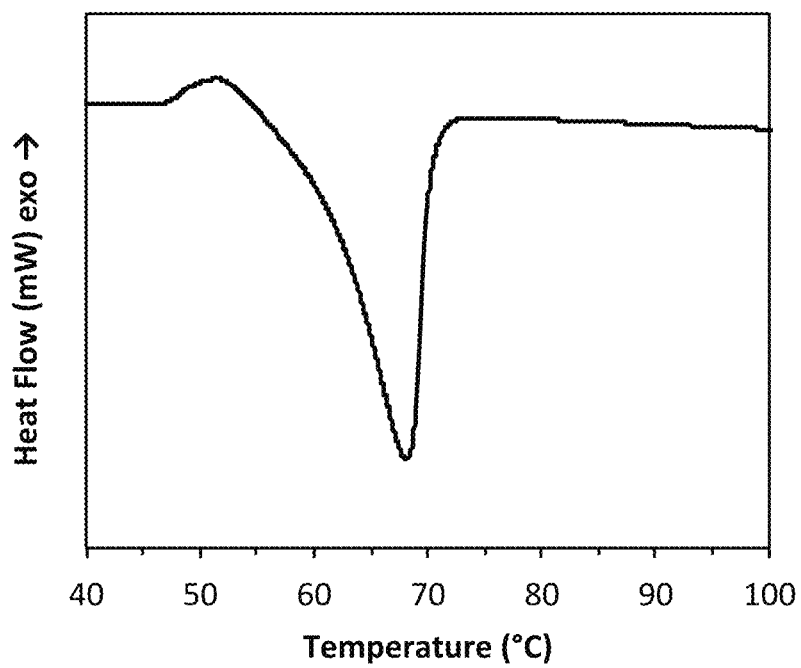
FIG. 29 shows DSC thermogram of the polymer of Table 1, Entry 5.
Figure 30:
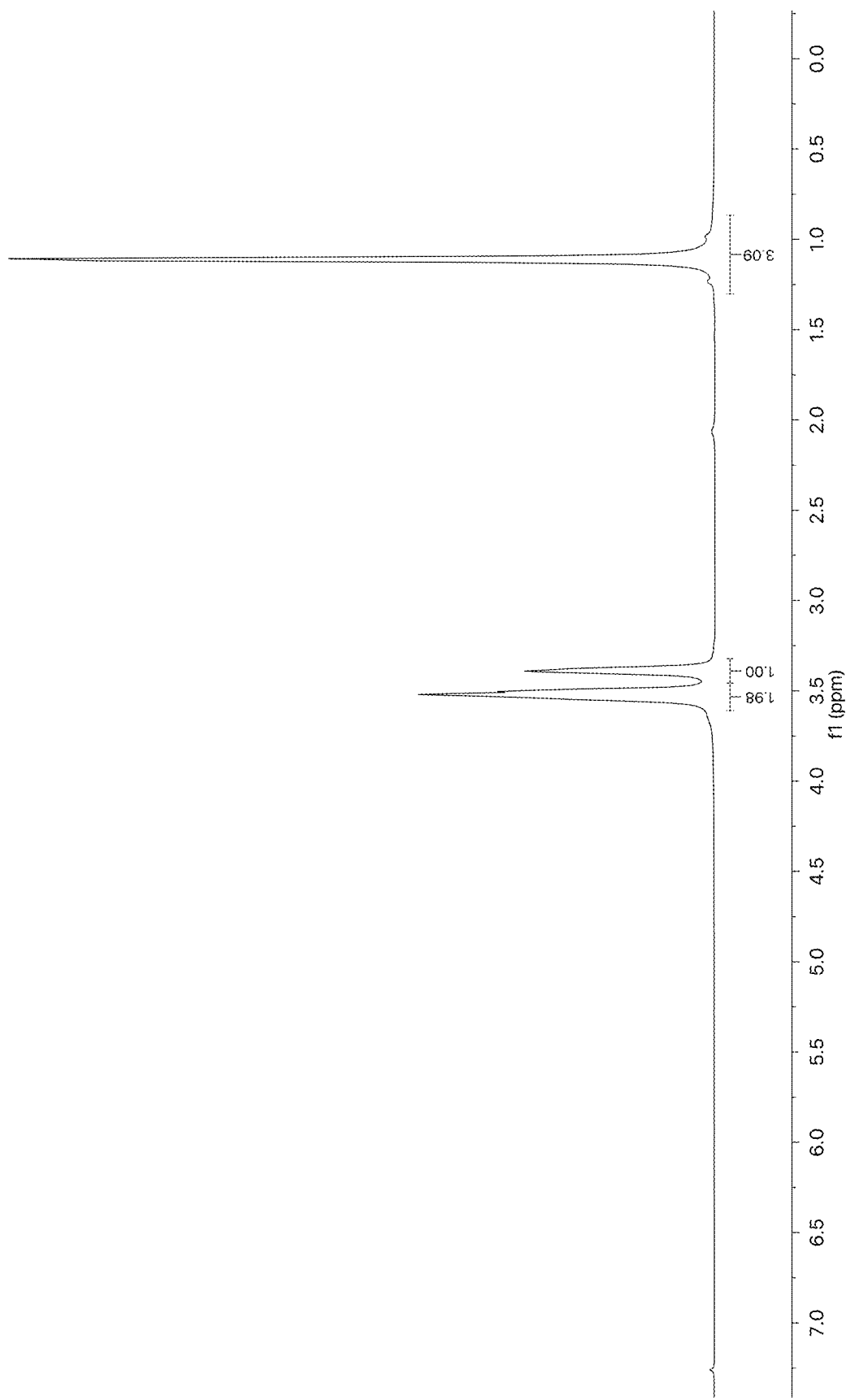
FIG. 30 shows $^1$H NMR spectrum of the polymer of Table 1, Entry 5.
Figure 31:
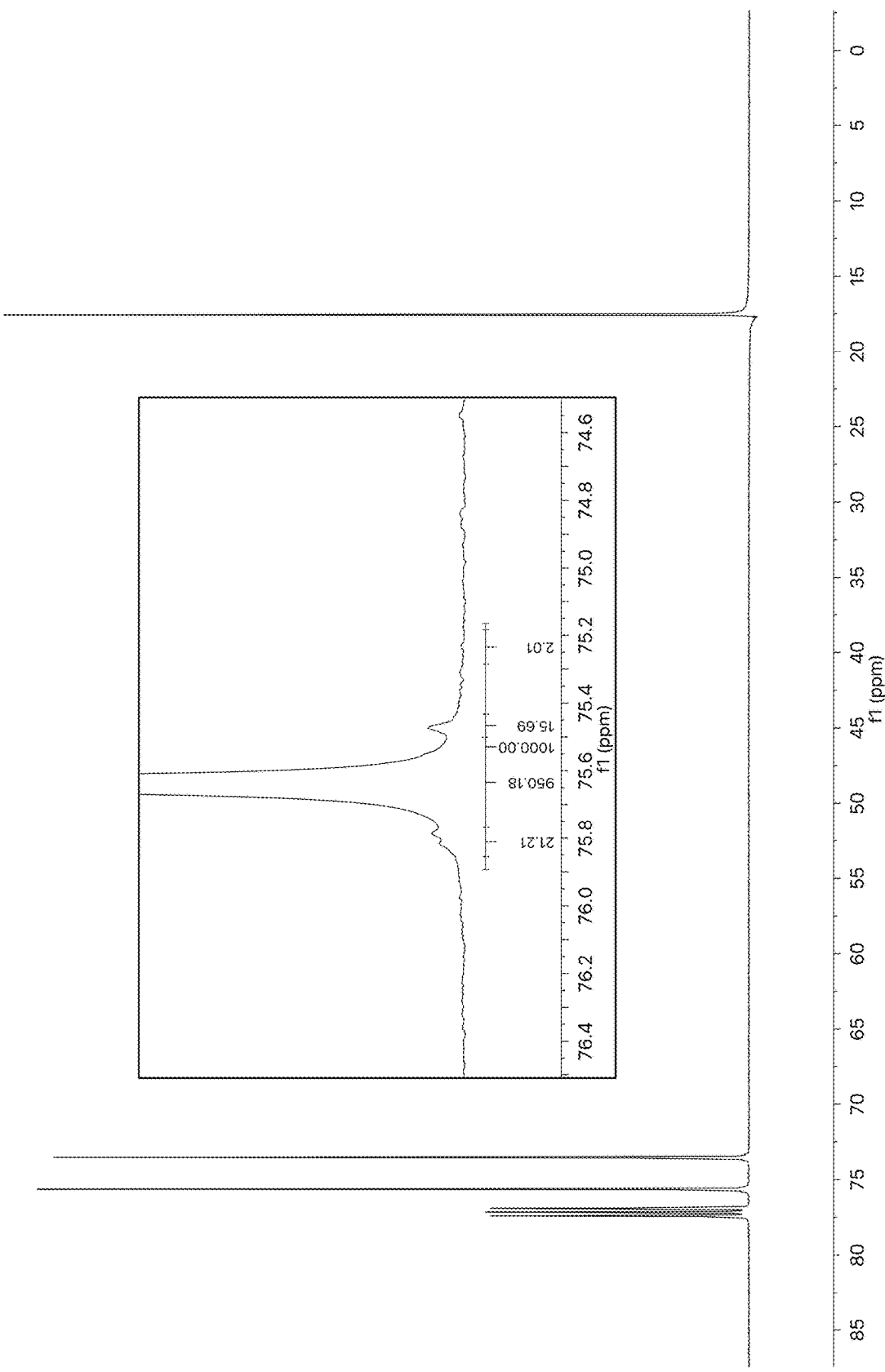
FIG. 31 shows $^{13}$C NMR spectrum of the polymer of Table 1, Entry 5.
Figure 32:
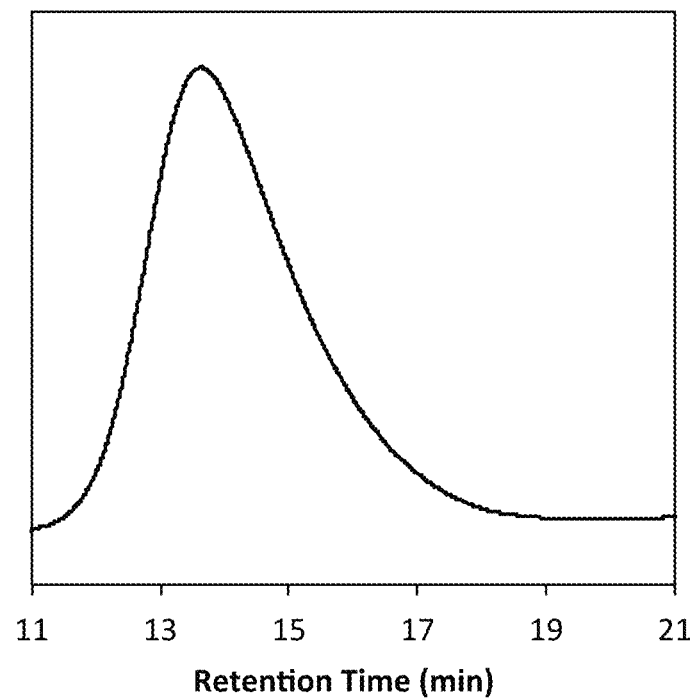
FIG. 32 shows GPC chromatogram of the polymer of Table 2, Entry 1.
Figure 33:
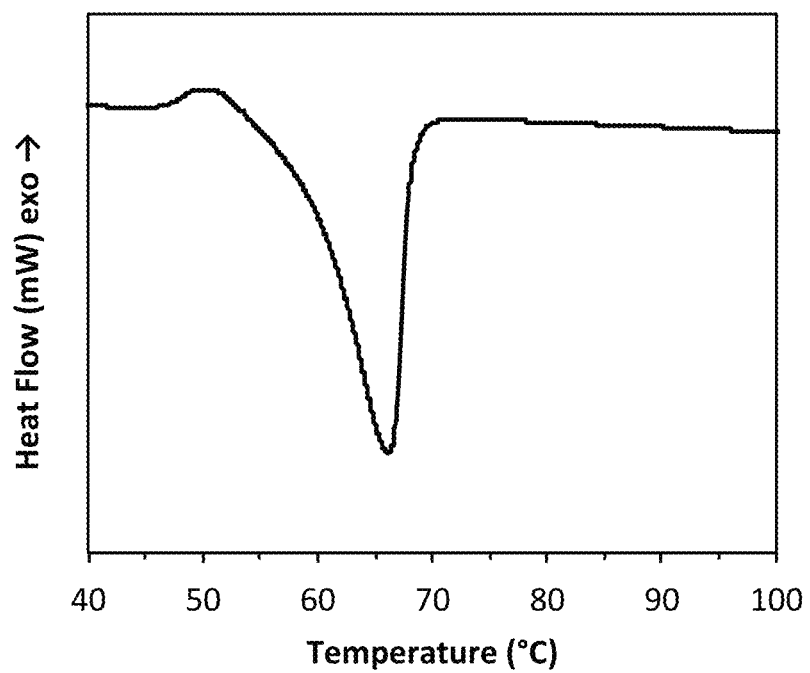
FIG. 33 shows DSC thermogram of the polymer of Table 2, Entry 1.
Figure 34:
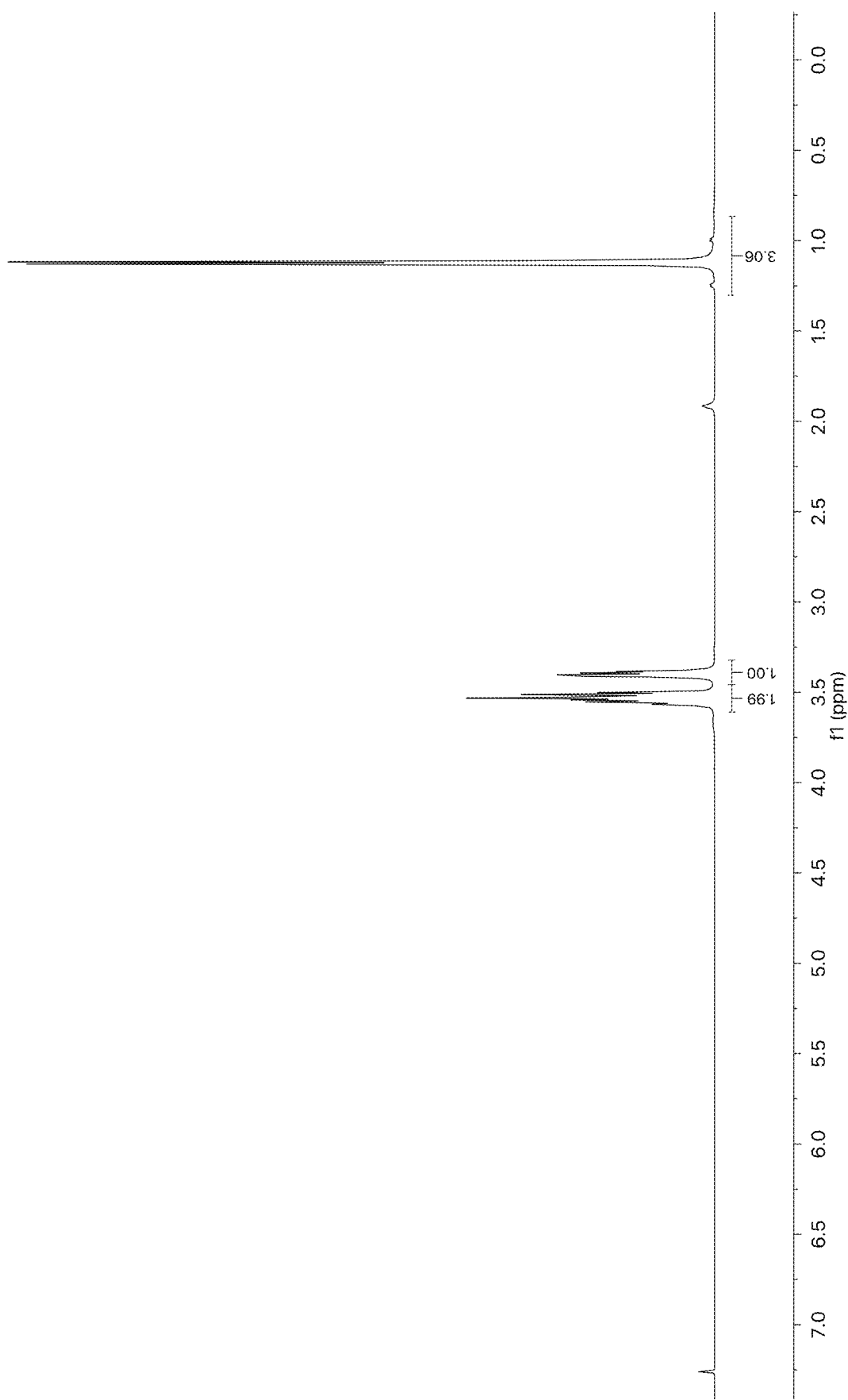
FIG. 34 shows $^1$H NMR spectrum of the polymer of Table 2, Entry 1.
Figure 35:
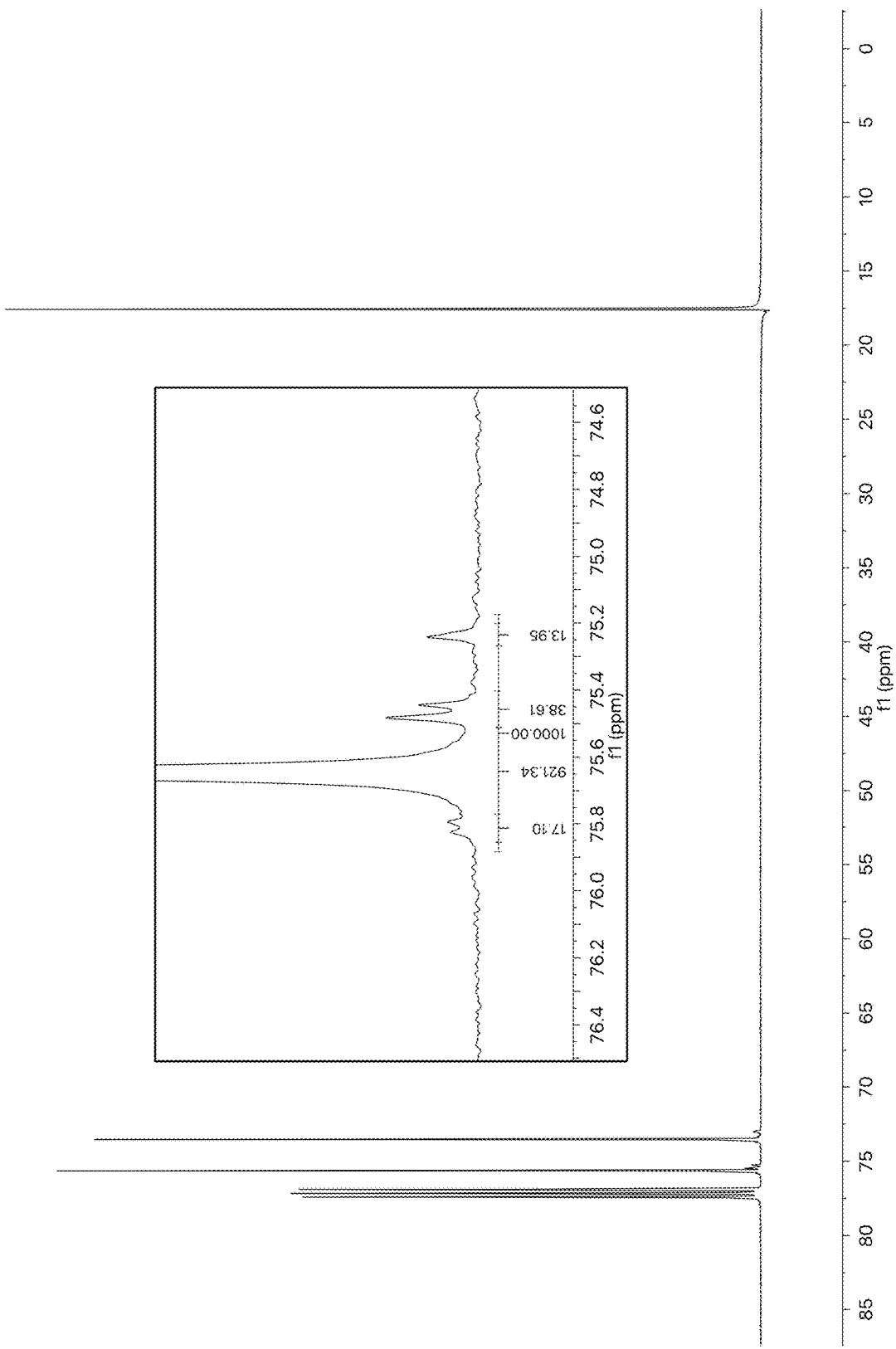
FIG. 35 shows $^{13}$C NMR spectrum of the polymer of Table 2, Entry 1.
Figure 36:
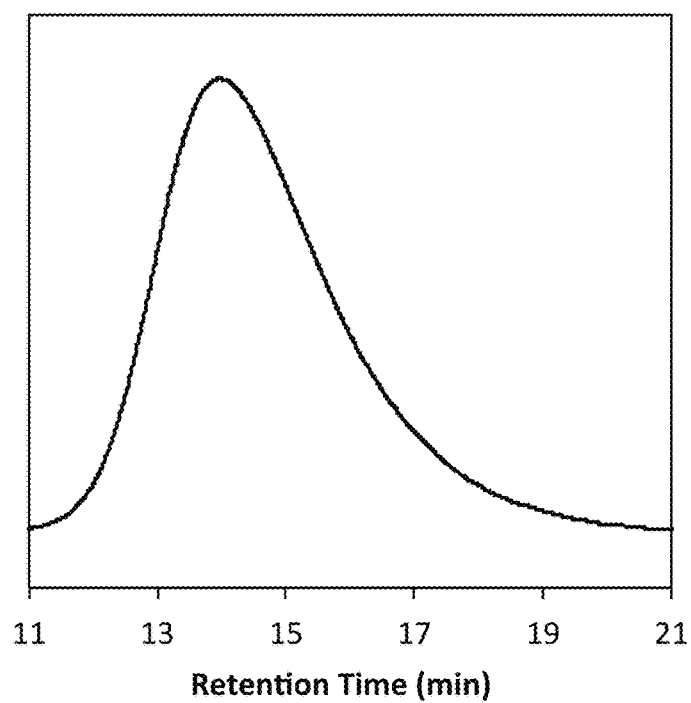
FIG. 36 shows GPC chromatogram of the polymer of Table 2, Entry 2.
Figure 37:
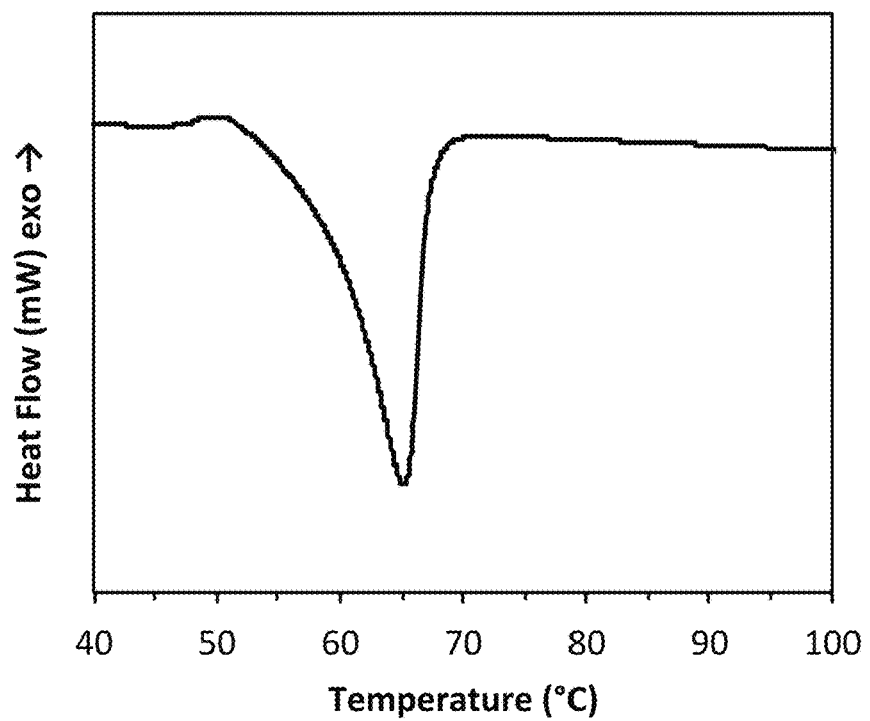
FIG. 37 shows DSC thermogram of the polymer of Table 2, Entry 2.
Figure 38:
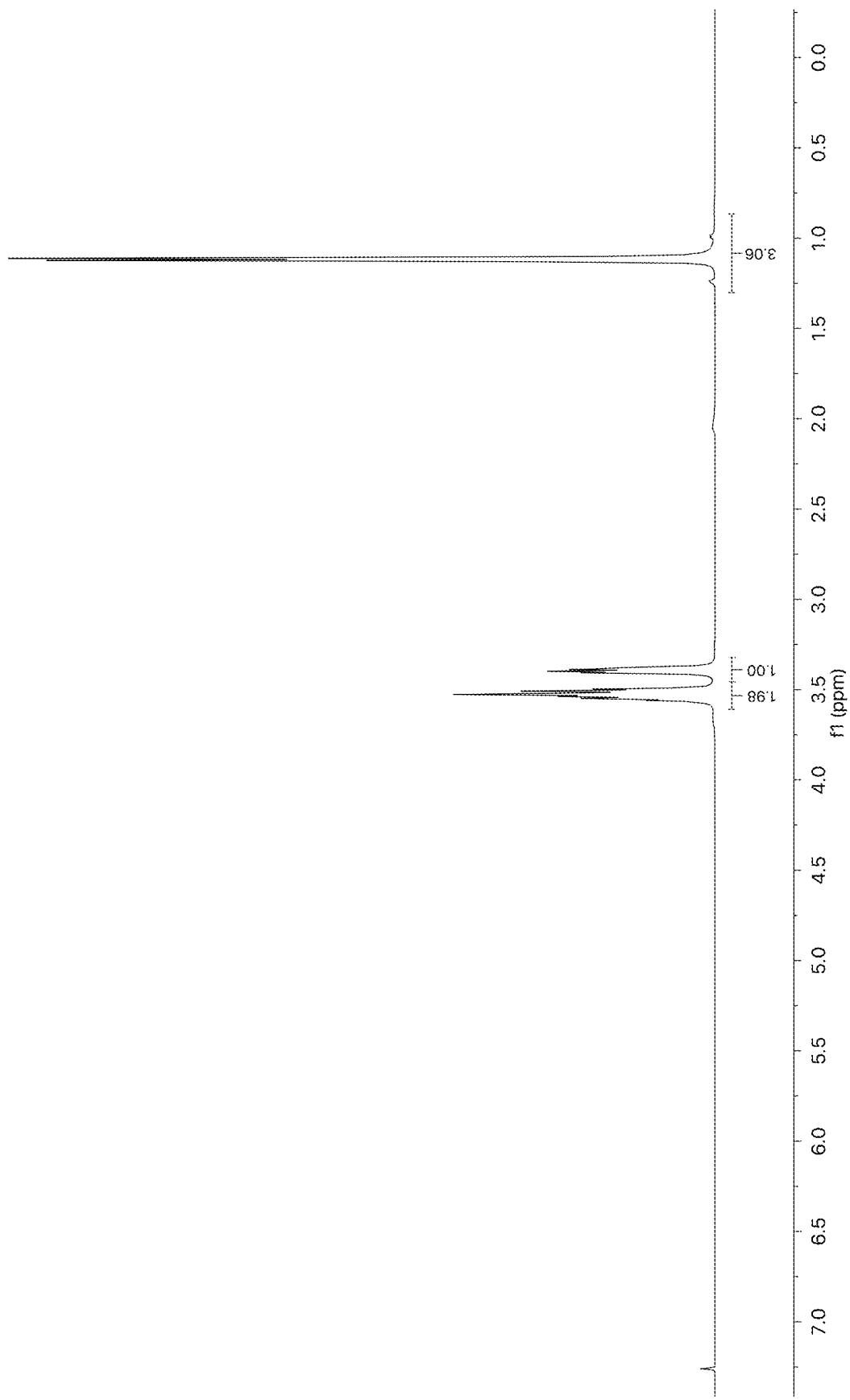
FIG. 38 shows $^1$H NMR spectrum of the polymer of Table 2, Entry 2.
Figure 39:
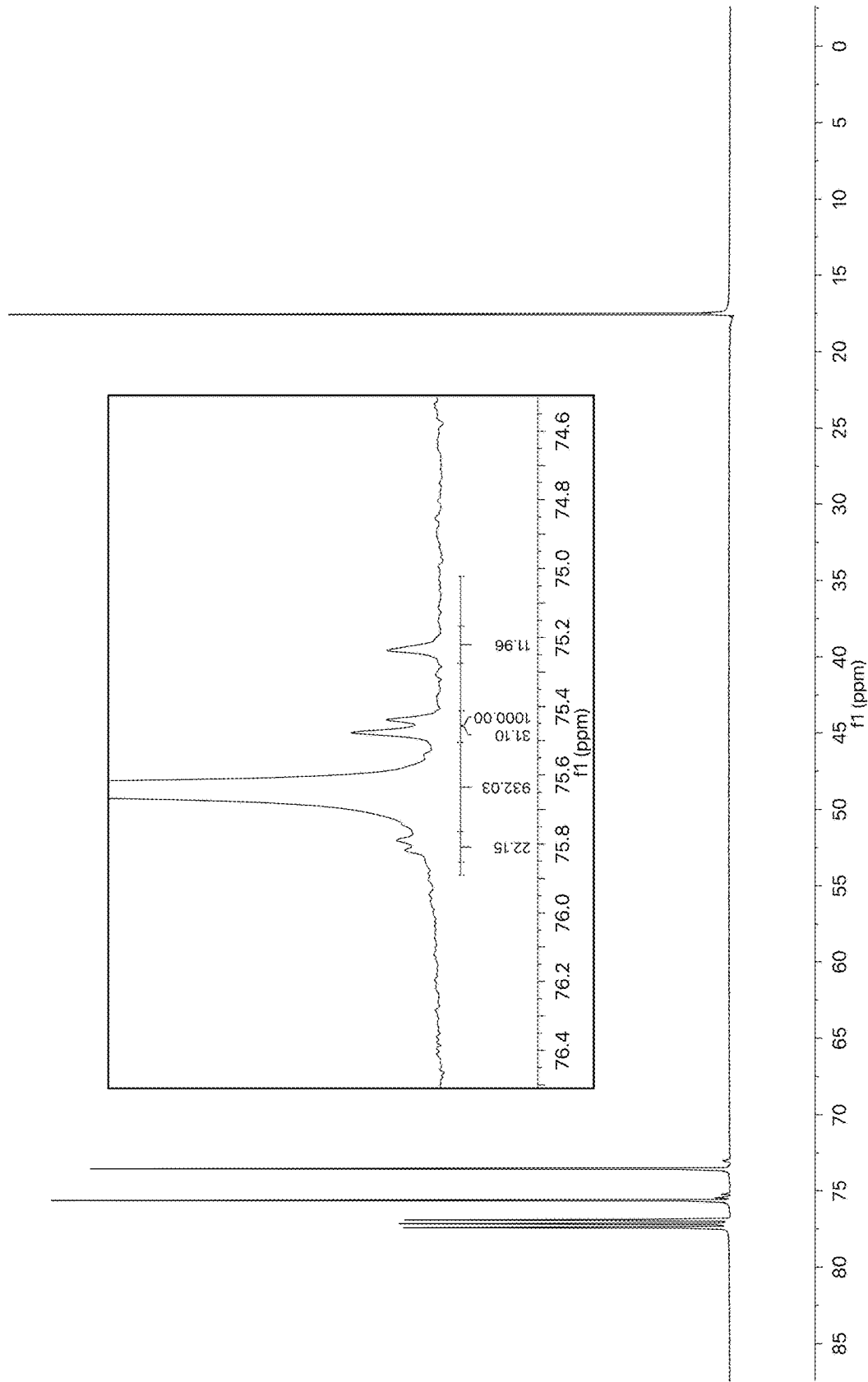
FIG. 39 shows $^{13}$C NMR spectrum of the polymer of Table 2, Entry 2.
Figure 40:
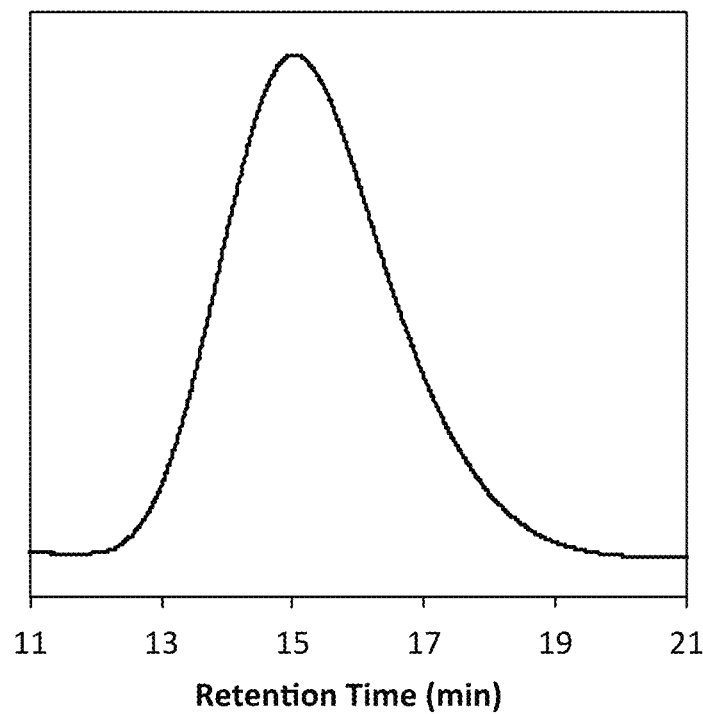
FIG. 40 shows GPC chromatogram of the polymer of Table 2, Entry 4.
Figure 41:
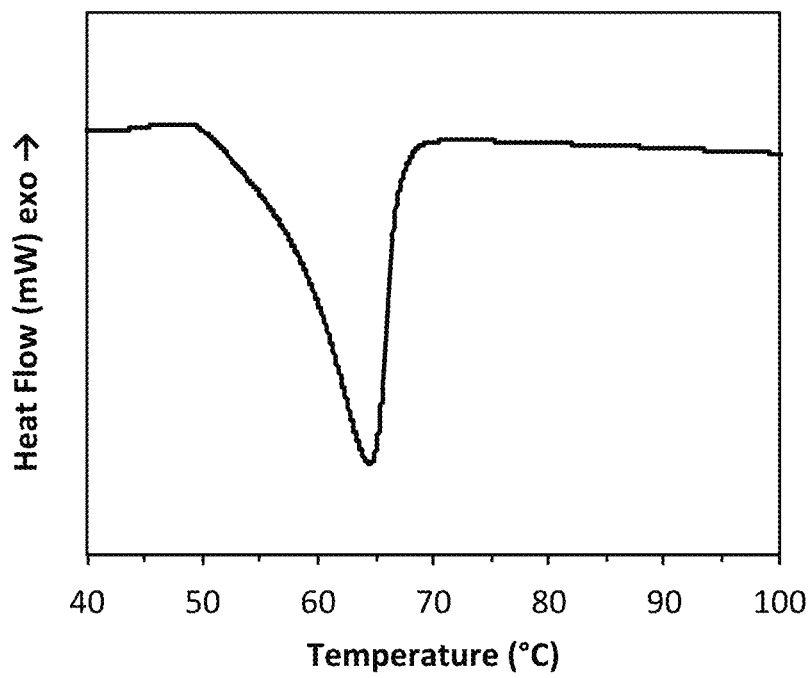
FIG. 41 shows DSC thermogram of the polymer of Table 2, Entry 4.
Figure 42:
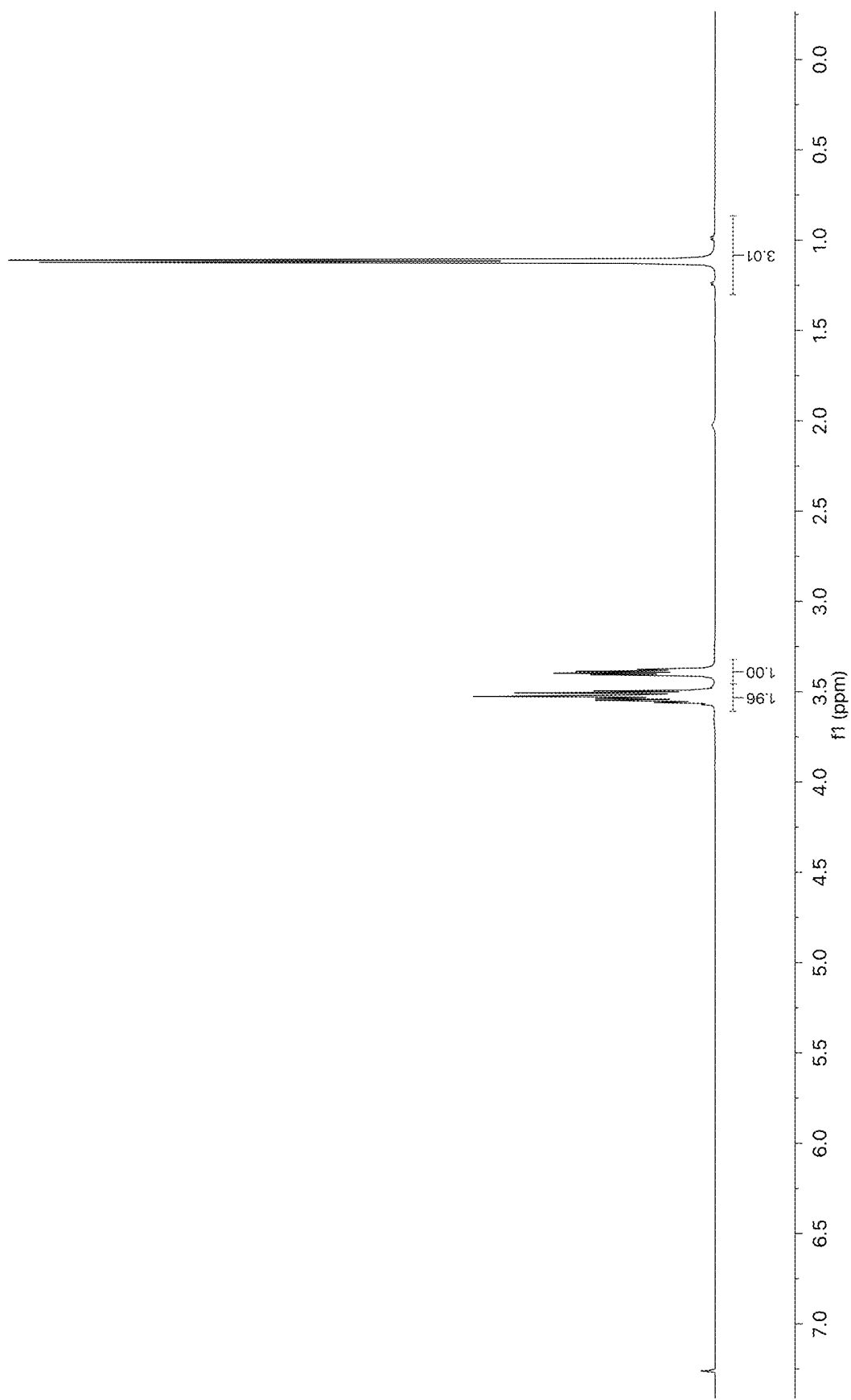
FIG. 42 shows $^1$H NMR spectrum of the polymer of Table 2, Entry 4.
Figure 43:
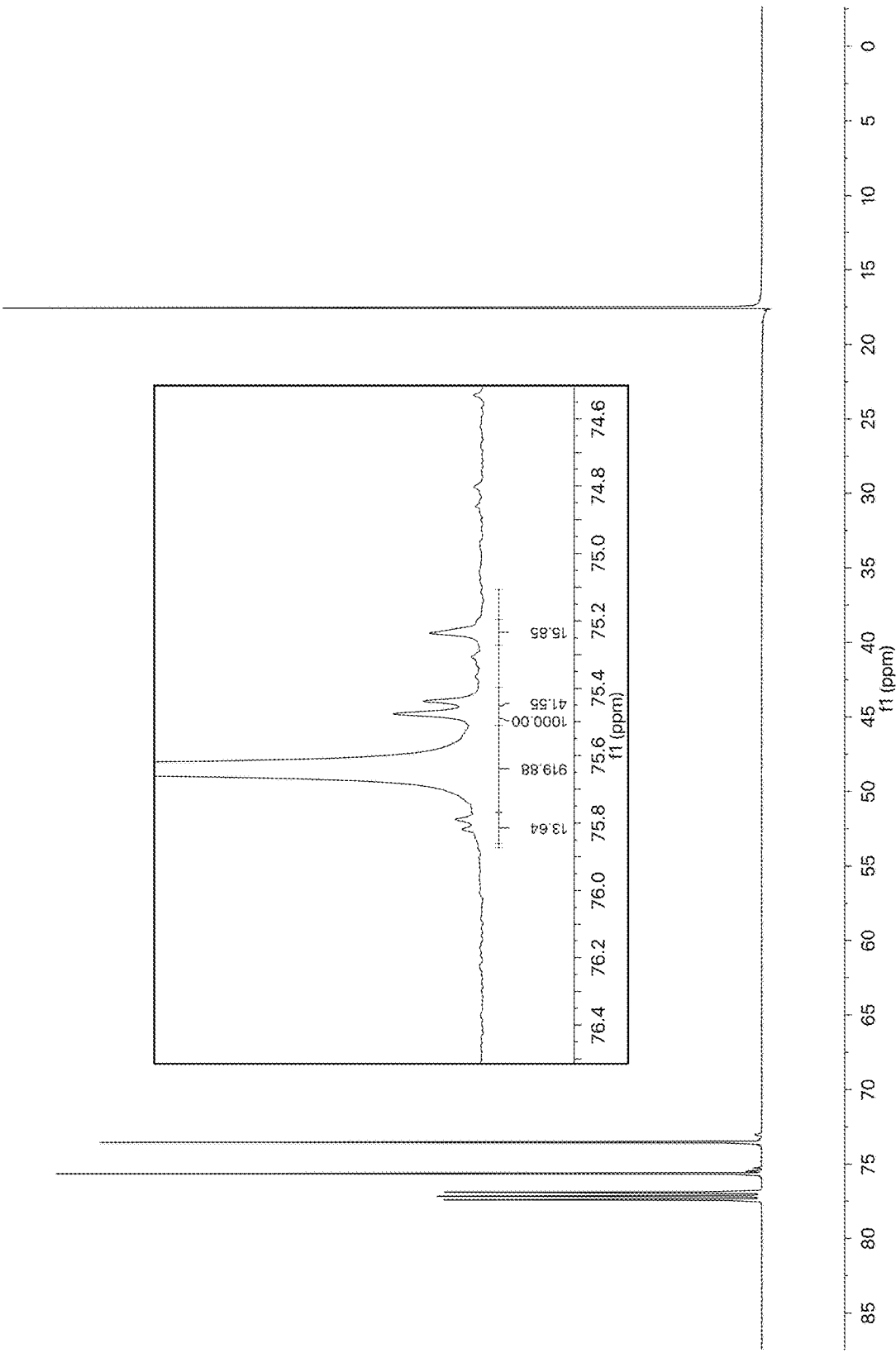
FIG. 43 shows $^{13}$C NMR spectrum of the polymer of Table 2, Entry 4.
Figure 44:
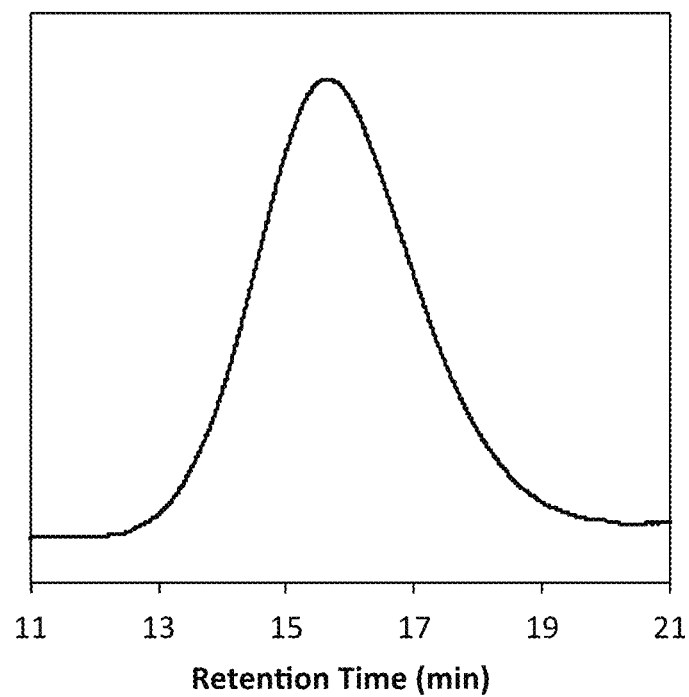
FIG. 44 shows GPC chromatogram of the polymer of Table 2, Entry 5.
Figure 45:
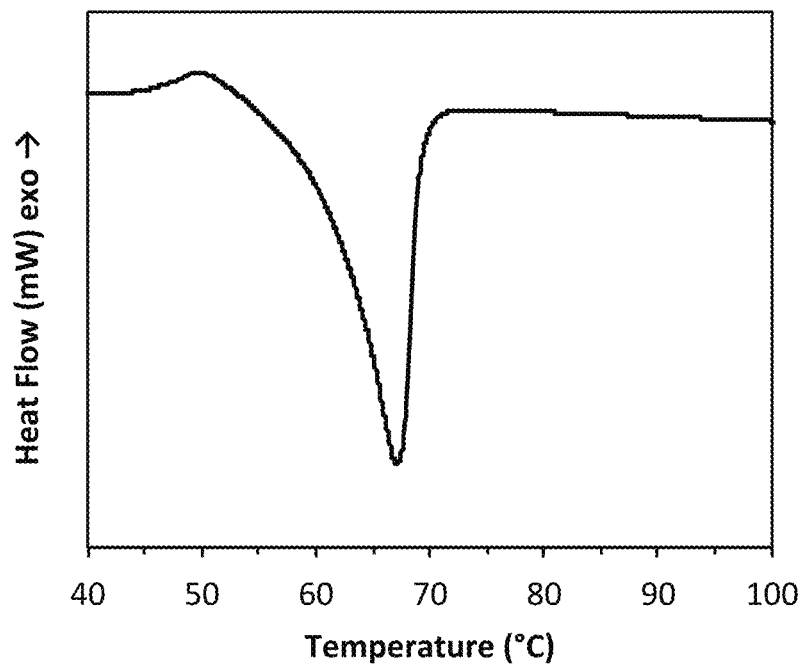
FIG. 45 shows DSC thermogram of the polymer of Table 2, Entry 5.
Figure 46:
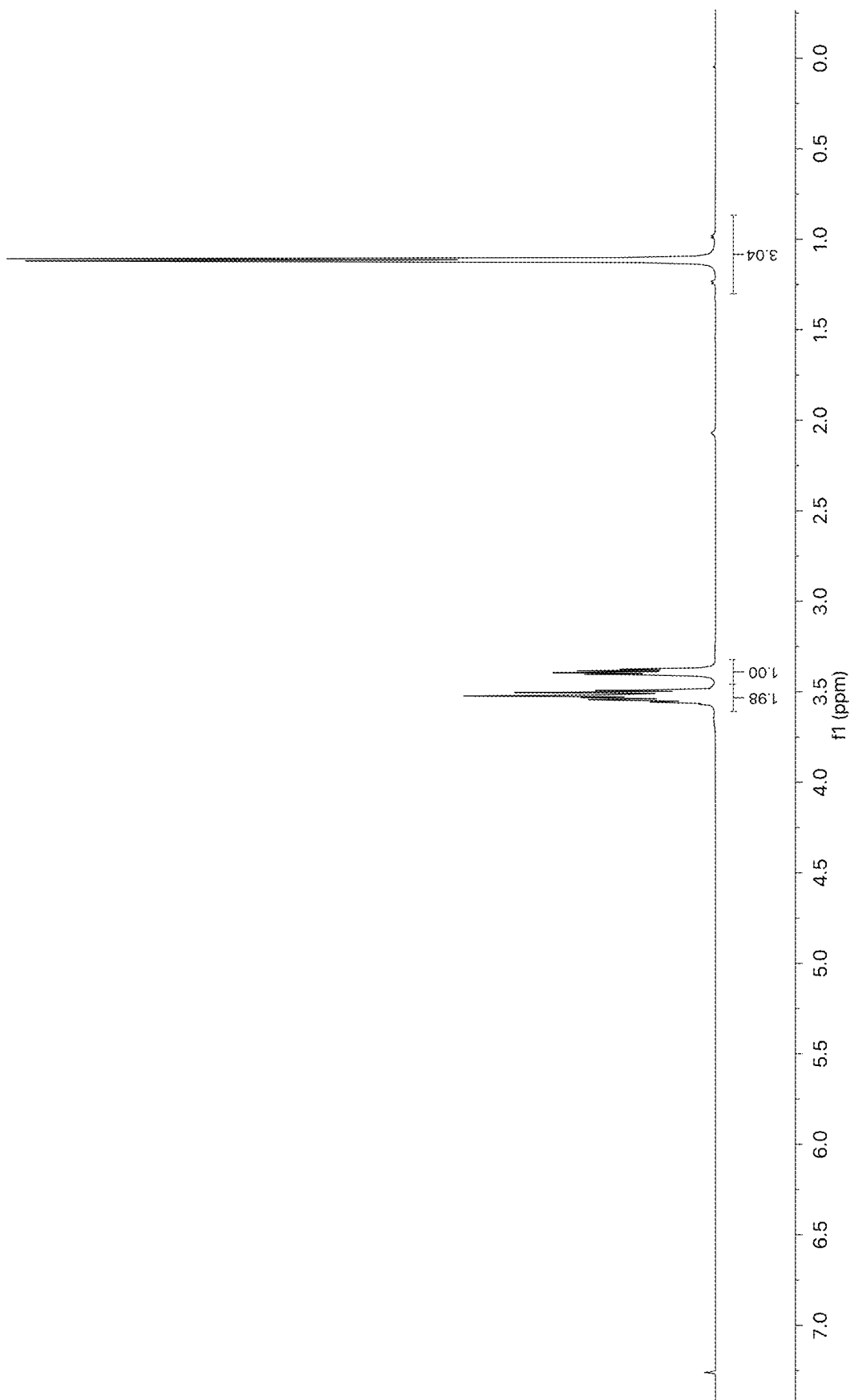
FIG. 46 shows $^1$H NMR spectrum of the polymer of Table 2, Entry 5.
Figure 47:
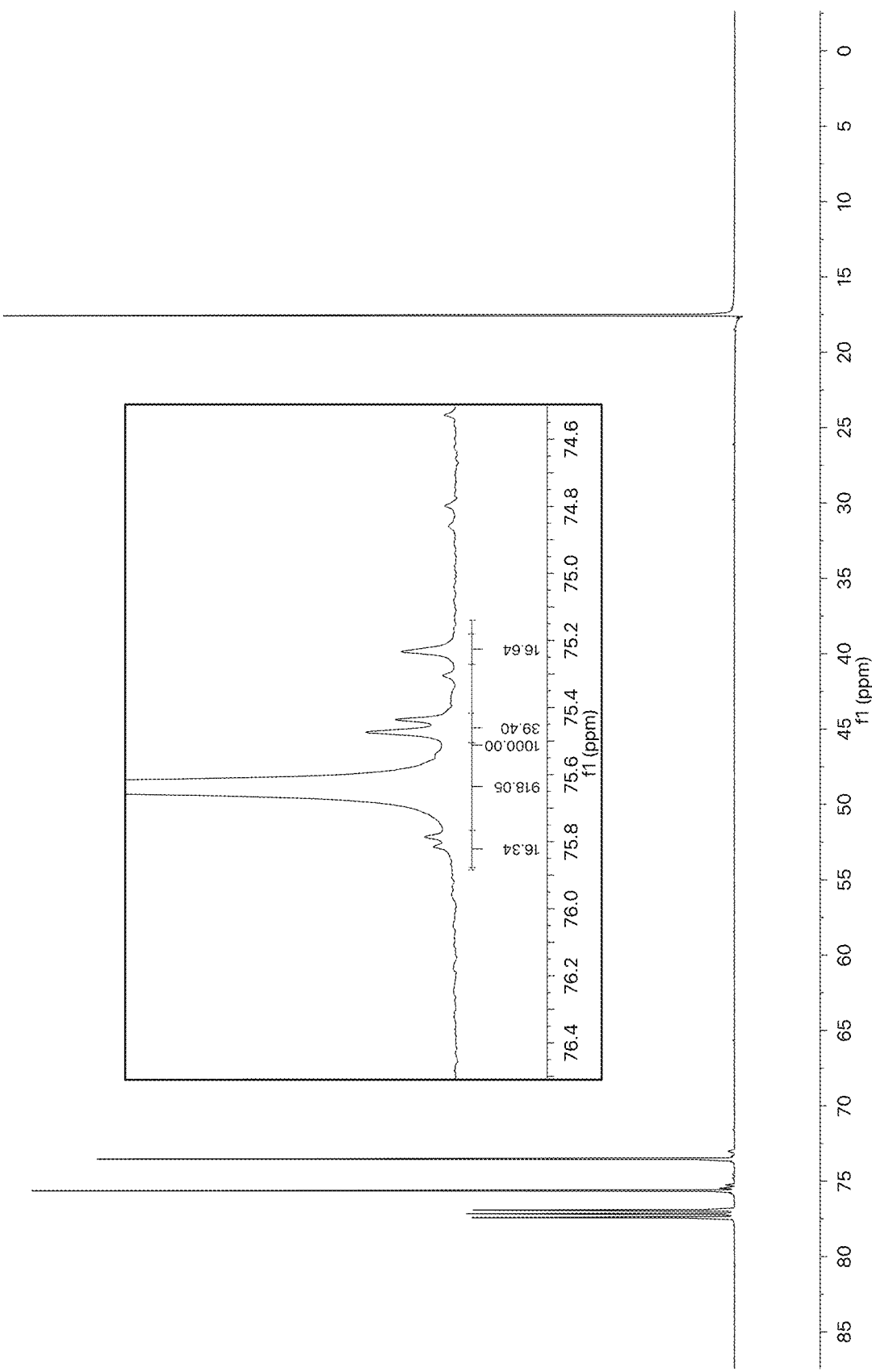
FIG. 47 shows $^{13}$C NMR spectrum of the polymer of Table 2, Entry 5.
Figure 48:
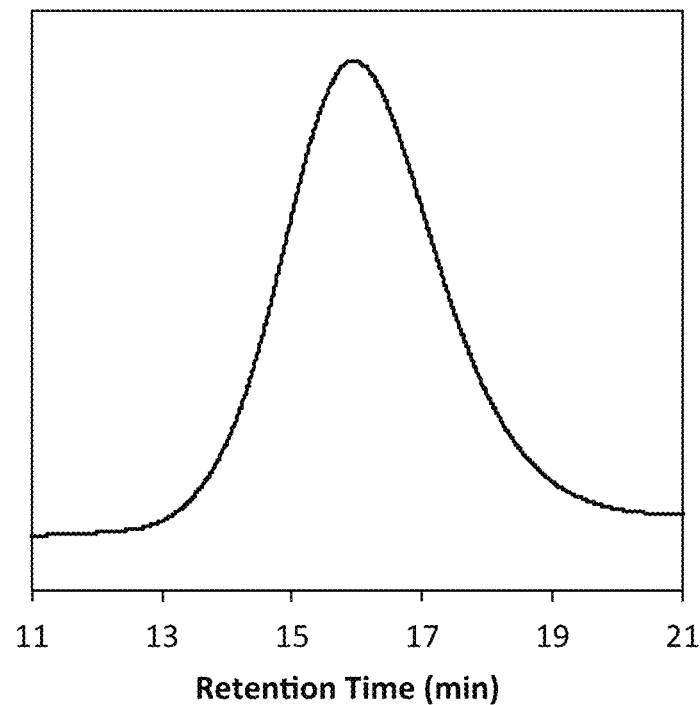
FIG. 48 shows GPC chromatogram of the polymer of Table 2, Entry 6.
Figure 49:
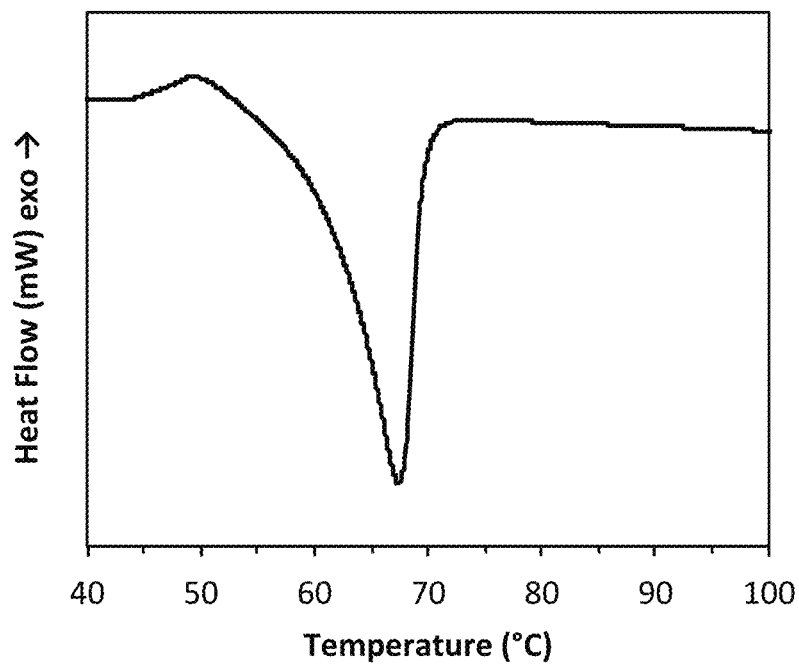
FIG. 49 shows DSC thermogram of the polymer of Table 2, Entry 6.
Figure 50:
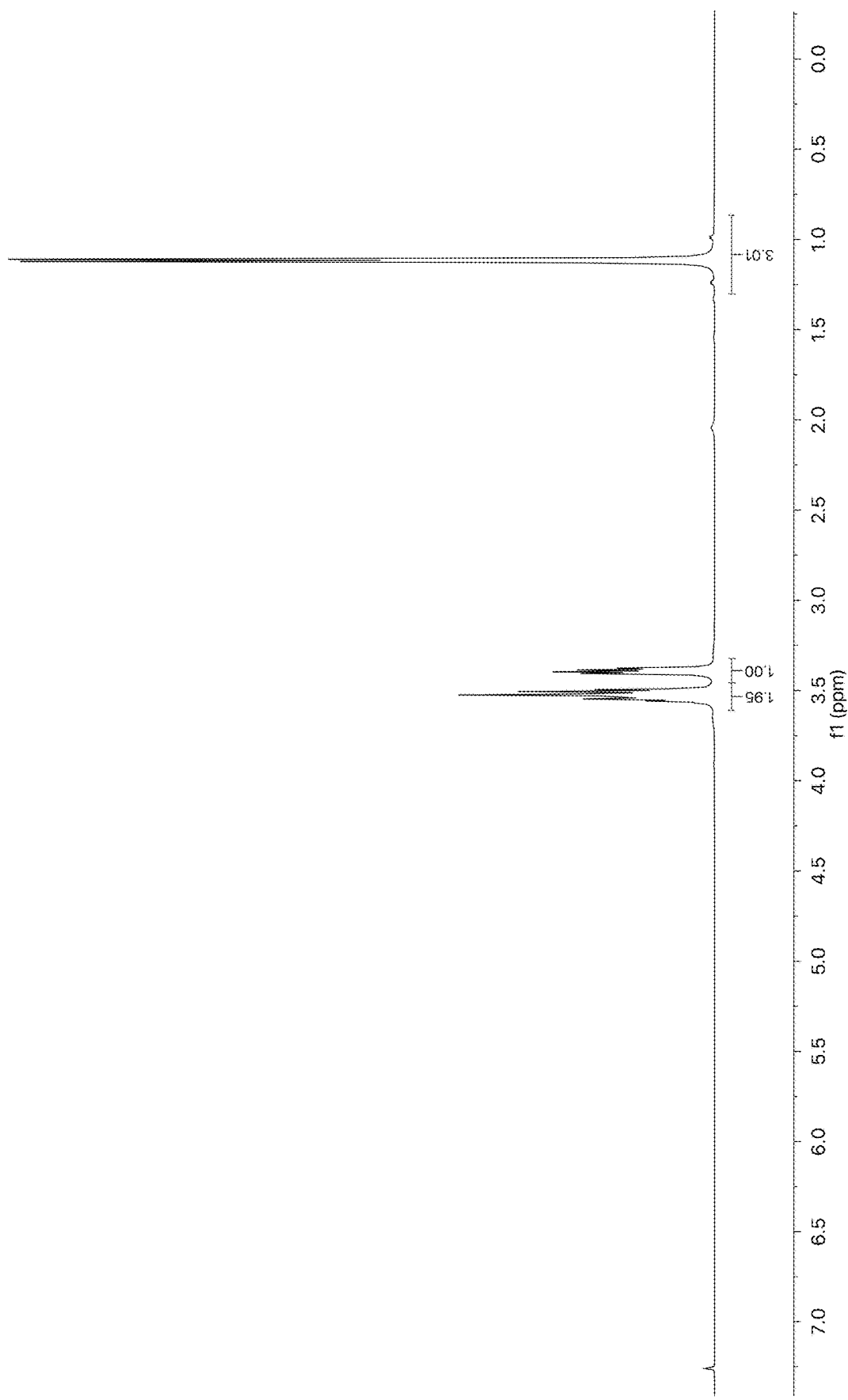
FIG. 50 shows $^1$H NMR spectrum of the polymer of Table 2, Entry 6.
Figure 51:
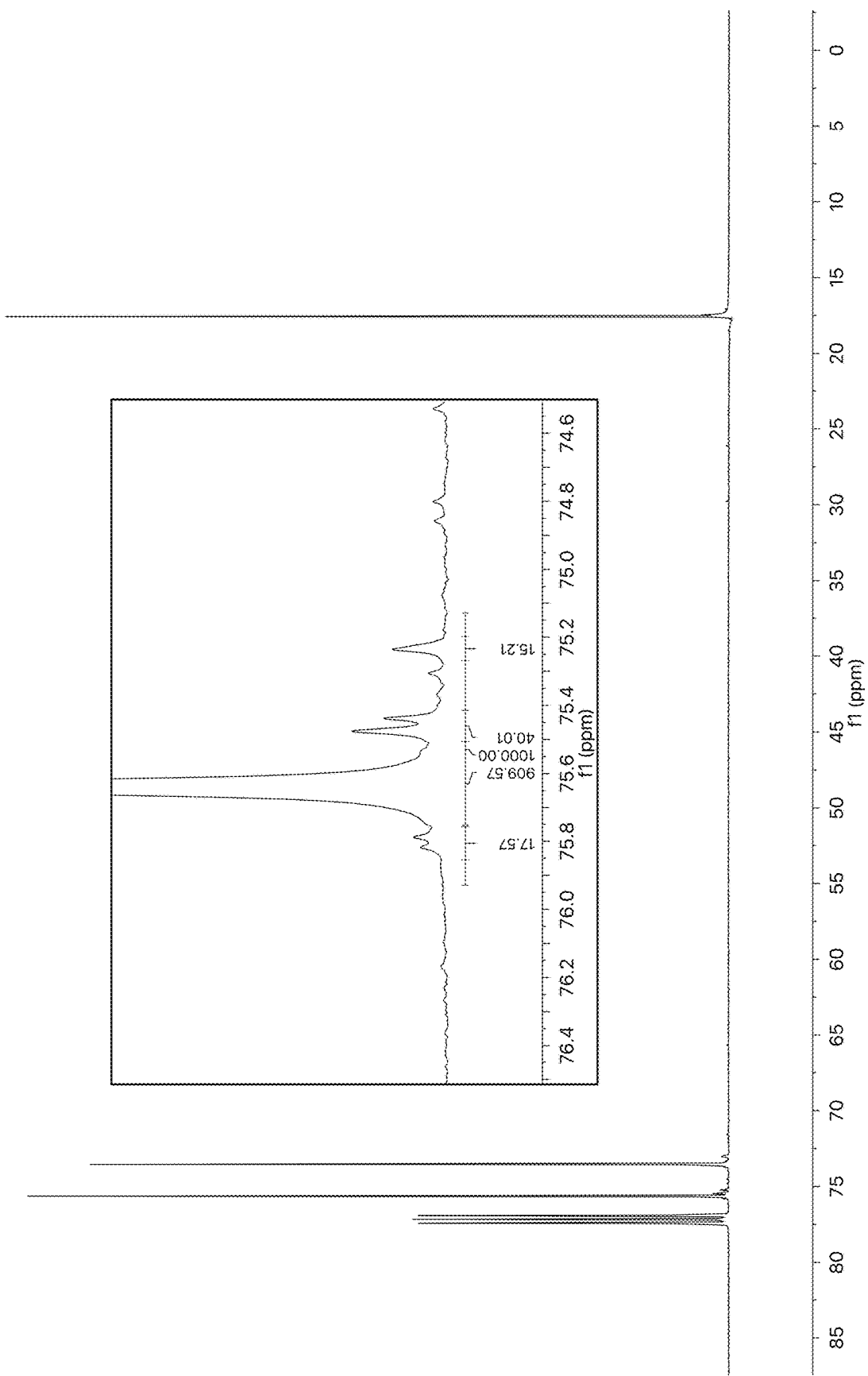
FIG. 51 shows $^{13}$C NMR spectrum of the polymer of Table 2, Entry 6.

Note: PO Selectivity of (S)-1 was determined from the reactions in FIG. 11. (Reaction conditions: (x)-PO (4000 equiv.), (S)-1 (1 equiv.), [PPN]Cl (2 equiv.), and 1,6-HD (5 equiv.) in DME. When (S)—PO was subjected to the polymerization by (S)-1, the reaction reached 95% conversion in 8 hour (h). However, when (R)—PO was subjected to the same reaction conditions, the polymerization only reached 2% conversion over the same time period. Catalysts (S)-1 primarily polymerizes (S)—PO. These results are consistent with previous quantum chemical calculations.

104 kDa enantioenriched (S)-iPPO (Table 1, Entry 1)

|  | (S)-1 | [PPN]Cl | 1,6-hexanediol | (rac)-PO | DME |
|---|---|---|---|---|---|
| equiv. | 1 | 2 | 15 | 32,000 | — |
| mmol | 0.0043 | 0.0086 | 0.065 | 138 | — |
| amount | 4.6 mg | 4.9 mg | 7.6 mg | 8.00 g | 5 mL |

Note:
same polymer was used for Table 2, Entry 3

97.2 kDa enantiopure (S)-iPPO (Table 1, Entry 2)

|  | (rac)-1 | [PPN]Cl | 1,6-hexanediol | (S)-PO | DME |
|---|---|---|---|---|---|
| equiv. | 1 | 2 | 5 | 8,000 | — |
| mmol | 0.0172 | 0.0344 | 0.0861 | 138 | — |
| amount | 18.3 mg | 19.8 mg | 10.2 mg | 8.00 g | 10 mL |

Note:
only half of (rac)-1 is active for polymerizing (S)-PO 99.4 kDa enantiopure (R)-iPPO (Table 1, Entry 3)

|  | (rac)-1 | [PPN]Cl | 1,6-hexanediol | (R)-PO | DME |
|---|---|---|---|---|---|
| equiv. | 1 | 2 | 5 | 8,000 | — |
| mmol | 0.0172 | 0.0344 | 0.0861 | 138 | — |
| amount | 18.3 mg | 19.8 mg | 10.2 mg | 8.00 g | 10 mL |

Note:
only half of (rac)-1 is active for polymerizing (R)-PO 107 kDa (SB)-iPPO (Table 1, Entry 4)

|  | (rac)-1 | [PPN]Cl | 1,6-hexanediol | (rac)-PO | DME |
|---|---|---|---|---|---|
| equiv. | 1 | 2 | 10 | 16,000 | — |
| mmol | 0.0086 | 0.0172 | 0.0860 | 138 | — |
| amount | 9.2 mg | 9.8 mg | 10.2 mg | 8.00 g | 10 mL |

98.0 kDa (rac)-iPPO (Table 1, Entry 5)

|  | (S)-iPPO | (R)-iPPO |
|---|---|---|
| equiv. | 1 | 1 |
| mmol | — | — |
| amount | 2.00 g | 2.00 g |

Note:
Polymers were blended as a solution in methylene chloride 206 kDa enantioenriched (S)-iPPO (Table 2, Entry 1)

|  | (S)-1 | [PPN]Cl | 1,6-hexanediol | (rac)-PO | DME |
|---|---|---|---|---|---|
| equiv. | 1 | 2 | 5 | 32,000 | — |
| mmol | 0.0032 | 0.0065 | 0.0161 | 103.3 | — |
| amount | 3.4 mg | 3.7 mg | 1.9 mg | 6.00 g | 3.7 mL |

% Conversion = 58.7

130 kDa enantioenriched (S)-iPPO (Table 2, Entry 2)

|  | (S)-1 | [PPN]Cl | 1,6-hexanediol | (rac)-PO | DME |
|---|---|---|---|---|---|
| equiv. | 1 | 2 | 10 | 32,000 | — |
| mmol | 0.0043 | 0.0086 | 0.043 | 138 | — |
| amount | 4.6 mg | 4.9 mg | 5.1 mg | 8.00 g | 5 mL |

% Conversion = 64.3

86.4 kDa enantioenriched (S)-iPPO (Table 2, Entry 4)

|  | (S)-1 | [PPN]Cl | 1,6-hexanediol | (rac)-PO | DME |
|---|---|---|---|---|---|
| equiv. | 1 | 2 | 20 | 32,000 | — |
| mmol | 0.0032 | 0.0065 | 0.0643 | 103.3 | — |
| amount | 3.4 mg | 3.7 mg | 7.6 mg | 6.00 g | 3.7 mL |

% Conversion = 59.4

60.5 kDa enantioenriched (S)-iPPO (Table 2, Entry 5)

|  | (S)-1 | [PPN]Cl | 1,6-hexanediol | (rac)-PO | DME |
|---|---|---|---|---|---|
| equiv. | 1 | 2 | 30 | 32,000 | — |
| mmol | 0.0043 | 0.0086 | 0.130 | 138 | — |
| amount | 4.6 mg | 4.9 mg | 15.3 mg | 8.00 g | 5 mL |

% Conversion = 60.0

48.9 kDa enantioenriched (S)-iPPO (Table 2, Entry 6)

|  | (S)-1 | [PPN]Cl | 1,6-hexanediol | (rac)-PO | DME |
|---|---|---|---|---|---|
| equiv. | 1 | 2 | 40 | 32,000 | — |
| Mmol | 0.0043 | 0.0086 | 0.172 | 138 | — |
| Amount | 4.6 mg | 4.9 mg | 20.3 mg | 8.00 g | 5 mL |

% Conversion = 59.5

Tensile Sample Preparation.

General preparation: Polymer was loaded into a rectangular stainless-steel mold (0.50 mm thick) and pressed on a Carver press hot plate at 15 MPa for 10 minutes (mins). All iPPO samples were pressed at 90° C. and polyolefin samples were pressed at 180° C. Nylon 6,6 was purchased as a thin film (0.80 mm thick) and used as such. Each thin film was punched with an ASTM D1708 die, to produce dogbone shape specimens (22.0 mm×5.0 mm×0.5 mm) with a 16.0 mm gauge length.

Fixed and variable cross-sectional samples: iPPO was loaded into the appropriate mold (FIGS. 52 and 53), and melt pressed at 15 MPa for 10 mins at 90° C.

Tensile Testing Procedure.

Figure 54:
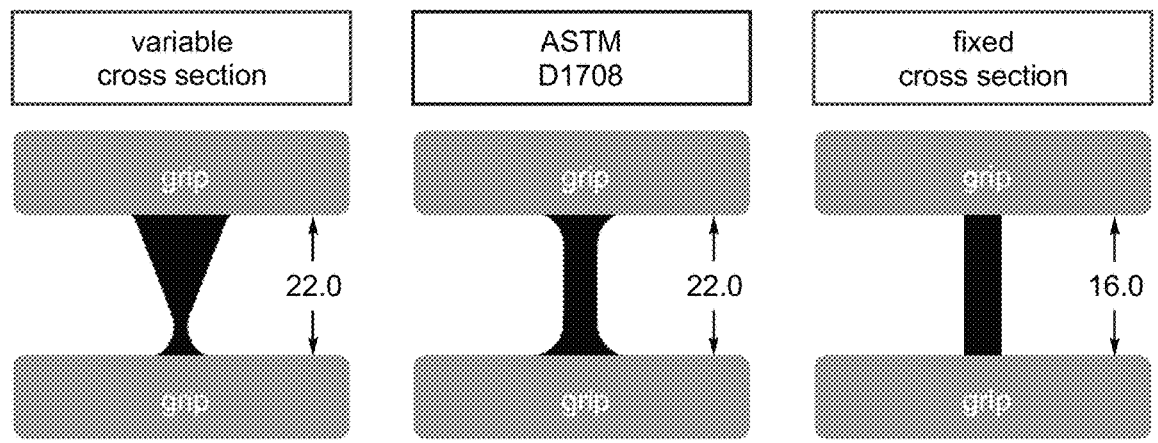
FIG. 54 shows visual representation of how each sample shape was gripped. All measurements presented in mm.

Mechanical studies were performed using a Shimadzu Autograph AGS-X tensile tester with pneumatic grips and 500 N load cell. Samples were elongated with a crosshead velocity of 22 mm min$^{-1}$ (100% strain min$^{-1}$) unless otherwise specified. Samples were strained until break and at least five samples were tested for each material reported. Data analysis was performed using TrapeziumX v. 1.5.1 software. Samples were gripped as shown in FIG. 54. Tabulated results of ultimate tensile strength (UTS), elastic modulus, and yield stress for the various stereoregular forms of iPPO are presented in Tables 3-5 and for commercial polymers in Tables 6-8.

Calculating Engineering Stress and Strain: Engineering stress (Eq. 8) and strain (Eq. 9) were reported for all uniaxial tensile elongation analysis. The engineering stress is the force (F) applied to the smallest original cross-sectional area ($A_0$) of a tensile specimen. The engineering strain is the change in grip separation relative to the original grip separation ($L_0$) expressed as a percentage.

$$\text{Engineering stress} = \sigma_n = \frac{F}{A_0} \quad (8)$$

$$\text{Engineering strain} = \varepsilon_n = \frac{L - L_0}{L_0} \times 100\% \quad (9)$$

Stress Oscillation Shape Dependence.

Figure 55:
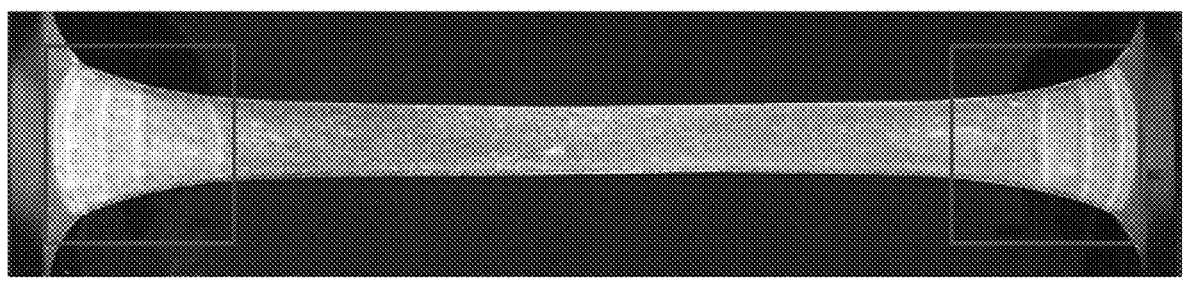
FIG. 55 shows oscillation bands present outside the gauge length on an enantioenriched (S)-iPPO specimen at 150% strain.

The source of SOs was further investigated due to inhomogeneous deformation observed on the tensile specimen. SOs often coincide with the appearance of an alternating pattern of clear and opaque bands within the gauge length of the tensile specimen. However, for all variants of iPPO, this deformation was consistently localized outside of the gauge length and coincided with the onset of strain hardening (FIG. 55). From these observations, it was theorized that the SOs generated by iPPO might depend on the change in cross-sectional area of the tensile specimen. To investigate this theory, samples of variable and fixed cross-sectional shape were examined (FIG. 56). The variable cross-sectional shape was designed to mimic the effect of deformation outside the gauge length of the ASTM D1708 tensile specimen, but fracture prior to the deformation reaching the equipment grips (FIG. 56, red). The approximate yield stress and ultimate stress were preserved for the variable cross-sectional specimen shape, but the SOs were exacerbated. A fixed cross-sectional sample shape was designed to mimic deformation within the gauge length of the ASTM D1708 tensile specimen (FIG. 56, green). A yield point consistent with the other sample shapes and failure by means of fracture at the interphase of strain hardened and gripped polymer was observed. The failure of the fixed cross-sectional sample shape provided an underestimation of the UTS and strain at break for iPPO. Nonetheless, about half of the strain-hardening region was preserved, revealing a smooth trace free of SOs. From these experiments, we believe the SO response observed with iPPO is sample shape dependent.

Compiled Tensile Data.

Compiled individual tensile traces are provided in FIGS. 57-61.

TABLE 3

UTS of Various Stereoregular Configurations of Isotactic iPPO.

| Polymer Specimen | Polymer Stereochemistry | Representative Traces | | | | | Average (MPa) | Standard Deviation |
| --- | --- | --- | --- | --- | --- | --- | --- | --- |
| | | 1 | 2 | 3 | 4 | 5 | | |
| Table 1, Entry 1 | Enantioenriched (S) | 76.54 | 76.51 | 77.50 | 70.13 | 73.04 | 74.74 | 3.09 |
| Table 1, Entry 2 | Enantiopure (S) | 70.86 | 77.37 | 76.86 | 72.57 | 77.47 | 75.03 | 3.09 |
| Table 1, Entry 3 | Enantiopure (R) | 75.65 | 73.78 | 77.34 | 70.90 | 78.53 | 75.24 | 3.02 |
| Table 1, Entry 4 | Stereoblock (SB) | 62.63 | 65.66 | 68.90 | 62.83 | 65.81 | 65.17 | 2.57 |
| Table 1, Entry 5 | Racemic (rac) | 68.11 | 69.71 | 74.71 | 72.77 | 71.12 | 71.28 | 2.58 |

TABLE 4

Elastic Modulus of Various Stereoregular Configurations of Isotactic iPPO.

| Polymer Specimen | Polymer Stereochemistry | Representative Traces | | | | | Average (MPa) | Standard Deviation |
| --- | --- | --- | --- | --- | --- | --- | --- | --- |
| | | 1 | 2 | 3 | 4 | 5 | | |
| Table 1, Entry 1 | Enantioenriched (S) | 256.3 | 261.9 | 244.9 | 229.4 | 245.0 | 247.5 | 12.5 |
| Table 1, Entry 2 | Enantiopure (S) | 301.3 | 303.9 | 298.1 | 278.1 | 295.5 | 295.4 | 10.2 |

TABLE 4-continued

Elastic Modulus of Various Stereoregular Configurations of Isotactic iPPO.

| Polymer Specimen | Polymer Stereochemistry | Representative Traces | | | | | Average (MPa) | Standard Deviation |
|---|---|---|---|---|---|---|---|---|
| | | 1 | 2 | 3 | 4 | 5 | | |
| Table 1, Entry 3 | Enantiopure (R) | 286.6 | 271.2 | 273.9 | 284.0 | 297.0 | 282.5 | 10.4 |
| Table 1, Entry 4 | Stereoblock (SB) | 266.4 | 250.6 | 239.3 | 264.1 | 229.5 | 250.0 | 15.8 |
| Table 1, Entry 5 | Racemic (rac) | 305.9 | 287.3 | 313.7 | 311.4 | 311.3 | 305.9 | 10.8 |

TABLE 5

Yield Stress of Various Stereoregular Configurations of Isotactic iPPO.

| Polymer Specimen | Polymer Stereochemistry | Representative Traces | | | | | Average (MPa) | Standard Deviation |
|---|---|---|---|---|---|---|---|---|
| | | 1 | 2 | 3 | 4 | 5 | | |
| Table 1, Entry 1 | Enantioenriched (S) | 11.22 | 11.67 | 11.46 | 10.40 | 11.14 | 11.18 | 0.48 |
| Table 1, Entry 2 | Enantiopure (S) | 13.65 | 12.77 | 12.45 | 11.85 | 12.38 | 12.62 | 0.66 |
| Table 1, Entry 3 | Enantiopure (R) | 12.47 | 11.66 | 11.29 | 12.01 | 12.72 | 12.03 | 0.58 |
| Table 1, Entry 4 | Stereoblock (SB) | 11.05 | 10.59 | 10.74 | 11.12 | 10.18 | 10.74 | 0.38 |
| Table 1, Entry 5 | Racemic (rac) | 13.34 | 12.51 | 13.69 | 12.90 | 13.62 | 13.21 | 0.50 |

TABLE 6

UTS of Commercial Polymers.

| Polymer | Representative Traces | | | | | Average (MPa) | Standard Deviation |
|---|---|---|---|---|---|---|---|
| | 1 | 2 | 3 | 4 | 5 | | |
| iPP | 28.46 | 28.99 | 25.98 | 25.13 | 22.42 | 26.20 | 2.67 |
| HDPE | 30.20 | 25.23 | 26.09 | 25.71 | 24.85 | 26.42 | 2.17 |
| nylon 6, 6 | 84.15 | 80.82 | 82.51 | 78.26 | 80.51 | 81.25 | 2.22 |

TABLE 7

Elastic Modulus of Commercial Polymers.

| Polymer | Representative Traces | | | | | Average (MPa) | Standard Deviation |
|---|---|---|---|---|---|---|---|
| | 1 | 2 | 3 | 4 | 5 | | |
| iPP | 1155 | 1227 | 1253 | 1115 | 1217 | 1193 | 57 |
| HDPE | 1328 | 1158 | 1276 | 1158 | 1280 | 1240 | 78 |
| nylon 6, 6 | 694 | 780 | 725 | 656 | 736 | 718 | 46 |

TABLE 8

Yield Stress of Commercial Polymers.

| Polymer | Representative Traces | | | | | Average (MPa) | Standard Deviation |
|---|---|---|---|---|---|---|---|
| | 1 | 2 | 3 | 4 | 5 | | |
| iPP | 27.92 | 29.24 | 29.30 | 27.07 | 29.60 | 28.60 | 1.06 |
| HDPE | 27.09 | 23.37 | 25.59 | 23.90 | 25.81 | 25.15 | 1.51 |
| nylon 6, 6[a] | n.a. | n.a. | n.a. | n.a. | n.a. | n.a. | n.a. |

[a]No definitive yield peak

Degradation Procedure and Analysis.

Figure 52:
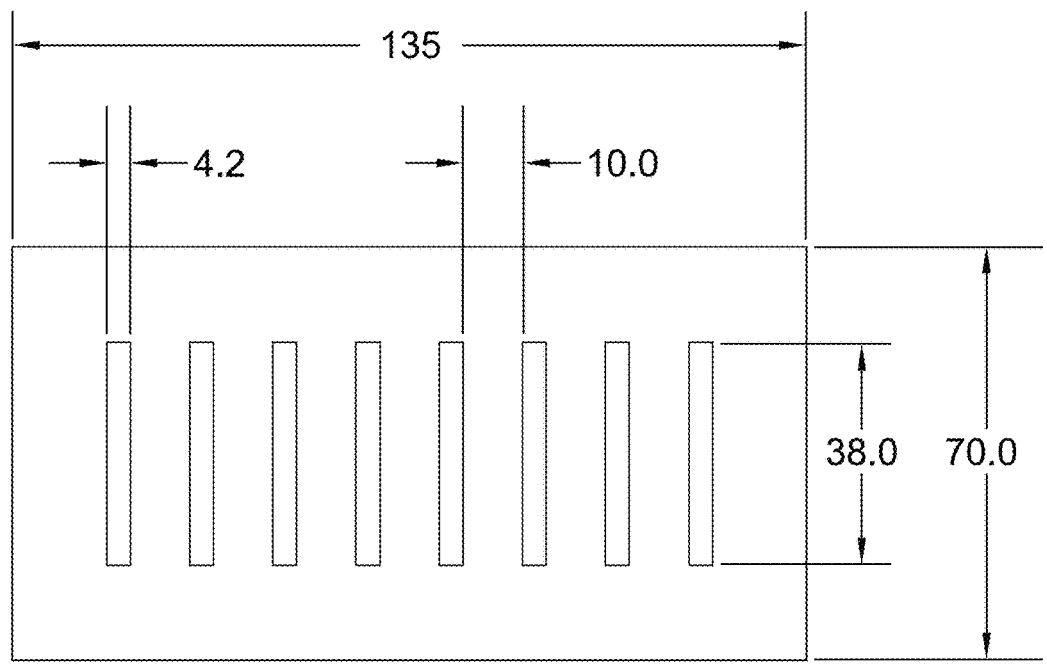
FIG. 52 shows dimensions of the fixed cross-sectional mold (0.50 mm thick). All measurements presented in mm.
Figure 53:
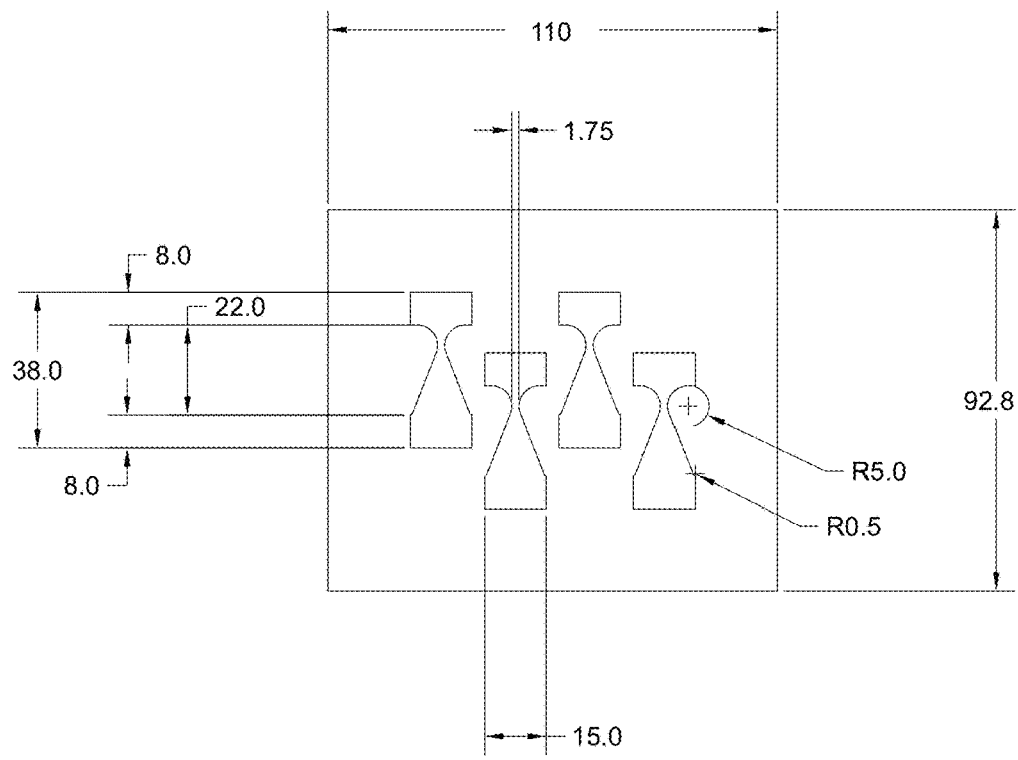
FIG. 53 shows dimensions of variable cross-sectional mold (0.50 mm thick). All measurements presented in mm.

Each sample was hot pressed using the mold from FIG. 52. The Waveform lighting realUV LED Flood Light (365 nm) was suspended 55 cm above the samples generating a light intensity of 250 µW cm$^{-2}$ as measure by a calibration certified UVA/UVB (208-400 nm) meter. Samples remained at room temperature using a fan for air circulation.

Although the present disclosure has been described with respect to one or more particular embodiments and/or examples, it will be understood that other embodiments and/or examples of the present disclosure may be made without departing from the scope of the present disclosure.

The invention claimed is:

1. A strain-hardened polymer comprising a plurality of isotactic polypropylene oxide units and one or more crystalline domains, wherein the molecular weight ($M_n$) of the strain-hardened polymer is 5,000 to 500,000 g/mol and the polymer exhibits an initial engineering yield stress of 15 MPa or greater.

2. The strain-hardened polymer of claim 1, wherein the strain-hardened polymer has an [mm] of 75%.

3. The strain-hardened polymer of claim 1, wherein the strain-hardened polymer has an [mm] of 90%.

4. The strain-hardened polymer of claim 1, wherein the strain-hardened polymer has an enthalpy of fusion of 40 to 80 J/g.

5. The strain-hardened polymer of claim 1, wherein the strain-hardened polymer is a copolymer.

6. The strain-hardened polymer of claim 5, wherein the copolymer comprises at least two stereoblocks.

7. The strain-hardened polymer of claim 6, wherein the copolymer comprises one or more polyurethane segments and one or more stereoblocks, wherein each stereoblock comprises a plurality of isotactic polypropylene oxide units.

8. The strain-hardened polymer of claim 1, wherein the strain-hardened polymer has a molecular weight ($M_n$) of at least 50,000 g/mol 50,000 to 500,000 g/mol.

9. The strain-hardened polymer of claim 8, wherein the strain-hardened polymer has a molecular weight ($M_n$) of 100,000 to 500,000 g/mol.

10. The strain-hardened polymer of claim 1, wherein the strain-hardened polymer comprises:

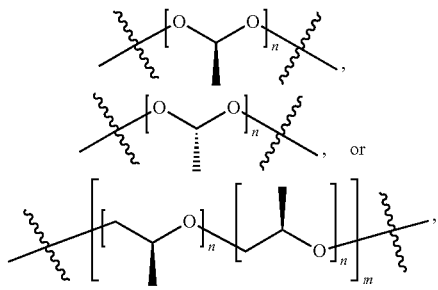

wherein each n is independently 10 to 10,000 and m is 1 to 1000.

11. The strain-hardened polymer of claim 10, wherein the strain-hardened polymer has the following structure:

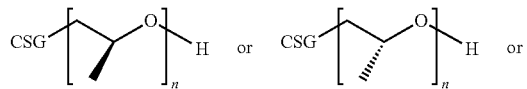

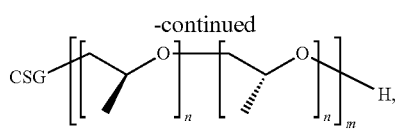

wherein CSG is a chain shuttling group.

12. The strain-hardened polymer of claim 11, wherein the chain shuttling group has the following structure:

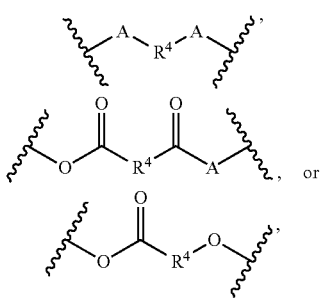

wherein A is O or S, $R^4$ is a $C_1$ to $C_{20}$ carbon-containing group chosen from a $C_1$ to $C_{20}$ aliphatic group, $C_1$ to $C_{20}$ heteroaliphatic group, $C_3$ to $C_{12}$ carbocyclic group, a $C_5$ to $C_{20}$ aliphatic carbocyclic group, $C_3$ to $C_{12}$ heterocyclic group, and a $C_5$ to $C_{20}$ aliphatic heterocyclic group.

13. The strain-hardened polymer of claim 12, wherein the strain-hardened polymer has the following structure:

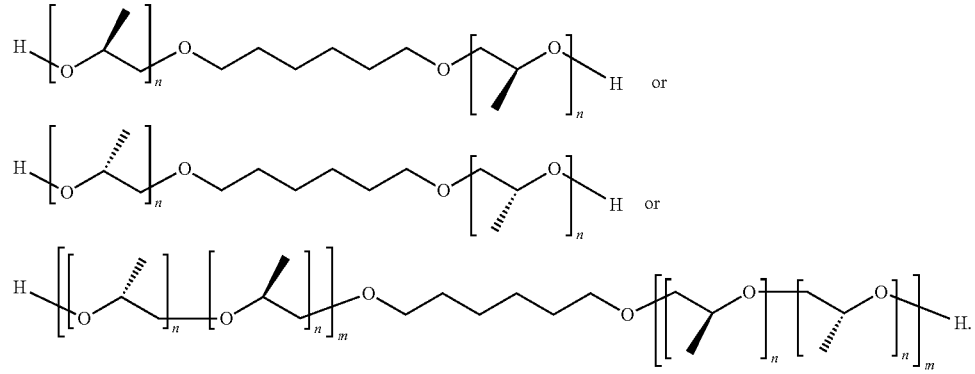

14. The strain-hardened polymer of claim 1, wherein the strain-hardened polymer has an elastic modulus of 15 MPa or greater.

15. The strain-hardened polymer of claim 1, wherein the elastic modulus is less than or equal to 350 MPa.

16. The strain-hardened polymer of claim 1, wherein the strain-hardened polymer has an initial engineering yield stress of 15 to 90 MPa.

17. The strain-hardened polymer of claim 1, wherein the strain-hardened polymer has an ultimate tensile strength of 30 to 75 MPa.

\* \* \* \* \*